US006967958B2

(12) United States Patent
Ono et al.

(10) Patent No.: US 6,967,958 B2
(45) Date of Patent: Nov. 22, 2005

(54) COMMUNICATION-STATUS NOTIFICATION APPARATUS FOR COMMUNICATION SYSTEM, COMMUNICATION-STATUS DISPLAY APPARATUS, COMMUNICATION-STATUS NOTIFICATION METHOD, MEDIUM IN WHICH COMMUNICATION-STATUS NOTIFICATION PROGRAM IS RECORDED AND COMMUNICATION APPARATUS

(75) Inventors: Yoshiyuki Ono, Kawasaki (JP); Kaoru Chujo, Kawasaki (JP); Naoji Fujino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 904 days.

(21) Appl. No.: 09/784,983

(22) Filed: Feb. 16, 2001

(65) Prior Publication Data

US 2001/0021186 A1 Sep. 13, 2001

(30) Foreign Application Priority Data

Feb. 24, 2000 (JP) .............................. 2000-047488

(51) Int. Cl.$^7$ ............................................ H04L 12/28
(52) U.S. Cl. ..................................... 370/401; 370/356
(58) Field of Search ................................ 370/352–358, 370/401–402, 493–495, 360, 384, 386, 389; 709/31, 318, 223, 224, 249, 227; 702/179; 713/151; 714/42

(56) References Cited

U.S. PATENT DOCUMENTS 6,253,249 B1 * 6/2001 Belzile ........................ 709/249
6,603,774 B1 * 8/2003 Knappe et al. ............. 370/466

* cited by examiner

*Primary Examiner*—Wellington Chin
*Assistant Examiner*—Brenda Pham
(74) *Attorney, Agent, or Firm*—Katten Muchin Rosenman LLP

(57) ABSTRACT

A communication-status notification apparatus enabling a subscriber to observe various kinds of communication status in a network easily via the subscriber's own terminal in a communication system. The apparatus includes a request analysis section for discriminating whether or not voice data received by gateway equipment from a subscriber terminal contains a request on monitoring/controlling or notifying of a communication status in the network and for analyzing the content of the request when contains, a communication-status monitor/control section for monitoring/controlling the communication status responsive to the content of the request analyzed by the request analysis section based on a processing status of the voice data in the gateway equipment, and a communication-status notification section for notifying the subscriber terminal of the communication status monitored/controlled by the communication-status monitor/control section via the gateway equipment responsive to the content of the request analyzed by the request analysis section. The apparatus is useful when applied to VoIP gateway equipment or the like used for a VoIP communication system.

36 Claims, 22 Drawing Sheets

COMMUNICATION-STATUS NOTIFICATION APPARATUS FOR COMMUNICATION SYSTEM, COMMUNICATION-STATUS DISPLAY APPARATUS, COMMUNICATION-STATUS NOTIFICATION METHOD, MEDIUM IN WHICH COMMUNICATION-STATUS NOTIFICATION PROGRAM IS RECORDED AND COMMUNICATION APPARATUS

BACKGROUND OF THE INVENTION

1. Field of the Invention

The present invention relates to a communication-status notification apparatus used in gateway equipment of a communication system, and a communication-status display apparatus used in a subscriber terminal connected to the equipment. The invention relates also to a communication-status notification method carried out in the communication-status notification apparatus, a medium in which a communication status notification program used in the equipment is recorded, and a communication apparatus having a communication-status notification mechanism.

2. Description of the Related Art

In recent years, data traffic on various networks (e.g., office networks including telecommunication networks and data-communication networks) has increased constantly. Although being relatively small compared with voice traffic (or audio traffic) in the past, the data traffic accounts for nearly 70 percent of the whole traffic on the present networks, and is expected to continue increasing in the years ahead.

Such a situation has formed the background to produce the concept of transmitting voice data (or audio data) via data-communication networks, thereby unify various kinds of networks into the data-communication networks so as to reduce costs. A technology that is expected to embody this concept is Voice over Internet Protocol (VoIP).

VoIP is a technology of voice-data transmission using an Internet Protocol (IP) network, which is based on IP being a protocol for data transmission. More specifically, VoIP enables to convert voice data into one or more IP packets so as to transmit the IP packets via an IP network, by means of equipment having a mechanism of converting various voice signals such as a telephone signal or a facsimile signal into IP packets, and vice versa (hereinafter called a VoIP-gateway mechanism).

FIG. 22 illustrates a conventional communication system using the VoIP (hereinafter called a VoIP communication system). In the VoIP communication system shown in FIG. 22, a VoIP gateway apparatus 1-1, a VoIP trunk 1-2, an Internet-telephony terminal 1-3 and an Internet-facsimile terminal 1-4 are connected to an IP network 9.

The VoIP gateway apparatus 1-1 is coupled to a public switched telephone network (PSTN) or an integrated services digital network (ISDN) to convert an analog or digital voice signal received from the PSTN or the ISDN into one or more IP packets, and vice versa. The VoIP trunk 1-2 is coupled to an exchange such as a private branch exchange (PBX) to convert a voice signal of the exchange into one or more IP packets, and vice versa.

Receiving various kinds of voice signals (e.g., a telephone signal, which was sent by a telephone, or a facsimile signal, which was sent by a facsimile machine) from the PSTN or the ISDN or via the exchange, the VoIP gateway apparatus 1-1 or the VoIP trunk 1-2 changes the voice signal into voice data so as to create one or more IP packets containing the voice data, and then sends the created IP packets into the IP network 9. And receiving one or more IP packets containing voice data from the IP network 9, the VoIP gateway apparatus 1-1 or the VoIP trunk 1-2 analyzes the received IP packets to extract the contained voice data so as to change the voice data into a voice signal, and then sends the voice signal into the PSTN or the ISDN, or to the exchange.

In short, each of the VoIP gateway apparatus 1-1 and the VoIP trunk 1-2 is provided with the VoIP-gateway mechanism to thereby serve as an interface between a terminal, such as a conventional telephone or a conventional facsimile machine, of an individual subscriber and the IP network 9. The VoIP gateway apparatus 1-1 and the VoIP trunk 1-2 will be generically called VoIP gateway equipment in the following description.

The Internet-telephony terminal 1-3 and the Internet-facsimile terminal 1-4 are directly connected to the IP network 9 so as to serve as a subscriber terminal such as a telephone or a facsimile machine, and also have a function of converting voice signal such as a telephone signal or a facsimile signal into one or more IP packets, and vice versa.

Inputted various voice signals such as a telephone signal or a facsimile signal, the Internet-telephony terminal 1-3 or the Internet-facsimile terminal 1-4 converts the voice signal into voice data to create one or more IP packets containing the voice data, and then sends the created IP packets into the IP network 9. And receiving one or more IP packets containing voice data from the IP network 9, the Internet-telephony terminal 1-3 or the Internet-facsimile terminal 1-4 analyzes the received IP packets to extract the contained voice data, so as to change the extracted voice data into an optimum voice signal such as a telephone signal or a facsimile signal, and then outputs the resultant voice signal.

Each of the Internet-telephony terminal 1-3 and Internet-facsimile terminal 1-4 can be considered as a conventional subscriber terminal, such as a telephone or a facsimile machine, to which the above-mentioned VoIP-gateway mechanism is added. Therefore, in the following description, each of the Internet-telephony terminal 1-3 and the Internet-facsimile terminal 1-4 will be considered as a combination of a mechanism of VoIP gateway equipment and a mechanism of a subscriber terminal formed as a single apparatus, and will be generically called a VoIP gateway terminal.

In short, VoIP is a technology in which VoIP gateway equipment is disposed between a subscriber terminal, such as a telephone or a facsimile machine, and an IP network, thereby enabling to transmit voice data contained in various kinds of voice signals, such as a telephone signal or a facsimile signal, via the IP network.

By putting VoIP to practical use, it is possible to transmit voice data via data-communication networks such as IP networks, thereby unify various kinds of networks into the data-communication networks so as to reduce costs. Further, concurrent transmission of conventional communication data and voice data carries an additional advantage of realizing various new services in which the communication data and the voice data are combined together.

Compared with the conventional technologies of transmitting a voice signal via a PSTN or the like, however, VoIP technology of transmitting voice data via an IP network has also its disadvantages in voice communication on the following points:

① An individual subscriber is not provided with a dedicated connection line in the IP network. Each IP packet is transmitted across the IP network according to a destination address included in a header of each IP packet. A single link in the IP network would therefore allow various IP packets, directed to different destinations, to pass through.

②  Traffic on the IP network is considerably affected by a kind of application program that each subscriber uses for communication and also by a number of subscribers concurrently connecting to the IP network for communication, and is therefore highly variable according to a communication condition and a period of time in which each subscriber connects to the IP network.

③ Voice-data transmission via the IP network involves creation/analysis process of IP packets (IP-packetization/IP-depacketization process), which increases a transmission delay of voice data.

④ Plural IP packets being in a single connection and having the same destination may take different routs in the IP network, owing to dynamic routing by routers in the IP network. Transmission delays of IP packets even in the same connection therefore vary for every IP packet.

Because of the above-described points, VoIP technology has some disadvantages in QoS (Quality of Service), compared with the conventional voice communication technologies.

Specifically the points ① and ② result in degradation of voice data during the voice communication. Heavy traffic tends to bring about a situation that too many IP packets exceeding the processing capacity of routers are directed to pass through the individual links at once. This situation causes congestion of IP packets, which results in disappearance of any IP packets, and overflow of buffers of the individual routers, which results in abandonment of IP packets subsequently arriving at the individual routers. Such disappearance or abandonment of IP packets can be fully recovered during the ordinal data communication simply by sending the disappeared or abandoned IP packets again, while it affects considerably the voice-data communication, in which immediate or simultaneous communication of voice data is required, because it brings about the degradation of voice data.

The points ③ and ④ result in delay of voice data during the voice communication. The delay of voice data is increased if the voice data undergoes audio CODEC (code/decode or compression/decompression) processing in the VoIP gateway equipment. Further, because transmission routes of IP packets are unidentifiable in the IP network, it is difficult to accurately estimate the delay of voice data. Such indefinite delay of voice data brings about considerable problem for the voice-data communication, in which immediate or simultaneous communication of voice data is required.

The communication via the IP network also brings about another problem. The Internet, being representative of various IP networks, is composed of a number of interconnected networks and terminals throughout the world. Connecting to the Internet therefore means connecting with the number of networks and terminals throughout the world via the Internet. It is therefore necessary to take adequate security measures for safe connection to the Internet. When a company's intranet is established so as to be connected to the Internet, for example, any security measures such as a firewall or a cryptographic processing would be taken ordinarily. Likewise, when voice VoIP communication system via the Internet is established, appropriate security measures are indispensable in order to prevent tapping or interception of voice data and to thereby ensure the security of voice communication.

Consequently, it is necessary to introduce various measures in respect with communication quality, such as QoS or security, in order to provide a satisfactory VoIP service. Several measures are proposed and actually adopted for ensuring communication quality. As a measure to ensure QoS, for example, it is proposed to apply UDP (user datagram protocol) or RTP (real-time transport protocol), instead of TCP (transmission control protocol) commonly used, for use in combination with IP, or to apply RSVP (resource reservation setup protocol) to a layer higher than that of TCP/IP, thereby performing priority control of voice data or securing a bandwidth dedicated to voice data.

However, VoIP is basically a service of a best effort type and, therefore, has difficulty in always providing with the best communication quality to a subscriber, even if some technologies to improve the communication quality as described above are introduced.

Specifically, sudden decline of voice quality or sudden interruption of communication would prevent a subscriber from using VoIP communication without anxiety.

Likewise, regarding security measures such as cryptographic processing on voice data, a subscriber would find difficulty in setting/resetting an appropriate security process at the subscriber's request or in confirming security-processing status, thereby being prevented from using VoIP communication without anxiety.

In order to provide a subscriber with high communication quality as possible, it is necessary to provide a service in which the subscriber can observe a communication status in an IP network as the subscriber wishes, can select an appropriate condition of voice communication according to the observed communication status of the IP network as the subscriber requests, and can confirm whether or not the IP network complies with the subscriber's request. However, such technology that enables a subscriber to observe a communication status of voice data in an IP network easily via the subscriber's terminal, such as a telephone or a facsimile machine, has not been developed.

SUMMARY OF THE INVENTION

With the foregoing problems in view, it is an object of the present invention to provide a communication-status notification apparatus, a communication-status display apparatus, a communication-status notification method, a recording medium in which a communication status notification program is recorded and a communication apparatus, which enable a user of a communication system, such as a VoIP communication system, to observe various kinds of communication status of voice data in a network, such as an IP network, easily via a subscriber terminal.

It is another object of the present invention to provide a communication-status notification apparatus that enables a user of the communication system to observe traffic status of voice data in a network easily via a subscriber terminal and, further, to select an optimum condition of voice communication according to the observed traffic status.

It is another object of the present invention to provide a communication-status notification apparatus that enables a user of the communication system to observe cryptographic-processing status in a network easily via a subscriber terminal and, further, to select an optimum condition of voice communication according to the observed cryptographic-processing status.

In the following description, a VoIP system (a VoIP communication system) is supposed as an example of such communication system. Also, an IP network (an IP communication network) is supposed as an example of such network (communication network) accordingly.

In order to attain this object, according to an aspect of the present invention, the communication-status notification apparatus for use in a VoIP (voice over internet protocol) communication system in which at least one subscriber terminal is connected to an IP communication network via first VoIP gateway equipment, serving for creating/analyzing an IP (internet protocol) packet as a voice data transmission medium, so that the subscriber terminal sends/receives voice data over the IP communication network, is adapted to be incorporated in the first VoIP gateway equipment and is equipped with a communication-status-notification management section for notifying the subscriber terminal of a communication status in the IP communication network via the first VoIP gateway equipment, based on a processing status of the voice data in the first VoIP gateway equipment.

According to another aspect of the present invention, the communication-status notification apparatus for use in a VoIP (voice over internet protocol) communication system in which at least one subscriber terminal is connected to an IP communication network via first VoIP gateway equipment, serving to create/analyze an IP (internet protocol) packet as a voice data transmission medium, so that the subscriber terminal sends/receives voice data over the IP communication network, is adapted to be incorporated in the first VoIP gateway equipment and comprises: a request analysis section for discriminating whether or not voice data received by the first VoIP gateway equipment from the subscriber terminal contains a request on monitoring/controlling or notifying a communication status in the IP communication network, and for analyzing the content of the request contained in the voice data received from the subscriber terminal; a communication-status monitor/control section, responsive to the content of the request analyzed by the request analysis section, for monitoring/controlling the communication status of the IP communication network, based on the processing status of the voice data in the first VoIP gateway equipment; and a communication-status notification section, responsive to the content of the request analyzed by the request analysis section, for notifying the subscriber terminal of the communication status monitored/controlled by the communication-status monitor/control section via the first VoIP gateway equipment.

According to a further aspect of the present invention, the communication-status display apparatus for use in a VoIP (voice over internet protocol) communication system in which at least one subscriber terminal is connected to an IP communication network via VoIP gateway equipment, serving to create/analyze an IP (internet protocol) packet as a voice data transmission medium, so that the subscriber terminal sends/receives voice data over the IP communication network, and also serving to monitor/control a communication status in the IP communication network so as to notify the subscriber terminal of information about the monitored/controlled communication status, is adapted to be incorporated in the subscriber terminal and comprises: a notified-information detection section for detecting information about the communication status of the IP communication network, which status is monitored/controlled by the VoIP gateway equipment, when the subscriber terminal is notified of the communication-status information from the VoIP gateway equipment; a display-material storage section for storing at least one of voice, character and image as display materials; and a communication-status display section for displaying the communication status of the IP communication network, based on the communication-status information detected by the notified-information detection section, using the display materials stored in the display-material storage section.

According to a further aspect of the present invention, the communication-status notification method for notifying at least one subscriber terminal of a communication status in an IP (internet protocol) communication network of a VoIP (voice over internet protocol) communication system in which the subscriber terminal is connected to the IP communication network via VoIP gateway equipment, serving to create/analyze an IP packet as a voice data transmission medium, so that the subscriber terminal sends/receives voice data over the IP communication network, is carried out at the VoIP gateway equipment and comprises the steps of: (a) monitoring/controlling the communication status of the IP communication network, based on a processing status of voice data in the VoIP gateway equipment; and (b) notifying the subscriber terminal of the communication status monitored/controlled in the step (a).

According to a further aspect of the present invention, the communication-status notification method for notifying at least one subscriber terminal of a communication status in an IP (internet protocol) communication network of a VoIP (voice over internet protocol) communication system in which the subscriber terminal is connected to the IP communication network via VoIP gateway equipment, serving to create/analyze an IP packet as a voice data transmission medium, so that the subscriber terminal sends/receives voice data over the IP communication network, comprises the steps of: at the subscriber terminal, (a) sending to the VoIP gateway equipment a request on monitoring/controlling or notifying a communication status of the IP communication network, the request being contained in voice data transmitted over the IP communication network; at the VoIP gateway equipment, (b) discriminating whether or not voice data received from the subscriber terminal contains the request sent by the subscriber terminal in the step (a), and analyzing the content of the request contained in the voice data received from the subscriber terminal; (c) in response to the content of the request analyzed in step (b), monitoring/controlling the communication status of the IP communication network, based on a processing status of the voice data in the VoIP gateway equipment; and (d) in response to the content of the request analyzed in step (b), notifying the subscriber terminal of the communication status monitored/controlled in step (c).

According to a further aspect of the present invention, the recording medium, in which a communication-status notification program is recorded, for use in a VoIP (voice over internet protocol) gateway equipment of an IP (internet protocol) communication system in which at least one subscriber terminal is connected to the IP communication network via the VoIP gateway equipment, serving to create/analyze an IP packet as a voice data transmission medium, so that the subscriber terminal sends/receives voice data over the IP communication network, instructs the VoIP gateway equipment to function as the following: means for monitoring/controlling a communication status in the IP communication network, based on a processing status of voice data in the VoIP gateway equipment; and means for notifying the subscriber terminal of the communication status of the IP communication network, which is monitored/controlled by the monitoring/controlling means, via the VoIP gateway equipment.

According to a further aspect of the present invention, the recording medium, in which a communication status notification program is recorded, for use in a VoIP (voice over internet protocol) gateway equipment of an IP (internet protocol) communication system in which at least one subscriber terminal is connected to the IP communication network via the VoIP gateway equipment, serving to create/ analyze an IP packet as a voice data transmission medium, so that the subscriber terminal sends/receives voice data over the IP communication network, instructs the VoIP gateway equipment to function as the following: means for discriminating whether or not voice data received by the VoIP gateway equipment from the subscriber terminal contains a request on monitoring/controlling or notifying a communication status in the IP communication network, and for analyzing the content of the request contained in the voice data received from the subscriber terminal; means, responsive to the content of the request analyzed by the discriminating and analyzing means, for monitoring/controlling the communication status of the IP communication network, based on the processing status of the voice data in the VoIP gateway equipment; and means, responsive to the content of the request analyzed by the discriminating and analyzing means, for notifying the subscriber terminal of the communication status, which is monitored/controlled by the monitoring/controlling means, via the VoIP gateway equipment.

According to a further aspect of the present invention, a communication apparatus for use in a VoIP (voice over internet protocol) communication system including an IP communication network and at least one subscriber terminal, is disposed between the IP communication network and the subscriber terminal and comprises: a VoIP gateway section serving to create/analyze an IP (internet protocol) packet as a voice data transmission medium so that the subscriber terminal sends/receives voice data over the IP communication network; and a communication-status notification section for notifying the subscriber terminal of a communication status in the IP communication network, based on a processing status of IP packet in said VoIP gateway section.

According to a further aspect of the present invention, a communication-status notification apparatus for a VoIP (voice over internet protocol) communication system in which at least one subscriber terminal is connected to an IP communication network via a VoIP router, serving to create/ analyze an IP (internet protocol) packet as a voice data transmission medium, so that the subscriber terminal sends/ receives voice data over the IP communication network, is adapted to be incorporated in the VoIP router and is equipped with a communication-status notification section for notifying the subscriber terminal of a communication status in the IP communication network via the VoIP router, based on a processing status of the voice data in the VoIP router.

Accordingly, with the communication-status notification apparatus, the communication-status notification method, the medium in which the communication status notification program is recorded and a communication apparatus of the present invention, since the VoIP gateway equipment notifies the subscriber terminal connected to the VoIP gateway equipment of the communication status of the IP network monitored/controlled in the VoIP gateway equipment, a subscriber to the VoIP communication system can observe various kinds of communication status of voice data in the IP network easily via the subscriber's own terminal.

Further, when the subscriber terminal sends a request regarding monitor/control of communication status or regarding notification of communication status to the VoIP gateway equipment as a form of voice data, the VoIP gateway equipment analyzes the content of the request and carries out the monitor/control of communication status or the notification of communication status to the subscriber terminal according to the analyzed content of the request, so that a subscriber can control the details of the monitor/ control of communication status and the content of the notification of communication status easily via the subscriber's own terminal.

Likewise, with the communication-status display apparatus, since the communication status of the IP network notified by the VoIP gateway equipment is displayed in the subscriber terminal using materials stored in the subscriber terminal (e.g., voice, character and image), a subscriber can easily and clearly perceive various kinds of communication status of the IP network.

Obviously, the present invention is not limitedly applicable to the VoIP system, but is generically applicable to various other kinds of communication system.

DESCRIPTION OF THE PREFERRED EMBODIMENTS (A) Description of Aspects of the Invention:

First of all, several fundamental aspects of the present invention will now be described with reference to FIGS. 1–4.

In the following description, a VoIP system (a VoIP communication system) is supposed as an example of such communication system. Also, an IP network (an IP communication network) is supposed as an example of such network (communication network) accordingly.

Figure 1:
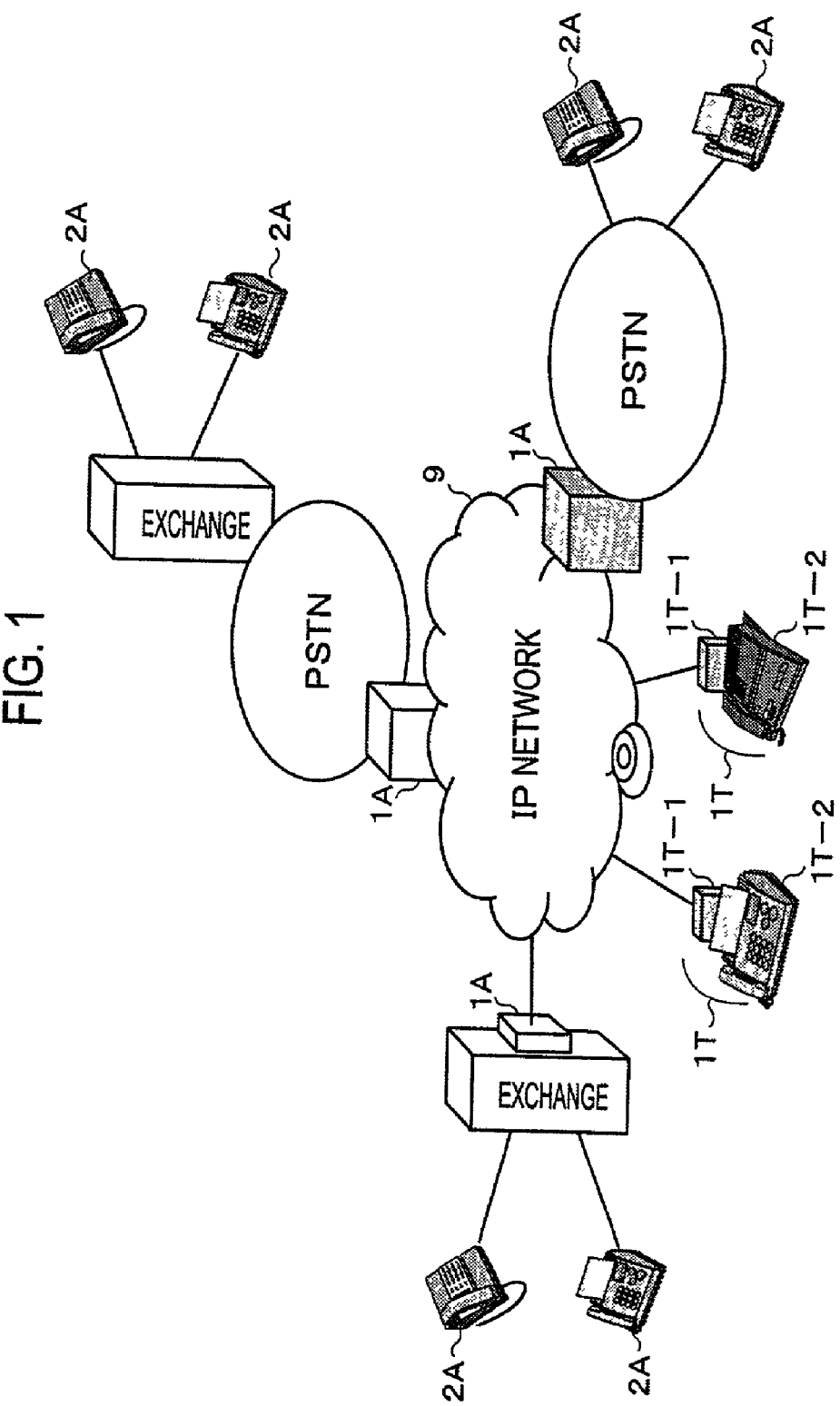
FIG. 1 illustrates a VoIP communication system to which the present invention is applied.

FIG. 1 illustrates a VoIP communication system to which a communication-status notification apparatus or a communication-status display apparatus according to the present invention is applied. In the VoIP communication system, an IP network (IP communication network) 9 is connected with plural sets of VoIP gateway equipment 1A (for example, a gateway or a router) and with VoIP gateway terminals 1T, and at least one subscriber terminal 2A is connected to each of the VoIP gateway equipment 1A, so that each subscriber terminal 2A or each VoIP gateway terminal 1T sends/receives voice data over the IP network 9.

Each of the VoIP gateway terminals 1T has a VoIP-gateway mechanism 1T-1 and a subscriber-terminal mechanism 1T-2. In the following description, each set of the VoIP gateway equipment 1A and the VoIP-gateway mechanism 1T-1 of each of the VoIP gateway terminals 1T are generically referred to as VoIP gateway equipment 1 when not specified as either of the VoIP gateway equipment 1A or the VoIP-gateway mechanism 1T-1. Likewise, each of the subscriber terminals 2A and the subscriber-terminal mechanism 1T-2 of each of the VoIP gateway terminals 1T are generically referred to as a subscriber terminal 2.

A communication-status notification apparatus according to the present invention is adapted to be incorporated in the VoIP gateway equipment 1 (for example, a gateway or a router) in the VoIP communication system as shown in FIG. 1. The VoIP gateway equipment 1 serves a voice-data sending/receiving function by creating/analyzing an IP packet as a voice data transmission medium.

Figure 2:
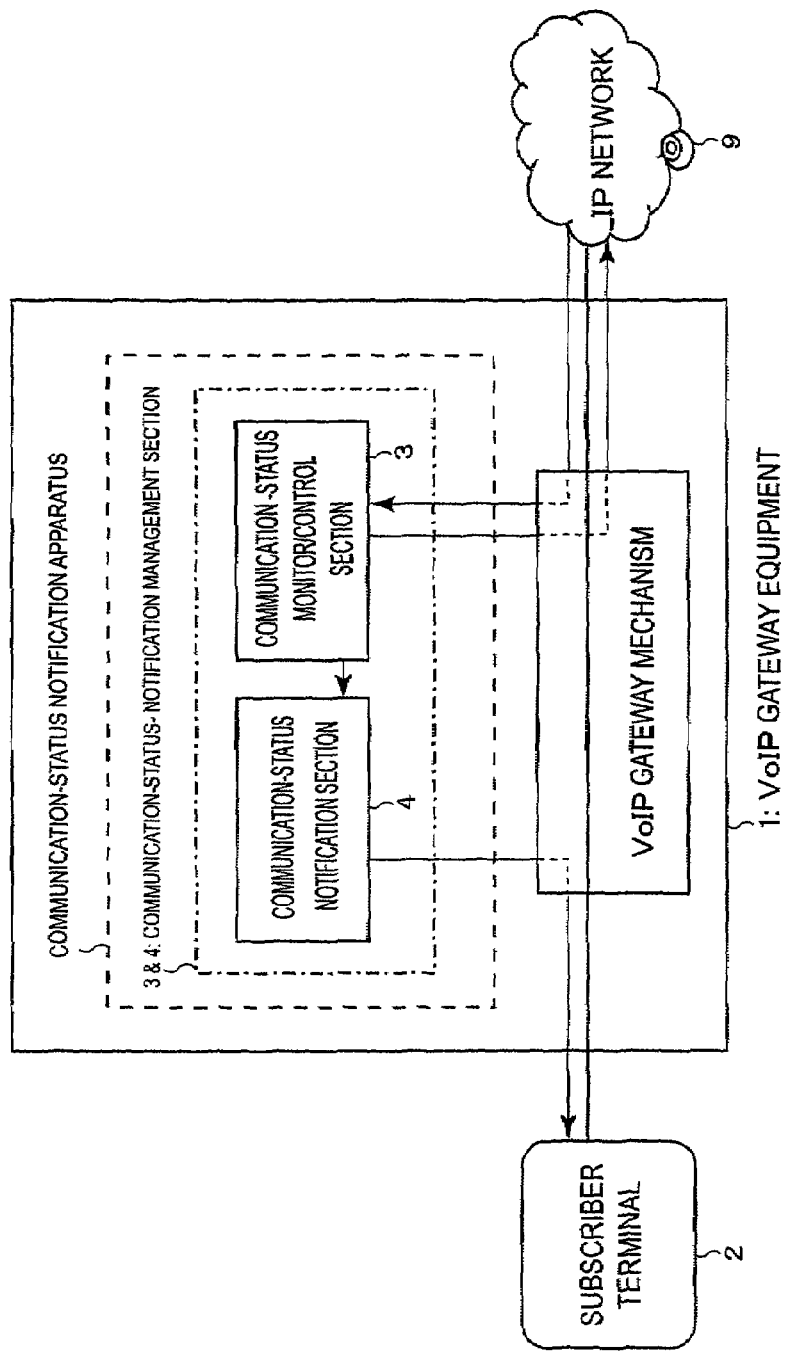
FIG. 2 is a block diagram showing a communication-status notification apparatus according to an aspect of the invention.

According to one aspect of the present invention, as shown in FIG. 2, a communication-status notification apparatus is equipped with a communication-status-notification management section 3&4 for notifying the subscriber terminal 2 connected to the VoIP gateway equipment 1 of a communication status in the IP network 9 via the VoIP gateway equipment 1, based on a processing status of the voice data in the VoIP gateway equipment 1.

With this arrangement, the VoIP gateway equipment 1 notifies the subscriber terminal 2 connected to the VoIP gateway equipment 1 of the communication status of the IP network 9 monitored/controlled in the VoIP gateway equipment 1, so that a subscriber to the VoIP communication system can observe various kinds of communication status of voice data in the IP network easily via the subscriber's own terminal 2.

Preferably, the communication-status-notification management section 3&4 combines the function of a communication-status monitor/control section 3 and the function of a communication-status notification section 4.

The communication-status monitor/control section 3 has a function of monitoring/controlling the communication status of the IP network 9, based on the processing status of the voice data in the VoIP gateway equipment 1. The communication-status notification section 4 has a function of notifying the subscriber terminal 2 of the communication status monitored/controlled by the communication-status monitor/control section 3 via the VoIP gateway equipment 1.

Figure 3:
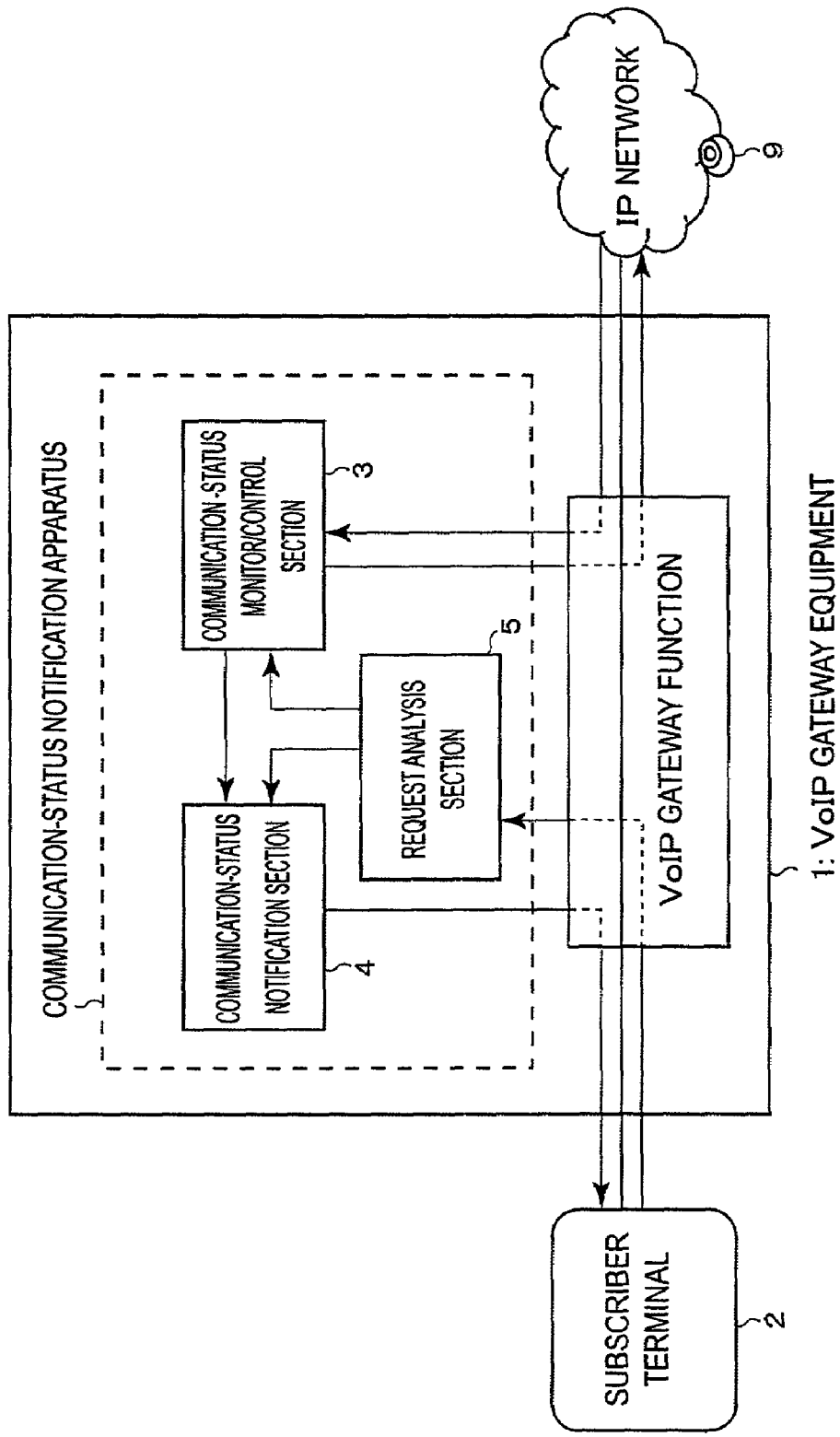
FIG. 3 is a block diagram showing a communication-status notification apparatus according to another aspect of the invention.

According to another aspect of the present invention as shown in FIG. 3, a communication-status notification apparatus has a request analysis section 5, in addition to the communication-status monitor/control section 3 and the communication-status notification section 4 as described above.

The request analysis section 5 discriminates whether or not voice data received by the VoIP gateway equipment 1 from the subscriber terminal 2 connected to the VoIP gateway equipment 1 contains a request on monitoring/controlling or notifying of a communication status in the IP network 9, and analyzes the content of the request contained in the voice data received from the subscriber terminal 2.

Each of the communication-status monitor/control section 3 and the communication-status notification section 4 carries out the functions as described above, in response to the content of the request analyzed by the request analysis section 5.

With this arrangement, when the subscriber terminal 2 sends a request regarding monitor/control of communication status or notification of communication status to the VoIP gateway equipment 1 as a form of voice data, the VoIP gateway equipment 1 analyzes the content of the request and carries out the monitor/control of communication status or the notification of communication status to the subscriber terminal 2 according to the analyzed content of the request, so that a subscriber can control the details of the monitor/control of various kinds of communication status or the content of the notification of communication status easily via the subscriber's own terminal 2.

Preferably, the communication-status monitor/control section 3 starts or stops the monitor/control of the communication status according to the content of the request analyzed by the request analysis section 5 when the content of the request is related with starting or stopping of the monitor/control of the communication status.

With this arrangement, a subscriber can easily start/stop the monitor/control of various kinds of communication status of the IP network 9, simply by use of the subscriber's own terminal 2.

Also preferably, the communication-status notification section 4 starts or stops, when the content of the request analyzed by the request analysis section 5 is related with starting or stopping of the notification of the communication status, the notification of the communication status according to the content of the request, and notifies, when the content of the request analyzed by the request analysis section 5 is related with selecting of a kind of the communication status to be notified, of the selected kind of the communication status according to the content of the request.

With this arrangement, a subscriber can easily start/stop the notification of various kinds of communication status of the IP network 9, or easily select a kind of communication status of the IP network 9 of which kind the subscriber want to be notified, simply by use of the subscriber's own terminal 2.

As another preferable feature, the communication-status notification section 4 includes a notification-material storage section for storing at least one of voice, character and image as notification materials, and notifies of communication status using the notification materials stored in the notification-material storage section.

With this arrangement, since the communication status of the IP network 9 is sent to and displayed on the subscriber terminal 2, a subscriber can easily and clearly perceive various kinds of communication status of the IP network 9.

As still another preferable feature, the communication-status monitor/control section 3 includes a traffic-status monitor/control section for monitoring/controlling a traffic status in the IP network 9 as one aspect of monitor/control of the communication status, based on a sending/receiving status of IP packets in the VoIP gateway equipment 1.

With this arrangement, a subscriber can easily perceive the traffic status of the IP network 9, and also can easily control the details of the monitor/control or the notification of the traffic status of the IP network 9, simply by use of the subscriber's own terminal 2.

Preferably, the traffic-status monitor/control section includes: a traffic-information request section for requesting each of one or more routers, which are included in the IP network 9, to send to the VoIP gateway equipment 1 information about the traffic status in each of the routers, by transmitting a request signal to each of the routers via the VoIP gateway equipment 1; a traffic-information obtaining section for obtaining the information about the traffic status, which has been sent from each of the routers in response to the request signal transmitted by the traffic-information request section, out of various data received by the VoIP gateway equipment 1; and a traffic-status analysis section for analyzing the traffic status of the IP communication network based on the traffic-status information obtained by the traffic-information obtaining section.

With this arrangement, it is possible to monitor the traffic status of the IP network 9 with a simple structure, utilizing effectively a monitoring function of a received IP packet, which function is equipped with the conventional VoIP gateway equipment.

Also preferably, the traffic-status monitor/control section includes: a test-packet sending section for sending one or more test IP packets to other VoIP gateway equipment 1, which is connected to the IP network 9 and serves as a companion with the VoIP gateway equipment 1 for voice data transmission, via the VoIP gateway equipment 1; a test-packet retrieving section for retrieving the individual test IP packets, which have been sent back from the companion VoIP gateway equipment 1, via the VoIP gateway equipment 1; and a traffic-status analysis section for analyzing the traffic status of the IP network 9, based on the retrieving status of the test IP packets by the test-packet retrieving section.

With this arrangement, it is possible to monitor the traffic status of the IP network 9 with a simple structure, utilizing effectively a function for monitoring a received IP packet, which function is equipped with the conventional VoIP gateway equipment.

It is also preferable that the traffic-status monitor/control section includes a communication-quality evaluation section for evaluating communication quality of voice data transmitted over the IP network 9, based on the traffic status monitored by the traffic-status monitor/control section, and that the communication-status notification section 4 notifies the subscriber terminal 2 of information about the communication quality of voice data evaluated by the communication-quality evaluation section.

With this arrangement, a subscriber can easily perceive the communication quality of voice data in the IP network 9, simply by use of the subscriber's own terminal 2.

More preferably, the traffic-status monitor/control section includes a bandwidth-alteration request section, responsive to the communication quality of voice data evaluated by the communication-quality evaluation section, for requesting each of one or more routers, which are included in the IP network 9, to alter a bandwidth to be used for voice data transmission, by transmitting a request signal to each of the routers via the VoIP gateway equipment 1.

With this arrangement, a subscriber can easily take measures to improve the communication quality of voice data, simply by use of the subscriber's own terminal 2.

As still another preferable feature, the communication-status monitor/control section 3 includes a cryptographic-processing-status monitor/control section for monitoring/controlling a cryptographic-processing status of voice data transmitted over the IP network 9 as one aspect of monitor/control of the communication status.

With this arrangement, a subscriber can easily perceive the cryptographic-processing status of voice data transmitted over the IP network 9, and also can easily control the details of the monitor/control or notification of the cryptographic-processing status of voice data, simply by use of the subscriber's own terminal 2.

It is preferable that the cryptographic-processing-status monitor/control section includes a cryptographic-processing section for cryptographic-processing voice data sent/received by the VoIP gateway equipment 1, and that the communication-status notification section 4 is operable to notify the subscriber terminal 2 of the cryptographic-processing status of voice data by the cryptographic-processing section.

With this arrangement, a subscriber can easily set/reset the cryptographic processing of voice data by the cryptographic-processing section, and also can perceive the cryptographic-processing status of voice data by the cryptographic-processing section, simply by use of the subscriber's own terminal 2.

More preferably, the cryptographic-processing section carries out at least one of scramble, encryption and interleave as the cryptographic process.

With this arrangement, a subscriber can easily select an optimum cryptographic process to be carried out on voice data from several cryptographic processes, which are commonly used in a conventional data communication, simply by use of the subscriber's own terminal 2.

It is also preferable that the cryptographic-processing-status monitor/control section further includes a cryptographic-processing-status monitor section for monitoring a cryptographic-processing status of voice data by other VoIP gateway equipment 1, which is connected to the IP network 9 and serves as a companion with the VoIP gateway equipment 1 for voice data transmission, based on a transmission status of IP packets between the VoIP gateway equipment 1 and the companion VoIP gateway equipment 1, and that the cryptographic-processing section carries out the cryptographic-processing in accordance with the cryptographic-processing status of the companion VoIP gateway equipment 1 monitored by the cryptographic-processing-status monitor section.

With this arrangement, a subscriber can perceive cryptographic-processing status carried out in the companion VoIP gateway equipment 1, and also can set the cryptographic processing of voice data in the VoIP gateway equipment 1, simply by use of the subscriber's own terminal 2.

In addition to the communication-status notification apparatus as described above, there is also provided a communication apparatus (such as a VoIP gateway terminal 1T in FIG. 1) according to an aspect of the present invention, which includes the communication-status notification mechanism substantially equivalent to the above-described communication-status notification apparatus.

In the meantime, a communication-status display apparatus according to the present invention is incorporated in the subscriber terminal 2 used in the VoIP communication system as shown in FIG. 1.

Figure 4:
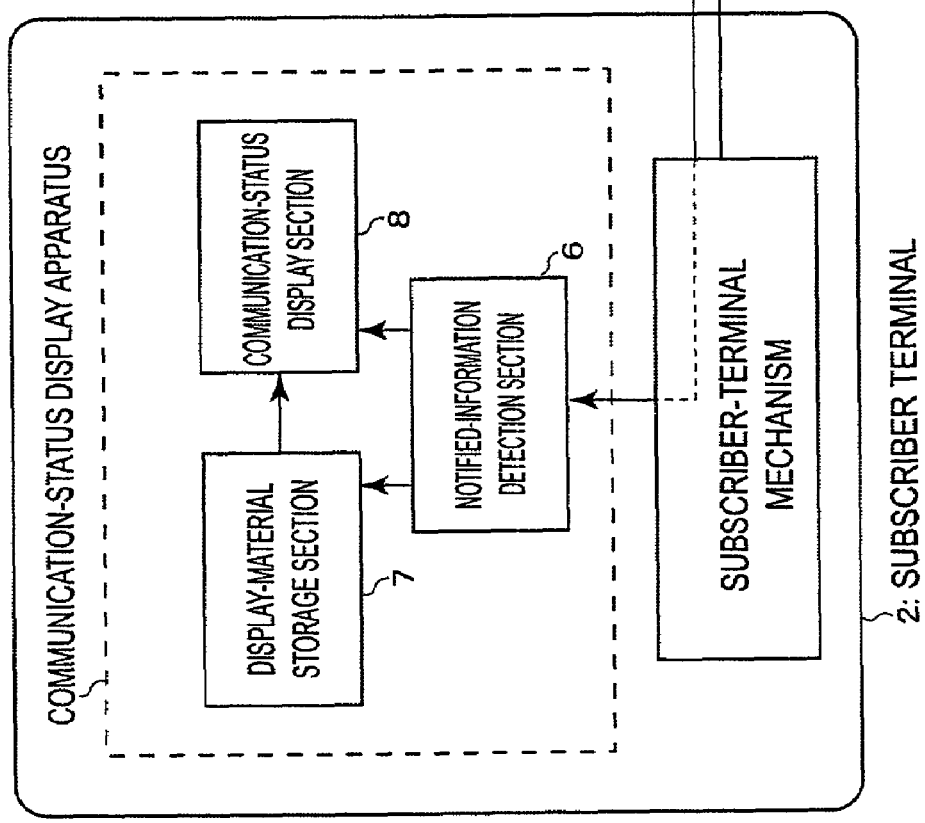
FIG. 4 is a block diagram showing a communication-status display apparatus according to a further aspect of the invention.

According to an aspect of the present invention, as shown in FIG. 4, the communication-status display apparatus is equipped with a notified-information detection section 6, a display-material storage section 7 and a communication-status display section 8.

The notified-information detection section 6 detects information about the communication status of the IP network 9, which status is monitored/controlled by the VoIP gateway equipment 1 connected to the subscriber terminal 2, when the subscriber terminal 2 is notified of the communication-status information from the VoIP gateway equipment 1.

The display-material storage section 7 stores at least one of voice, character and image as display materials.

The communication-status display section 8 displays the communication status of the IP network 9, based on the communication-status information detected by the notified-information detection section 6, using the display materials stored in the display-material storage section.

With this arrangement, the communication status notified of by the VoIP gateway equipment is displayed on the subscriber terminal, a subscriber can easily and clearly perceive various kinds of communication status of the IP network.

In the meantime, a communication-status notification method according to the present invention is used for notifying at least one subscriber terminal 2 of a communication status in an IP network 9 of a VoIP communication system as shown in FIG. 1, in which system the subscriber terminal 2 is connected to the IP network 9 via VoIP gateway equipment 1, serving to create/analyze an IP packet as a voice data transmission medium, so that the subscriber terminal 2 sends/receives voice data over the IP network 9.

According to one aspect of the present invention, the communication-status notification method is carried out at the VoIP gateway equipment 1 connected with the subscriber terminal 2 and includes the steps of:

(a) monitoring/controlling the communication status of the IP network 9, based on a processing status of voice data in the VoIP gateway equipment 1; and (b) notifying the subscriber terminal 2 of the communication status monitored/controlled in the step (a).

With this feature, the VoIP gateway equipment 1 notifies the subscriber terminal 2 connected to the VoIP gateway equipment 1 of the communication status of the IP network 9 monitored/controlled in the VoIP gateway equipment 1, so that a subscriber to the VoIP communication system can observe various kinds of communication status of voice data in the IP network easily via the subscriber's own terminal 2.

According to another aspect of the present invention, the communication-status notification method includes the steps of:

at the subscriber terminal 2, (a) sending to the VoIP gateway equipment 1 connected with the subscriber terminal 2 a request on monitoring/controlling or notifying of a communication status of the IP network 9, wherein the request is contained in voice data transmitted over the IP network 9;

at the VoIP gateway equipment 1, (b) discriminating whether or not voice data received from the subscriber terminal 2 contains the request sent by the subscriber terminal 2 in the step (a), and analyzing the content of the request contained in the voice data received from the subscriber terminal 2;

(c) in response to the content of the request analyzed in the step (b), monitoring/controlling the communication status of the IP network 9, based on a processing status of the voice data in the VoIP gateway equipment 1; and (d) in response to the content of the request analyzed in the step (b), notifying the subscriber terminal 2 of the communication status monitored/controlled in the step (c).

With this feature, when the subscriber terminal 2 sends a request regarding monitor/control of communication status or notification of communication status to the VoIP gateway equipment 1 as a form of voice data, the VoIP gateway equipment 1 analyzes the content of the request and carry out the monitor/control of communication status or the notification of communication status to the subscriber terminal 2 according to the analyzed content of the request, so that a subscriber can control the details of the monitor/control or notification of various kinds of communication status easily via the subscriber's own terminal 2.

In the meantime, a recording medium according to the present invention, in which a communication-status notification program is recorded, is used in a VoIP gateway equipment 1 of a VoIP communication system shown in FIG. 1, in which at least one subscriber terminal 2 is connected to an IP network 9 via the VoIP gateway equipment 1, serving to create/analyze an IP packet as a voice data transmission medium, so that the subscriber terminal 2 sends/receives voice data over the IP network 9.

According to one aspect of the present invention, the communication-status notification program recorded in the subject medium instructs the VoIP gateway equipment 1 to function as:

means for monitoring/controlling a communication status in the IP network 9, based on a processing status of voice data in the VoIP gateway equipment 1; and means for notifying the subscriber terminal 2 connected to the VoIP gateway equipment 1 of the communication status of the IP network 9, which is monitored/controlled by the monitoring/controlling means, via the VoIP gateway equipment 1.

With this feature, the VoIP gateway equipment 1 notifies the subscriber terminal 2 connected to the VoIP gateway equipment 1 of the communication status of the IP network 9 monitored/controlled in the VoIP gateway equipment 1, so that a subscriber to the VoIP communication system can observe various kinds of communication status of voice data in the IP network 9 easily via the subscriber's own terminal 2.

According to another aspect of the present invention, the communication-status notification program recorded in the subject medium instructs the VoIP gateway equipment 1 to function as:

means for discriminating whether or not voice data received by the VoIP gateway equipment 1 from the subscriber terminal 2 connected with the VoIP gateway equipment 1 contains a request on monitoring/controlling or notifying of a communication status in the IP network 9, and for analyzing the content of the request contained in the voice data received from the subscriber terminal 2;

means, responsive to the content of the request analyzed by the discriminating and analyzing means, for monitoring/controlling the communication status of the IP network 9, based on the processing status of the voice data in the VoIP gateway equipment 1; and means, responsive to the content of the request analyzed by the discriminating and analyzing means, for notifying the subscriber terminal 2 of the communication status, which is monitored/controlled by the monitoring/controlling means, via the VoIP gateway equipment 1.

With this feature, when the subscriber terminal 2 sends a request regarding monitor/control of communication status or notification of communication status to the VoIP gateway equipment 1 as a form of voice data, the VoIP gateway equipment 1 analyzes the content of the request and carry out the monitor/control or notification of the communication status to the subscriber terminal 2 according to the analyzed content of the request, so that a subscriber can control the details of the monitor/control of communication status or the notification of communication status easily via the subscriber's own terminal 2.

(B) Description of the Preferred Embodiments:

In the following, preferred embodiments of the present invention will be described with reference to the drawings.

(1) Description of First Embodiment of the Present Invention:

FIG. 1 shows a VoIP communication system including VoIP gateway equipment 1A, in which a communication-status notification apparatus according to the present invention is incorporated.

Already referred to in the description of the aspects of the present invention, the VoIP communication system shown in FIG. 1 is again referred to for describing a first embodiment of the present invention, because the VoIP communication system is similar to that of the first embodiment in that: an IP network 9 is connected with plural sets of VoIP gateway equipment 1A and with VoIP gateway terminals 1T, and at least one subscriber terminal 2A is connected to each of the VoIP gateway equipment 1A, so that each subscriber terminal 2A or each VoIP gateway terminal 1T sends/receives voice data over the IP network 9.

Not shown in FIG. 1, one or more routers are provided in the IP network 9, for transmitting IP packets containing voice data, which is sent/received by plural subscriber terminals 2 each connected to the IP network 9 via VoIP gateway equipment 1, and also for controlling routing of the IP packets in association with the transmission of the IP packets, so that the plural subscriber terminals 2 can interchange the IP packets.

In the meantime, a communication status in an IP network, which is to be monitored/controlled or notified by the communication-status notification apparatus according to the present invention, means various kinds of information regarding communication quality of voice data over the IP network. The communication-status notification apparatus according to the embodiment has an arrangement so as to cope with two kinds of communication status as actual examples of such communication status of the IP network: a status of traffic of voice data (traffic status of voice data) in the IP network; and a status of cryptographic-processing carried out on voice data (cryptographic-processing status of voice data).

(1-1) Description of Arrangements According to the First Embodiment of the Present Invention:

(i) Description of Arrangement of VoIP Gateway Equipment Provided with Communication-Status Notification Apparatus According to the First Embodiment of the Present Invention FIGS. 5–8 are block diagrams each showing VoIP gateway equipment incorporated with the communication-status notification apparatus according to the first embodiment of the present invention.

Figure 5:
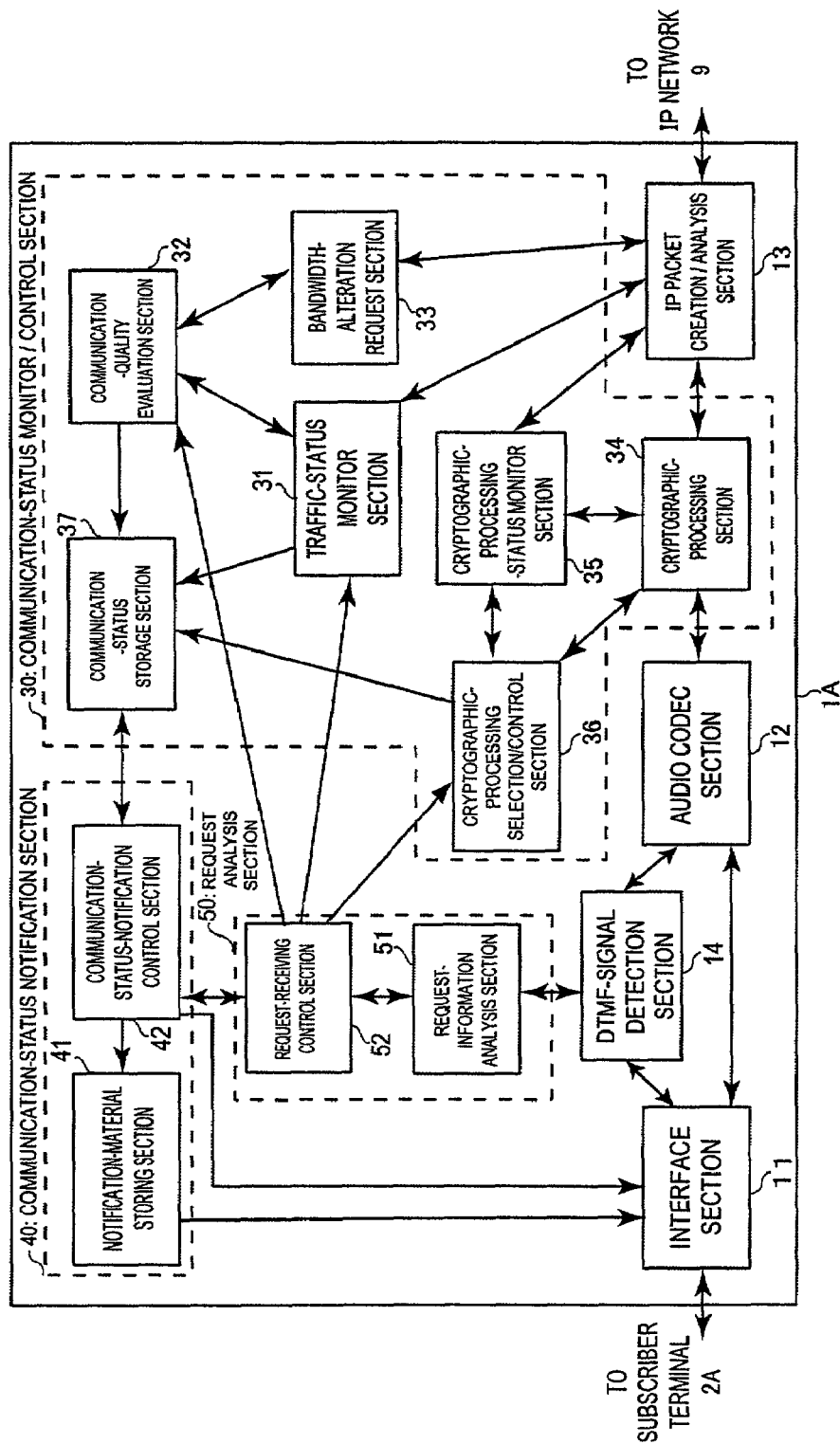
FIG. 5 is a block diagram showing VoIP gateway equipment incorporated with a communication-status notification apparatus according to a first embodiment of the present invention.

In FIG. 5, the VoIP gateway equipment is equivalent to, for example, the VoIP gateway equipment 1A shown in FIG. 1, being equipped with the VoIP-gateway mechanism for transmitting voice data by converting a voice signal into IP packets, and vice versa, and also with a mechanism for notifying the communication status according to the present invention (the communication-status notification apparatus).

The VoIP gateway equipment 1A shown in FIG. 5 includes several components to serve as the VoIP-gateway mechanism: an interface section 11, an audio CODEC section 12, an IP-packet creation/analysis section 13 and a dial-tone-multi-frequency-signal (DTMF-signal) detection section 14.

The interface section 11 is connected to an external device, such as a PBX trunk, and carries out an interface process on a voice signal in relation with input/output of the voice signal between the VoIP gateway equipment 1A and the external device. The audio CODEC section 12 carries out compression/decompression process (CODEC process) of voice data associated with the voice signal interface-processed in the interface section 11 or IP-packetized/IP-depacketized in the IP-packet creation/analysis section 13. The IP-packet creation/analysis section 13 carries out IP-packetization/IP-depacketization (creation/analysis of IP packets) of the voice signal compression/decompression-processed by the audio CODEC section 12, and is connected to the IP network 9 so as to send/receive IP packets to/from the IP network 9.

The DTMF-signal detection section 14 detects dial-tone-multi-frequency signal (DTMF signal) out of signals that are interface-processed in the interface section 11.

With this arrangement, when inputted to the interface section 11, the voice signal is compression-processed by the audio CODEC section 12, then IP-packetized by the IP-packet creation/analysis section 13 to be converted into IP packets, and finally sent out to the IP network. Also, when received from the IP network, IP packets are depacketized by the IP-packet creation/analysis section 13 to be converted into a voice signal, then decompression-processed by the audio CODEC section 12, and finally outputted from the interface section 11.

In the meantime, the function of each of the components associated with the VoIP-gateway mechanism varies slightly according to a kind of the VoIP gateway equipment 1A.

If the VoIP gateway equipment 1A is a VoIP gateway apparatus, for example, the interface section 11 is connected to a PSTN or an ISDN, or a subscriber terminal such as a telephone, and carries out input/output-interface process on an analog voice signal or a digital voice signal.

If the VoIP gateway equipment 1A is a VoIP trunk, the interface section 11 is connected to an exchange such as a PBX and carries out input/output-interface process on a voice signal (such as an analog voice signal, a digital voice signal or a signal which is used in a common signaling system on the D channel and transmitted between two exchanges), and the IP-packet creation/analysis section 13 carries out IP-packetization/IP-depacketization of the voice signal received from the exchange and interface-processed by the interface section 11.

A voice signal actually undergoes various processes other than the above-mentioned processes in relation with the VoIP-gateway mechanism, such as a voice-addition/level-control process or, if the voice signal from the subscriber terminal is an analog voice signal, an encoding/decoding process, which processes are omitted as functional blocks in FIG. 5.

In addition to the above-mentioned components associated with the VoIP-gateway mechanism, the VoIP gateway equipment 1A in FIG. 5 further has components to function as the communication-status notification apparatus according to the present invention: a communication-status monitor/control section 30, a communication-status notification section 40 and a request analysis section 50.

The communication-status monitor/control section 30 monitors/controls a communication status in the IP network 9, based on the processing status of voice data in the VoIP gateway equipment 1A. The communication-status notification section 40 notifies the subscriber terminal 2A of the communication status monitored/controlled by the communication-status monitor/control section 30 via the VoIP gateway equipment 1A.

The request analysis section 50 discriminates whether or not voice data received by the VoIP gateway equipment 1A from the connected subscriber terminal 2A contains a request on monitoring/controlling or notifying of the communication status of the IP network 9, and analyzes the content of the request contained in the voice data received from the subscriber terminal 2A. The communication-status monitor/control section 30 and the communication-status notification section 40 carry out the monitoring/controlling or notifying in response to the content of the request analyzed by the analysis section 50.

The communication-status monitor/control section 30 includes a traffic-status monitor section 31, a communication-quality evaluation section 32, a bandwidth-alteration request section 33, a cryptographic-processing section 34, a cryptographic-processing-status monitor section 35, a cryptographic-processing selection/control section 36 and a communication-status storage section 37.

Figure 6:
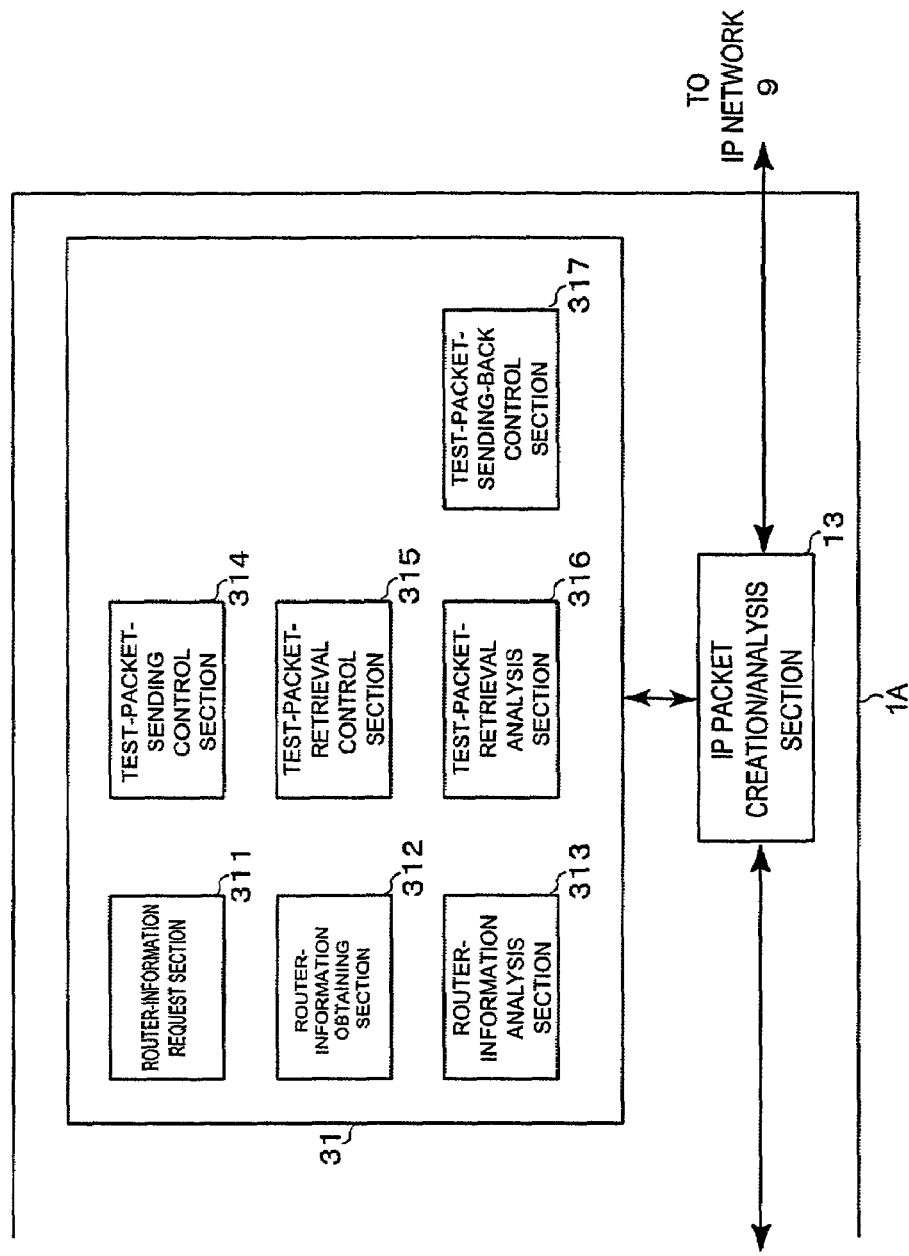
FIG. 6 is a block diagram showing a traffic-status monitor section of the communication-status notification apparatus according to the first embodiment of the present invention.

The traffic-status monitor section 31 monitors a traffic status in the IP network 9 by controlling the IP-packet creation/analysis section 13 and includes a router-information request section 311, a router-information obtaining section 312, a router-information analysis section 313, a test-packet-sending control section 314, a test-packet-retrieval control section 315, a test-packet-retrieval analysis section 316 and a test-packet-sending-back control section 317, as shown in FIG. 6.

The router-information request section 311 controls the IP-packet creation/analysis section 13 to create an information-request IP packet (a request signal), which requests each of one or more routers included in the IP network 9 to send information about the traffic status in each router to the VoIP gateway equipment A1, and to transmit the information-request IP packet to the routers via the IP-packet creation/analysis section 13, thereby requesting each of the routers to send the traffic-status information.

The router-information obtaining section 312 controls the IP-packet creation/analysis section 13 to detect IP packets containing the traffic-status information, which packets were sent from the routers in the IP network 9 in response to the information-request IP packet, out of IP packets received at the IP-packet creation/analysis section 13 from the IP network 9, and obtains the traffic-status information by controlling the depacketizing of the detected IP packets by the IP-packet creation/analysis section 13.

The router-information analysis section 313 analyzes the traffic status of the IP network 9, based on the traffic-status information sent from the routers and obtained by the router-information obtaining section 312.

That is to say, the router-information request section 311, the router-information obtaining section 312 and the router-information analysis section 313, as described above, are included in the traffic-status monitor section 31 (which is a component of a traffic-status monitor/control section as described later), and each functions as, respectively: a traffic-information request section for requesting each of one or more routers included in the IP network 9 to send information about the traffic status in each of the routers to the VoIP gateway equipment 1A, by transmitting a request signal to each of the routers via the VoIP gateway equipment 1A; a traffic-information obtaining section for obtaining the information about the traffic status, which was sent from each of the routers in response to the request signal transmitted by the traffic-information request section, out of various data received by the VoIP gateway equipment 1A; and a traffic-status analysis section for analyzing the traffic status of the IP network 9, based on the traffic-status information obtained by the traffic-information obtaining section.

The test-packet-sending control section 314 of the VoIP gateway equipment 1A controls the IP-packet creation/analysis section 13 to create one or more test IP packets, which contain a signal to request other VoIP gateway equipment 1 to send the packets back to the former VoIP gateway equipment 1A when the later VoIP gateway equipment 1 receives the packets, and to send the created test IP packets over the IP network to the later VoIP gateway equipment 1, which is connected to the IP network 9 and serves as a companion to the VoIP gateway equipment 1A for voice data transmission.

The test-packet-retrieval control section 315 controls the IP-packet creation/analysis section 13 to detect the individual test IP packets, which were first sent out from the former VoIP gateway equipment 1A and then sent back from the later VoIP gateway equipment 1 (companion VoIP gateway equipment), out of IP-packets received from the IP network 9 by the IP-packet creation/analysis section 13 so as to retrieve the test IP packets, and to monitor a retrieving state of the test IP packets in the IP-packet creation/analysis section 13.

The test-packet-retrieval analysis section 316 analyzes the traffic status of the IP network 9, based on the retrieving status of the test IP packets monitored by the test-packet-retrieval control section 315.

That is to say, the test-packet-sending control section 314, the test-packet-retrieval control section 315 and the test-packet-retrieval analysis section 316 as described above are included in the traffic-status monitor section 31 (which is a component of a traffic-status monitor/control section as described later) of the VoIP gateway equipment 1A, and each functions as, respectively: a test-packet sending section for sending one or more test IP packets via the VoIP gateway equipment 1A to other VoIP gateway equipment 1, which is connected to the IP network 9 and serves as a companion to the former VoIP gateway equipment 1A for voice data transmission; a test-packet retrieving section for retrieving the individual test IP packet, which has been sent back from the later (companion) VoIP gateway equipment 1, out of IP packets received by the former VoIP gateway equipment 1A; and a traffic-status analysis section for analyzing the traffic status of the IP network 9, based on the retrieving status of the test IP packets by the test-packet retrieving section.

The test-packet-sending-back control section 317 of the VoIP gateway equipment 1A controls the IP-packet creation/analysis section 13 to detect a test IP packet, which was sent from other VoIP gateway equipment 1A connected to the IP network 9, out of IP packets received from the IP network 9 by the IP-packet creation/analysis section 13 and to send the detected test IP packet back to the later VoIP gateway equipment 1A, from which the test IP packet was sent, in response to a request signal contained in the test IP packet.

With the arrangement as described above, the traffic-status monitor section 31 has a function to monitor a traffic status in the IP network 9.

The communication-quality evaluation section 32 shown in FIG. 5 (which is a component of a traffic-status monitor/control section as described later) evaluates communication quality of voice data transmitted over the IP network 9, based on the traffic status monitored by the traffic-status monitor section 31.

The bandwidth-alteration request section 33 (which is a component of a traffic-status monitor/control section as described later) requests each of one or more routers included in the IP network 9 to alter a bandwidth to be used for voice data transmission in response to the communication quality of voice data evaluated in the communication-quality evaluation section 32, by transmitting a request signal to each of the routers via the VoIP gateway equipment 1A.

Specifically, the bandwidth-alteration request section 33 controls the IP-packet creation/analysis section 13, based on the evaluation of communication quality of voice data in the IP network 9 by the communication-quality evaluation section 32, to create a bandwidth-alteration request IP packet, which contains a signal requesting a router to alter a bandwidth to be used for voice data transmission, and to send the created bandwidth-alteration request IP packet over the IP network 9 to each of the routers in the IP network 9.

The cryptographic-processing section 34 (which is a component of a cryptographic-processing-status monitor/control section as described later) carries out a cryptographic process on voice data sent/received via the IP-packet creation/analysis section 13 of the VoIP gateway equipment 1A and, further, is able to select one of a scramble process, an encryption process and an interleave process as the cryptographic process.

Figure 7:
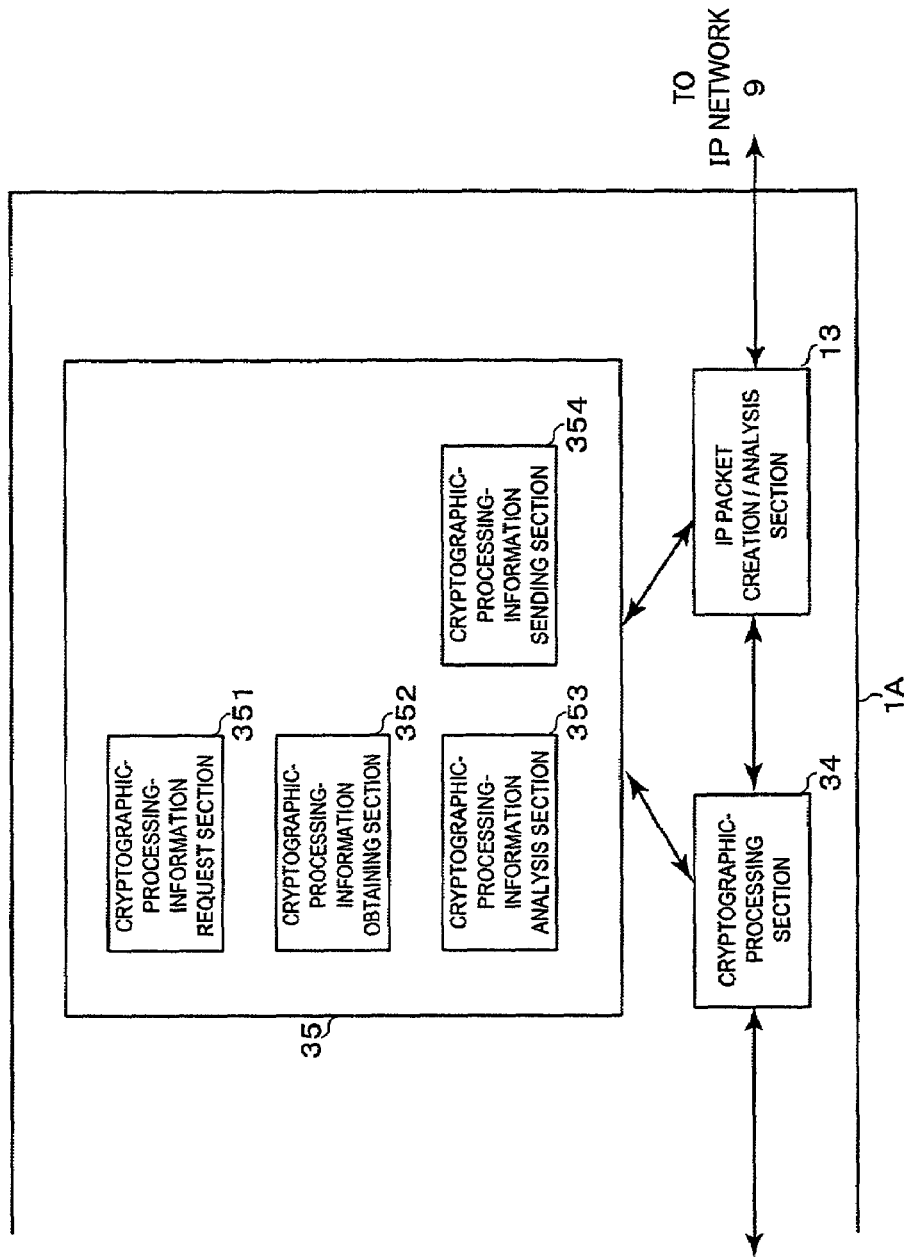
FIG. 7 is a block diagram showing a cryptographic-processing-status monitor section of the communication-status notification apparatus according to the first embodiment of the present invention.

The cryptographic-processing-status monitor section 35 (which is a component of a cryptographic-processing-status monitor/control section as described later) controls the IP-packet creation/analysis section 13 to monitor a status of cryptographic processing for data transmission by other VoIP gateway equipment 1A connected to the IP network 9. As shown in FIG. 7, the cryptographic-processing-status monitor section 35 includes a cryptographic-processing-information request section 351, a cryptographic-processing-information obtaining section 352, a cryptographic-processing-information analysis section 353 and a cryptographic-processing-information sending section 354.

The cryptographic-processing-information request section 351 of the VoIP gateway equipment 1A controls the IP-packet creation/analysis section 13 to create one or more cryptographic-processed-data IP packets, containing data on which one of the scramble process, the encryption process and the interleave process is carried out as the cryptographic process, and one or more cryptographic-processing-request IP packets, containing a signal requesting other VoIP gateway equipment 1A, connected to the IP network 9, to decipher the cryptographic-processed data and to send back the deciphered data, and to send these cryptographic-processed-data IP packets and the cryptographic-processing-request IP packets over IP network 9 toward the later VoIP gateway equipment 1A.

The cryptographic-processing-information obtaining section 352 controls the IP-packet creation/analysis section 13 to detect one or more IP packets, which contain deciphered data of the cryptographic-processed-data IP packets and are sent from other VoIP gateway equipment 1A connected to the IP network 9 in response to the cryptographic-processing-request IP packets, out of IP packets received at the IP-packet creation/analysis section 13 from the IP network 9, and obtains the deciphered data by controlling the depacketizing of the detected IP packets by the IP-packet creation/analysis section 13.

The cryptographic-processing-information analysis section 353 analyzes a cryptographic-processing status by the other VoIP gateway equipment 1A, based on the deciphered data sent from the other VoIP gateway equipment 1A and received by the cryptographic-processing-information obtaining section 352.

The cryptographic-processing-information sending section 354 controls the IP-packet creation/analysis section 13 to detect cryptographic-processed-data IP packets and cryptographic-processing-request IP packets, both of which are received from other VoIP gateway equipment 1A connected to the IP network 9, out of IP packets received from the IP network 9 by the IP-packet creation/analysis section 13. In response to a request signal contained in the cryptographic-processing-request IP packets, the cryptographic-processing-information sending section 354 deciphers cryptographic-processed data contained in the cryptographic-processed-data IP packets and then controls the IP-packet creation/analysis section 13 to create IP packets containing the deciphered data of the cryptographic-processed data and to send the created IP packets to the other VoIP gateway equipment 1A, from which the cryptographic-processed-data IP packets and the cryptographic-processing-request IP packets were sent.

With the arrangement as described above, the cryptographic-processing-status monitor section 35 of the VoIP gateway equipment 1A has a function to monitor a cryptographic-processing status of voice data by other VoIP gateway equipment 1A, which is connected to the IP network 9 and serves as a companion to the former VoIP gateway equipment 1A for voice data transmission, based on a transmission status of IP packets between the former VoIP gateway equipment 1A and the later (companion) VoIP gateway equipment.

The cryptographic-processing selection/control section 36 (which is a component of a cryptographic-processing-status monitor/control section as described later) selects a kind of cryptographic process for data transmission to be carried out by the cryptographic-processing section 34, and controls the cryptographic processing by the cryptographic-processing section 34, in accordance with the cryptographic-processing status in the other VoIP gateway equipment 1A monitored by the cryptographic-processing-status monitor section 35.

The communication-status storage section 37 stores the traffic status of the IP network 9 monitored by the traffic-status monitor section 31, the communication quality of voice data evaluated by the communication-quality evaluation section 32 and the result of selection and control of cryptographic processing by the cryptographic-processing selection/control section 36.

That is to say, the traffic-status monitor section 31, the communication-quality evaluation section 32, the bandwidth-alteration request section 33 and the communication-status storage section 37 combine to function as a traffic-status monitor/control section for monitoring/controlling a traffic status in the IP network 9 as one aspect of monitor/control of the communication status, based on a sending/receiving status of IP packets in the VoIP gateway equipment 1A.

Further, the cryptographic-processing section 34, the cryptographic-processing-status monitor section 35, the cryptographic-processing selection/control section 36 and the communication-status storage section 37 combine to function as a cryptographic-processing-status monitor/control section for monitoring/controlling a cryptographic-processing status of voice data transmitted over the IP network 9 as another aspect of monitor/control of the communication status.

Accordingly, with the arrangement as described above, the communication-status monitor/control section 30 functions to monitor/control the communication status of the IP network 9, based on the processing status of the voice data in the VoIP gateway equipment 1A.

In the meantime, the communication-status notification section 40 has a notification-material storing section 41 and a communication-status-notification control section 42.

The notification-material storing section 41 stores at least one of voice, character and image as notification materials indicating the traffic status of the IP network 9 monitored by the traffic-status monitor section 31, the communication quality of voice data evaluated by the communication-quality evaluation section 32 and the result of selection and control of cryptographic processing by the cryptographic-processing selection/control section 36, which are stored in the communication-status storage section 37.

The communication-status-notification control section 42 notifies the subscriber terminal 2A via the interface section 11 of the traffic status of the IP network 9 monitored by the traffic-status monitor section 31, the communication quality of voice data evaluated by the communication-quality evaluation section 32 and the result of selection and control of cryptographic processing by the cryptographic-processing selection/control section 36, which are stored in the communication-status storage section 37, using the notification materials stored in the notification-material storing section 41.

The communication-status-notification control section 42 is also operable to notify the subscriber terminal 2A of the various kinds of information stored in the communication-status storage section 37 in the form of voice signal by controlling directly the interface section 11.

The communication-status-notification control section 42 is further operable to recognize a kind of the subscriber terminal 2A connected to the interface section 11, by monitoring a voice signal that undergoes the input/output process by the interface section 11.

With the arrangement as described above, the communication-status notification section 40 has a function to notify the subscriber terminal 2A of the communication status monitored/controlled by the communication-status monitor/control section 30 via the VoIP gateway equipment 1A.

Also with the arrangement as described above, the communication-status notification section 40 is equipped with a notification-material storing section 41 for storing at least one of voice, character and image as notification material, and has a function to carry out the notification of communication status, using the notification material stored in the notification-material storing section 41.

Further, with the arrangement as described above, the communication-status notification section 40 has a function to notify the subscriber terminal 2 of the communication quality evaluated by the communication-quality evaluation section 32.

Still further, with the arrangement as described above, the communication-status notification section 40 has a function to notify the subscriber terminal 2 of the result of control of a cryptographic-processing status by the cryptographic-processing selection/control section 36, namely, a cryptographic processing state by the cryptographic-processing section 34.

In the meantime, the request analysis section 50 has a request-information analysis section 51 and a request-receiving control section 52.

The request-information analysis section 51 discriminates whether or not there is a DTMF signal corresponding to a request on monitoring/controlling or notifying of a communication status among DTMF signals detected by the DTMF-signal detection section 14, and analyzes the content of a request if any DTMF signal corresponding to the request is included in the detected DTMF signals.

The request-receiving control section 52 controls each of the monitoring of the traffic status of the IP network 9 by the traffic-status monitor section 31, the evaluation of the communication quality of voice data by the communication-quality evaluation section 32, the selecting/controlling of the cryptographic processing by the cryptographic-processing selection/control section 36 and the notifying of the various kinds of information by the communication-status-notification control section 42, based on the content of the request analyzed by the request-information analysis section 51.

With the arrangement as described above, the request analysis section 50 has a function to discriminate whether or not voice data received by the VoIP gateway equipment 1A from the subscriber terminal 2A contains a request on monitoring/controlling or notifying of a communication status in the IP network 9, a function to analyze the content of the request when the request is contained in the voice data received from the subscriber terminal 2A, and a function to control the communication-status monitor/control section 30 and the communication-status notification section 40 based on the analyzed content of the result.

Also, with the arrangement of the request analysis section 50 as described above, the communication-status monitor/ control section 30 has a function to start or stop the monitor/control of the communication status according to the content of a request analyzed by the request analysis section 50 when the content of the request is related with starting or stopping of the monitor/control of the communication status.

Further, with the arrangement of the request analysis section 50 as described above, the communication-status notification section 50 has a function to start or stop the notification of the communication status according to the content of a request analyzed by the request analysis section 40 when the content of the request is related with starting or stopping of the notification of the communication status.

In addition, the communication-status notification apparatus 40 has a function to notify the subscriber terminal of a selected kind of the communication status according to the content of a request analyzed by the request analysis section 50 when the content of the request is related with selecting of a kind of the communication status to be notified.

In order to incorporate VoIP gateway equipment with the functions of the communication-status monitor/control section 30, the communication-status notification section 40 and the request analysis section 50, a recording medium in which a communication-status notification program and associated data are recorded is usually provided and the program and the associated data is installed in the VoIP gateway equipment. The communication-status notification program instructs the computer to function as: communication-status monitoring/controlling means for the same function as the communication-status monitor/control section 30 (which means has a function to monitor/control the communication status of the IP network 9, based on the processing status of the voice data in the VoIP gateway equipment); communication-status notifying means for the same function as the communication-status notification section 40 (which means has a function to notifying the subscriber terminal 2A of the communication status, which is monitored/controlled by the monitoring/controlling means, via the VoIP gateway equipment 1A); and request analyzing means for the same function as the request analysis section 50 (which means has a function to discriminate whether or not voice data received by the VoIP gateway equipment 1A from the subscriber terminal 2A contains a request on monitoring/controlling or notifying of a communication status in the IP network 9, to analyze the content of a request contained in the voice data received from the subscriber terminal 2A when the request is contained in the received voice data, and to control the communication-status monitoring/controlling means and the communication-status notifying means in response to the content of the analyzed request).

The installation of the program and the associated data is performed by setting a storing medium, such as a floppy disk, an MO (Magneto-Optic) disk, a CD-ROM (compact disk read-only memory), a hard disk or any other various storing apparatuses, in the computer, or by using a program provided through the IP network.

Figure 8:
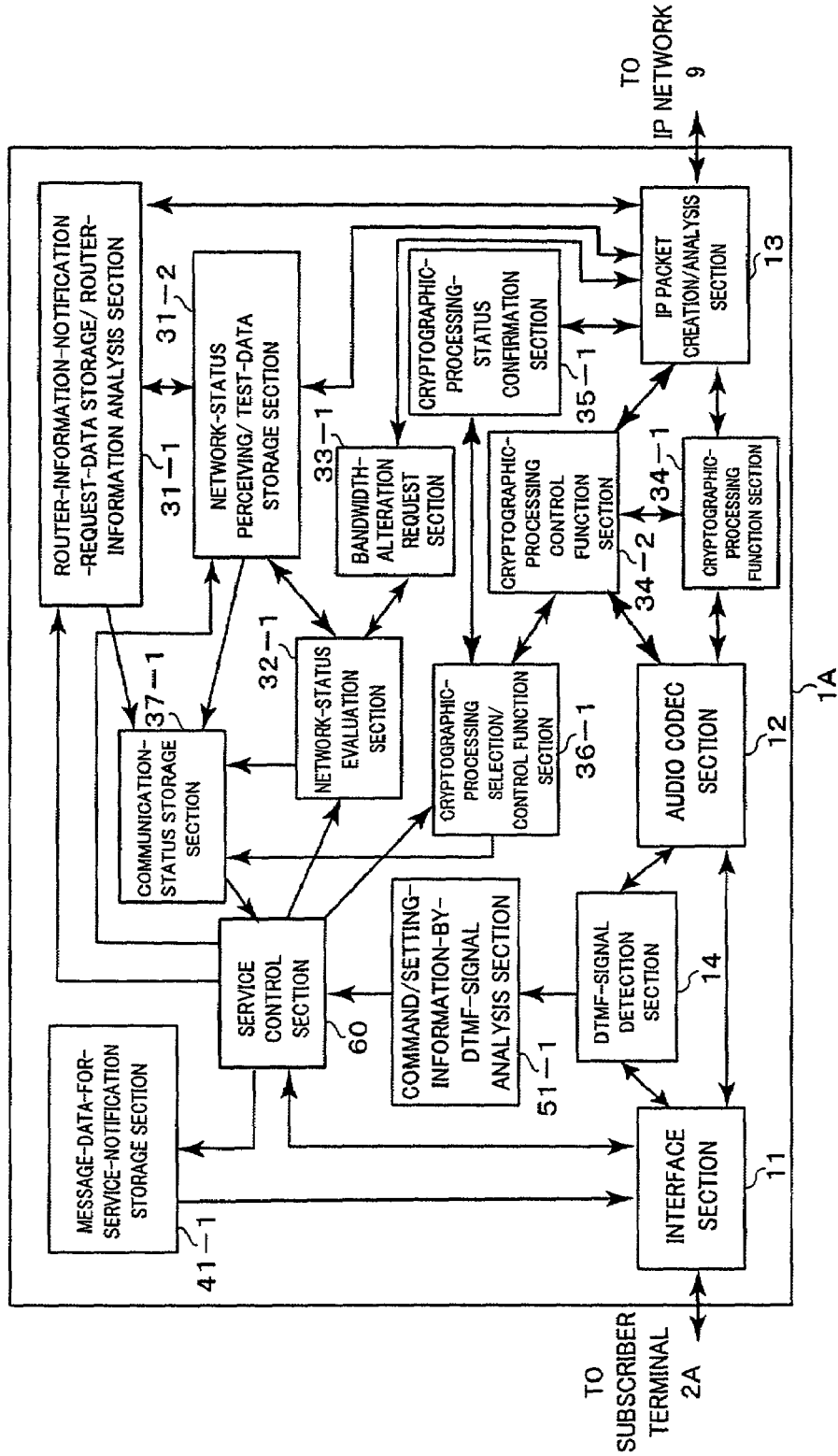
FIG. 8 is a block diagram showing the VoIP gateway equipment incorporated with a communication-status notification apparatus according to the first embodiment of the present invention from another angle.

FIG. 8 is a block diagram showing the VoIP gateway equipment incorporated with a communication-status notification apparatus according to the first embodiment of the present invention from another angle.

Like the VoIP gateway equipment shown in FIG. 5, the VoIP gateway equipment shown in FIG. 8 is equivalent to, for example, the VoIP gateway equipment 1A in FIG. 1, being equipped with the VoIP-gateway mechanism for transmitting voice data by converting a voice signal into IP packets, and vice versa, and also with the mechanism of notifying the communication status according to the present invention.

Also the VoIP gateway equipment 1A shown in FIG. 8 has components to serve as the VoIP-gateway mechanism: an interface section 11, an audio CODEC section 12, an IP-packet creation/analysis section 13 and a DTMF-signal detector 14. These components have the same functions as those of components designated by like reference numerals in the VoIP gateway equipment 1A shown in FIG. 5: the interface section 11, the audio CODEC section 12, the IP-packet creation/analysis section 13 and the DTMF-signal detection section 14, respectively.

The VoIP gateway equipment 1A shown in FIG. 8 further has components to function as the communication-status notification apparatus according to the present invention: a router-information-notification-request-data storage/router-information analysis section 31-1, a network-status perceiving/test-data storage section 31-2, a network-status evaluation section 32-1, a bandwidth-alteration request section 33-1, a cryptographic-processing function section 34-1, a cryptographic-processing-control function section 34-2, a cryptographic-processing-status confirmation section 35-1, a cryptographic-processing selection/control function section 36-1, a communication-status storage section 37-1, a message-data-for-service-notification (voice, character and image) storage section 41-1, a command/setting-information-by-DTMF-signal analysis section 51-1 and a service control section 60.

The router-information-notification-request-data storage/router-information analysis section 31-1 has a function combining the functions of the router-information request section 311, the router-information obtaining section 312 and the router-information analysis section 313 of the VoIP gateway equipment 1A shown in FIG. 5.

The network-status perceiving/test-data storage section 31-2 has a function combining the functions of the test-packet-sending control section 314, the test-packet-retrieval control section 315, the test-packet-retrieval analysis section 316 and the test-packet-sending-back control section 317 of the VoIP gateway equipment 1A shown in FIG. 5.

Accordingly, the router-information-notification-request-data storage/router-information analysis section 31-1 and the network-status perceiving/test-data storage section 31-2 are combined to have the same function as that of the traffic-status monitor section 31 of the VoIP gateway equipment 1A shown in FIG. 5.

The network-status evaluation section 32-1 has the same function as that of the communication-quality evaluation section 32 of the VoIP gateway equipment 1A shown in FIG. 5.

The bandwidth-alteration request section 33-1 has the same function as that of the bandwidth-alteration request section 33 of the VoIP gateway equipment 1A shown in FIG. 5.

The cryptographic-processing function section 34-1 and the cryptographic-processing-control function section 34-2 are combined to have the same function as that of the cryptographic-processing section 34 of the VoIP gateway equipment 1A shown in FIG. 5.

The cryptographic-processing-status confirmation section 35-1 has the same function as that of the cryptographic-processing-status monitor section 35 of the VoIP gateway equipment 1A shown in FIG. 5.

The cryptographic-processing selection/control function section 36-1 has the same function as that of the cryptographic-processing selection/control section 36 of the VoIP gateway equipment 1A shown in FIG. 5.

The communication-status storage section 37-1 has the same function as that of the communication-status storage section 37 of the VoIP gateway equipment 1A shown in FIG. 5.

The message-data-for-service-notification (voice, character and image) storage section 41-1 has the same function as that of the notification-material storing section 41 of the VoIP gateway equipment 1A shown in FIG. 5.

The command/setting-information-by-DTMF-signal analysis section 51-1 has the same function as that of the request-information analysis section 51 of the VoIP gateway equipment 1A shown in FIG. 5.

The service control section 60 combines the functions of the communication-status-notification control section 42 and request-receiving control section 52 of VoIP gateway equipment 1A shown in FIG. 5.

Accordingly, the router-information-notification-request-data storage/router-information analysis section 31-1, the network-status perceiving/test-data storage section 31-2, the network-status evaluation section 32-1, the bandwidth-alteration request section 33-1, the cryptographic-processing function section 34-1, the cryptographic-processing-control function section 34-2, the cryptographic-processing-status confirmation section 35-1, the cryptographic-processing selection/control function section 36-1 and the communication-status storage section 37-1 are combined to have the same function as that of the communication-status monitor/control section 30 of the VoIP gateway equipment 1A shown in FIG. 5.

Also, the message-data-for-service-notification (voice, character and image) storage section 41-1 and the service control section 60 are combined to have the same function as that of the communication-status notification section 40 of the VoIP gateway equipment 1A shown in FIG. 5.

Further, the command/setting-information-by-DTMF-signal analysis section 51-1 and the service control section 60 has the same function as that of request analysis section 50 of the VoIP gateway equipment 1A shown in FIG. 5.

(ii) Description of Arrangement of Subscriber Terminal Used in the First Embodiment of the Present Invention Next, an arrangement of a subscriber terminal used in the first embodiment of the present invention will be described with reference to FIG. 9.

The subscriber terminal is equivalent to, for example, the subscriber terminal 2A shown in FIG. 1, being connected to the VoIP gateway equipment 1A via a PSTN, an ISDN or an exchange so as to carry out transmission of voice data such as telephone data or facsimile data via the IP network 9 between another subscriber terminal 2.

Figure 9:
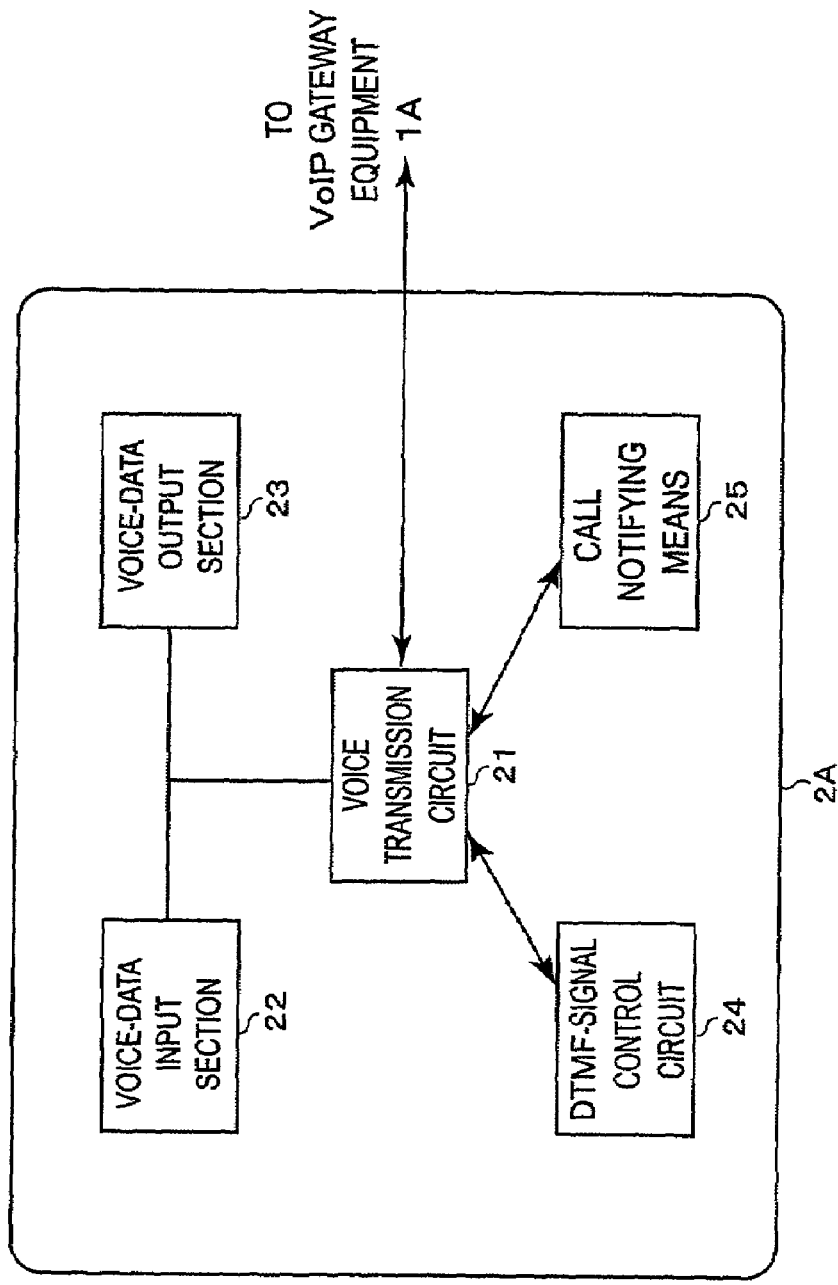
FIG. 9 is a block diagram showing a subscriber terminal connected to the VoIP gateway equipment.

The subscriber terminal shown in FIG. 9 has several components to serve as a voice-transmission function: a voice transmission circuit 21, a voice-data input section 22, a voice-data output section 23, a DTMF-signal control circuit 24 and call notifying means 25.

The voice transmission circuit 21 carries out transmission of a voice signal between VoIP gateway equipment 1A.

The voice-data input section 22 carries out input-processing on a telephone voice or a facsimile image, etc, and converts the inputted telephone voice or facsimile image, etc, into a voice signal including voice data so as to pass the voice signal to the voice transmission circuit 21.

The voice-data output section 23 receives a voice signal from the voice transmission circuit 21, extracts voice data about a telephone voice or a facsimile image, etc, from the voice signal, and converts the extracted voice data into an optimum form such as a telephone voice or a facsimile image, etc, so as to carry out output-processing on the voice data.

The voice-data output section 23 receives notification information as voice from the voice transmission circuit 21 when the voice transmission circuit 21 receives a voice signal containing the notification information in the form of voice, and carries out output-processing on the notification information.

The DTMF-signal control circuit 24 carries out input-processing on a control signal with dialing operation by a subscriber, and controls the transmission of a voice signal by the voice transmission circuit 21 based on the inputted control signal.

The DTMF-signal control circuit 24 sends the DTMF signal, which was inputted with the dialing operation, to the VoIP gateway equipment 1A in the form of voice signal, using the transmission function of a voice signal in the voice transmission circuit 21.

The call notifying means 25 functions, when the voice transmission circuit 21 receives a voice signal from the VoIP gateway equipment 1A, namely, receives a call, to notifies a subscriber that the call is received by means of voice, character or image.

Also, the call notifying means 25 functions, when the voice transmission circuit 21 receives from the VoIP gateway equipment 1A a voice signal containing notification information in the form of voice, character or image as voice data, as controlling the voice transmission circuit 21 to detect the notification information contained in the received voice signal, and as notifying the notification information by means of the voice, character and image.

If the subscriber terminal 2A is a telephone, the voice-data input section 22 and the voice-data output section 23 are devoted mainly to input/output process of telephone voice data and, if the subscriber terminal 2A is a facsimile machine, the voice-data input section 22 and the voice-data output section 23 are devoted mainly to input/output process of facsimile image data.

It is also possible that in the subscriber terminal 2A, the voice-data input section 22 and the voice-data output section 23 may combine the input/output-processing function of telephone voice and the input/output-processing function of facsimile image data.

(iii) Description of Arrangement of Router Used in the First Embodiment of the Present Invention Then, an arrangement of a router used in the first embodiment of the present invention will be described with reference to FIG. 10.

As described above, the router 90 exists in the IP network 9 shown in FIG. 1 as a component of the IP network 9, for transmitting IP packets containing voice data, which is sent/received by plural subscriber terminals 2 each connected to the IP network 9 via VoIP gateway equipment 1, and also for controlling the routing of the IP packets in association with the transmission of the IP packets, so that the plural subscriber terminals 2 can interchange the IP packets.

Figure 10:
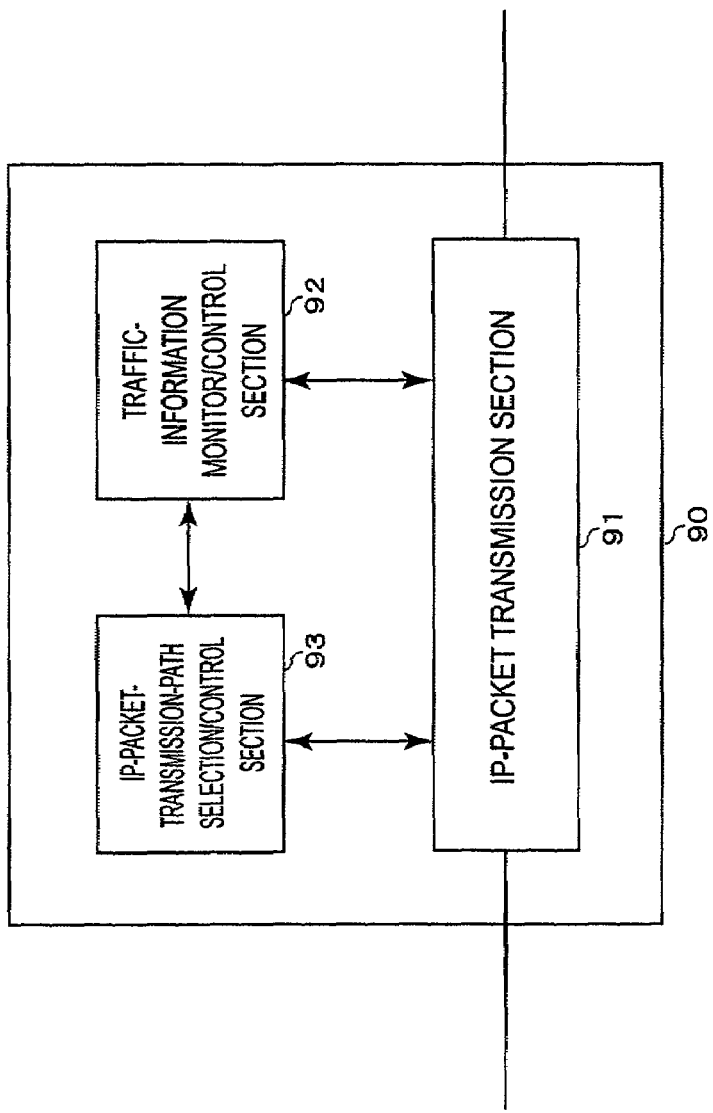
FIG. 10 is a block diagram showing a router included in an IP network of the VoIP communication system.

The router 90 shown in FIG. 10 has several components to serve as the router function: an IP-packet transmission section 91, a traffic-information monitor/control section 92 and an IP-packet-transmission-path selection/control section 93.

The IP-packet transmission section 91 sends/receives IP packets to/from another router 90 or VoIP gateway equipment connected to the router 90.

The traffic-information monitor/control section 92 monitors various kinds of traffic status of IP packets sent/received by the IP-packet transmission section 91, such as a sending/receiving status of IP packets, a congestion status of IP packets, a missing/retransmitting status of IP packets and a ratio of current throughput of IP packets to maximum throughput of IP packets.

The traffic-information monitor/control section 92 creates an IP packet containing traffic information monitored in the router 90 and controls the IP-packet transmission section 91 to send the created IP packet to another router 90 in the IP network 9. Also, when the IP-packet transmission section 91 receives from another router an IP packet containing traffic information monitored in the other routers 90 in the IP network 9, the traffic-information monitor/control section 92 obtains the traffic information of the other router 90 from the received IP packet and storing the traffic information.

Further, when the IP-packet transmission section 91 receives an information-request IP packet, which includes a request signal to notify information about traffic status, from VoIP gateway equipment connected to the IP network, the traffic-information monitor/control section 92 creates an IP packet containing traffic information, which was monitored in the router 90, and controls the IP-packet transmission section 91 to send the created IP packet to the VoIP gateway equipment, from which the information-request IP packet was sent.

Also, when the IP-packet transmission section 91 receives a bandwidth-alteration request IP packet, which includes a request signal to alter a bandwidth to be used for voice data, from VoIP gateway equipment connected to the IP network, the traffic-information monitor/control section 92 controls the IP-packet transmission section 91 to alter a bandwidth to be used for voice data in response to the request.

IP-packet-transmission-path selection/control section 93 determines a transmission path of an IP packet, which is received by the IP-packet transmission section 91, based on a destination address included in a header of the IP packet, with reference to both of traffic information of IP packets in the router 90, which information is monitored by the traffic-information monitor/control section 92, and traffic information of IP packets in one or more other routers 90, which information is stored by the traffic-information monitor/control section 92.

Also the traffic-information monitor/control section 92 monitors information about controlling of transmission path in the IP-packet-transmission-path selection/control section 93 as traffic information.

(1-2) Description of Notifying Operation of Traffic Status in the First Embodiment of the Present Invention:

Next, the description will be made on various kinds of operation in the VoIP communication system of the first embodiment of the present invention, specifically on monitoring/controlling operation and notifying operation of a traffic status in an IP network by the communication-status notification apparatus, with reference to FIGS. 11–13.

In the following description, the traffic status in an IP network genetically means various kinds of communication status that may affect voice quality, such as traffic of IP packets, congestion status of IP packets and delay times of IP packets.

In the VoIP communication system according to the first embodiment of the present invention, the following four kinds of operations are performed as monitoring/controlling and notifying operations of a traffic status by the communication-status notification apparatus.

(i) operation of monitoring a traffic status in the IP network 9 by the VoIP gateway equipment (monitoring operation of a traffic status)

(ii) operation of notifying a subscriber terminal of information about a traffic status and voice-call quality by the VoIP gateway equipment (notifying operation of a communication status)

(iii) operation of analyzing a request on monitoring, controlling or notifying of a traffic status and voice-call quality, which request was sent from a subscriber terminal, and operation of controlling the monitor, control or notification of the traffic status and voice-call quality by the VoIP gateway equipment in response to the content of the request (responding operation to a communication-status request)

(iv) operation of requesting a router by the VoIP gateway equipment to alter a bandwidth allocated to voice data in the router (requesting operation of bandwidth-alteration)

These operations will now be described below in turn.

(i) Description of Monitoring Operation of Traffic Status

First, operation of monitoring the traffic status of the IP network by the VoIP gateway equipment, which is incorporated with the communication-status notification apparatus of the present invention, will be described with reference to FIG. 11.

Figure 11:
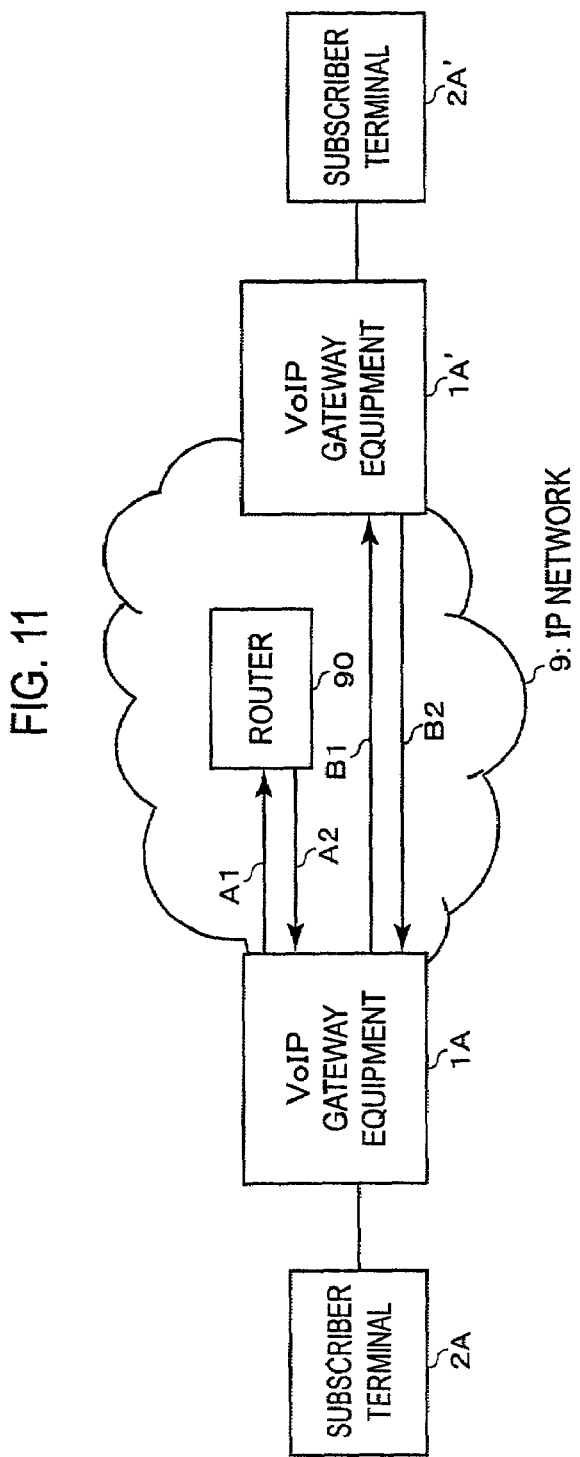
FIG. 11 illustrates a monitoring operation of a traffic status by the VoIP gateway equipment according to the first embodiment of the present invention.

As shown in FIG. 11, two sets of VoIP gateway equipment 1A, 1A' are connected to an IP network 9, which includes a router 90. Each of the sets of VoIP gateway equipment 1A, 1A' is incorporated with the communication-status notification apparatus of the present invention, which apparatus has the arrangement as shown in FIG. 5, and is also connected with a respective one of subscriber terminals 2A, 2A'.

The following description will be concentrated on operation by the VoIP gateway equipment 1A and operation by the subscriber terminal 2A.

The VoIP gateway equipment 1A with the communication-status notification apparatus carries out the monitoring operation of the traffic status of the IP network by the following two measures.

① a measure using information collected from routers in the IP network

② a measure using a retrieving status of test IP packets from other VoIP gateway equipment These two measures will now be described in turn.

① the measure using information collected from routers in the IP network

This is a measure in which the VoIP gateway equipment 1A with the communication-status notification apparatus requests the router 90 in the IP network 9 to send information about a traffic status, and monitors the traffic status based on the information obtained from the router 90.

First, the VoIP gateway equipment 1A with the communication-status notification apparatus sends to the router 90 a signal requesting the router 90 to send information about traffic status to the VoIP gateway equipment 1A (Step A1).

Concretely, the traffic-status monitor section 31 controls the IP-packet creation/analysis section 13 to create an information-request IP packet, which contains a signal requesting to notify the VoIP gateway equipment 1A of information about the traffic status, and then to send the created information-request IP packet over the IP network 9 toward the router 90 in the IP network 9.

The traffic-status information to be requested by the traffic-status monitor section 31 means various kinds of information monitored by the traffic-information monitor/control section 92 of the router 90 during the normal operation of the router 90, including a sending/receiving status of IP packets, a congestion status of IP packets, a missing/retransmitting status of IP packets, a ratio of current throughput of IP packets to maximum throughput of IP packets and a number of IP packets accumulated in a buffer of the router 90, etc.

Next, receiving the information-request IP packet sent from the VoIP gateway equipment 1A, the router 90 in the IP network 9 sent the information about traffic status to the VoIP gateway equipment 1A, in response to the content of request contained in the received information-request IP packet (Step A2).

Concretely, when the IP-packet transmission section 91 of the router 90 receives the information-request IP packet from the VoIP gateway equipment 1A, the traffic-information monitor/control section 92 creates an IP packet containing information about the traffic-status monitored by the router 90, and controls the IP-packet transmission section 91 to send the created IP packet to the VoIP gateway equipment 1A, from which the information-request IP packet was sent.

Finally, the VoIP gateway equipment 1A receives the traffic-status information sent from the router 90 and monitors the traffic status of the IP network 9 based on the received information.

Concretely, the traffic-status monitor section 31 obtains the traffic-status information, which was sent from the router 9 in the IP network 9, out of IP packets received from the router 90 by the IP-packet creation/analysis section 13, and analyzes the traffic status of the IP network 9 based on the obtained traffic-status information.

According to the measure ①as described above, the VoIP gateway equipment 1A can monitor the traffic status of the IP network 9 with a simple arrangement while utilizing the sending/receiving function of IP packets, which is equipped with the conventional VoIP gateway equipment, by analyzing the traffic status based on various kinds of information sent from the router 90 in the IP network, such as the sending/receiving status of IP packets, the congestion status of IP packets, the missing/retransmitting status of IP packets, the ratio of current throughput of IP packets to maximum throughput of IP packets and the number of IP packets accumulated in a buffer of the router 90, etc.

②the measure using a retrieving status of test IP packets from other VoIP gateway equipment This is a measure in which the VoIP gateway equipment 1A with the communication-status notification apparatus sends one or more test IP packets to other VoIP gateway equipment 1A', which is connected to the IP network 9, and monitors the traffic status based on a retrieving status of the test IP packets, which was sent back from the other VoIP gateway equipment 1A'.

First, the VoIP gateway equipment 1A with the communication-status notification apparatus sends test IP packets to other VoIP gateway equipment 1A' connected to the IP network 9 (Step B1).

Concretely, the traffic-status monitor section 31 controls the IP-packet creation/analysis section 13 to create one or more test IP packets and sends the created test IP packet over the IP network 9 toward other VoIP gateway equipment 1A', which is connected to the IP network 9 and serves as a companion to the VoIP gateway equipment 1A for data transmission.

As described above, each of the test IP packets contains a signal requesting the companion VoIP gateway equipment 1A' to send back the test IP packets to the VoIP gateway equipment from which the test IP packets were sent (namely, the VoIP gateway equipment 1A) in response to the receiving of the test IP packets.

Next, the other VoIP gateway equipment 1A' connected to the IP network 9 sends the test IP packets, which were received from the VoIP gateway equipment 1A, back to the VoIP gateway equipment 1A (Step B2).

Concretely, in the VoIP gateway equipment 1A' connected to the IP network 9, the test-packet-sending-back control section 317 controls the IP-packet creation/analysis section 13 to detect an individual test IP packet, which was sent from other VoIP gateway equipment connected to the IP network (in the present instance as shown in FIG. 11, the individual test IP packet sent from the VoIP gateway equipment 1A), out of IP packets received from the IP network 9 by the IP-packet creation/analysis section 13, and send back the received individual test IP packet to the VoIP gateway equipment from which the test IP packet was sent (namely, the VoIP gateway equipment 1A) in response to the signal contained in the individual test IP packet.

Next, the VoIP gateway equipment 1A receives the individual test IP packet, which was sent back from the other VoIP gateway equipment 1A' connected to the IP network 9, and analyzes the traffic status of the IP network 9 based on the retrieving status of the test IP packets.

Concretely, the traffic-status monitor section 31 of the VoIP gateway equipment 1A detects the test IP packet, that was first sent from the VoIP gateway equipment 1A and then sent back from other VoIP gateway equipment connected to the IP network 9 (in the present instance, the VoIP gateway equipment 1A'), out of IP packets received by the IP-packet creation/analysis section 13 to retrieve the detected test IP packet, and monitors a retrieving status of the test IP packets originally sent from the VoIP gateway equipment 1A. The traffic-status monitor section 31 then analyzes the traffic status of the IP network based on the monitored retrieving status of the test IP packets.

According to the measure ②as described above, the VoIP gateway equipment 1A can perceive the traffic status of the IP network 9 with a simple arrangement while utilizing the sending/receiving function of IP packets, which is equipped with the conventional VoIP gateway equipment, by analyzing the traffic status based on the retrieving status of the test IP packets sent back from the other VoIP gateway equipment 1A' connected to the IP network 9.

For example, by analyzing how much time has passed since the VoIP gateway equipment 1A sent the IP packets to the other VoIP gateway equipment 1A' and until the VoIP gateway equipment 1A receives the test IP packets sent back from the VoIP gateway equipment 1A', the VoIP gateway equipment 1A can monitor delay times for IP packets to go to and return from the companion VoIP gateway equipment 1A'.

Also, by sending successive test IP packets having the sequential numbers to the other VoIP gateway equipment 1A' and by analyzing the sequential numbers of the successive test IP packets sent back from the other VoIP gateway equipment 1A', the VoIP gateway equipment 1A can calculate a ratio of a number of missing test IP packets to a number of the originally-sent successive test IP packets, thereby monitoring a missing status of IP packets in the IP network 9.

As described above, by using the measures ①and ②, the VoIP gateway equipment 1A with the communication-status notification apparatus can monitor the congestion status and the missing status of IP packets, which were monitored by the router 90 in the IP network 9, and also monitor the delay times and the missing status of IP packets between the other VoIP gateway equipment 1A' connected to the IP network 9

Further, the VoIP gateway equipment 1A evaluates communication quality of voice communication over the IP network 9, based on the traffic status of the IP network monitored by use of the means ① and ②.

Concretely, using the traffic status of the IP network 9 monitored by the traffic-status monitor section 31, specifically the congestion status of voice data in the IP network 9, the communication-quality evaluation section 32 carries out the evaluation of the communication quality of voice data over the IP network 9.

Finally, the communication-status storage section 37 stores, as information about a communication status, the traffic status of the IP network 9 monitored by the traffic-status monitor section 31 and the communication quality of voice communication evaluated by the communication-quality evaluation section 32.

(ii) Description of Notifying Operation of Communication Status

Next, operation of notifying a subscriber terminal is of information about the traffic status and the communication quality by the VoIP gateway equipment, which is incorporated with the communication-status notification apparatus of the present invention, will be described with reference to FIG. 12.

Figure 12:
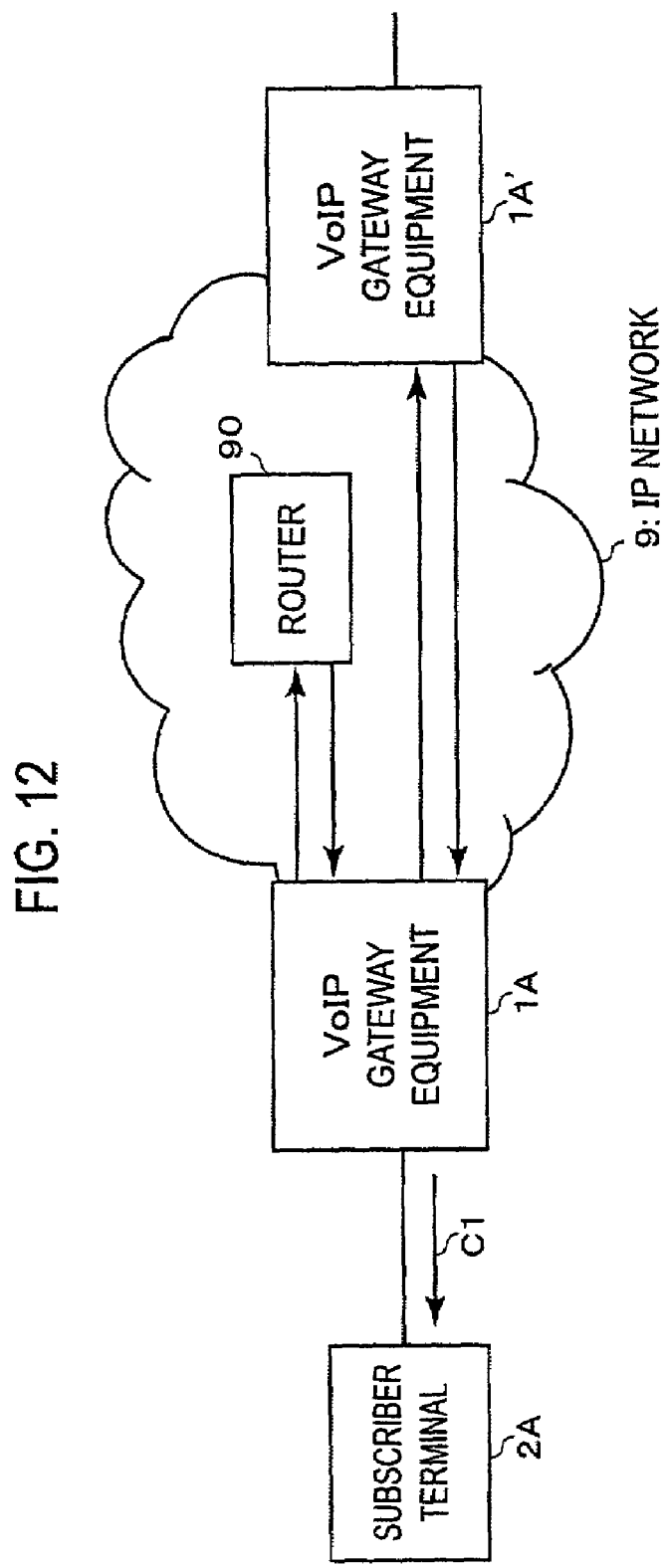
FIG. 12 illustrates a notifying operation of a communication status by the VoIP gateway equipment according to the first embodiment of the present invention.

As shown in FIG. 12, like FIG. 11, two sets of VoIP gateway equipment 1A, 1A' are connected to an IP network 9, which includes a router 90. Each of the sets of VoIP gateway equipment 1A, 1A' is incorporated with the communication-status notification apparatus of the present invention, which apparatus has the arrangement as shown in FIG. 5. One set of VoIP gateway equipment 1A is also connected with a subscriber terminal 2A.

The VoIP gateway equipment 1A notifies the subscriber terminal 2A, connected to the VoIP gateway equipment 1A, of the traffic status of voice data in the IP network and the communication quality for voice communication over the IP network, which items were monitored by the Monitoring Operation of Traffic Status as described above, as the communication status monitored/controlled by the communication-status monitor/control section 30 (Step C1).

Concretely, the communication-status-notification control section 42 controls the interface section 11 to notify the subscriber terminal 2A of information about the monitored traffic status in the IP network 9 and the evaluated communication quality of voice communication, both stored in the communication-status storage section 37, using notification materials stored in the notification-material storing section 41.

The communication-status-notification control section 42 selects a notification material from the notification materials stored in the notification-material storing section 41, such as voice, character and image, according to both a kind of subscriber terminal 2A to be notified to, which kind has been identified by controlling the interface section 11, and a kind of communication status to be notified of, and then carries out the notification of the traffic status using the selected material.

Concretely, the selection of notification material is made from two options, according to a kind of the subscriber terminal 2A: namely, ① notification using voice, and ② notification using character and/or image.

① Notification Using Voice

If the subscriber terminal 2A to be notified is an ordinary subscriber terminal (especially a telephone) used for voice communication, especially a subscriber terminal connected to a PSTN, the communication-status-notification control section 42 notifies the subscriber terminal 2A of the communication status using voice material from the notification materials stored in the notification-material storing section 41.

The communication-status-notification control section 42 chooses two measures to notify of the communication status according to a kind of the communication status to be notified; namely, a measure to transmit a voice message at an optimum level over a voice call to the subscriber, and a measure to interrupt a voice talk of the subscriber with connection kept established for a moment while transmitting a voice message to the subscriber.

If the subscriber terminal 2A to be notified is a telephone, for example, and if the information to be notified is about the evaluated communication quality, the communication-status-notification control section 42 transmits an alarm such as a bleep over a telephone voice during a voice call, at a low level so as not to disturb the voice call.

② Notification Using Character and/or Image

Assume that the subscriber terminal 2A to be notified is a terminal having a function of, when the call notifying means 25 receives a voice signal including any notification material such as a material of character and/or image from the VoIP gateway equipment 1A, controlling the voice transmission circuit 21 to detect the notification material from the received voice signal and carrying out the notification using the character and/or image associated with the notification material, specifically a terminal which is connected to an ISDN and can receive a digital signal and a terminal which has a function to create/analyze an IP packet. To such a terminal, the communication-status-notification control section 42 notify of the communication status using a character material or an image material from the notification materials stored in the notification-material storing section 41.

Concretely, the call notifying means 25 of the subscriber terminal 2A sends an appropriate notification material to the subscriber terminal 2A according to a kind of the subscriber terminal 2A so that the information about the communication status is displayed in the form of a message of character and/or image.

The communication-status-notification control section 42 chooses an appropriate notifying measure according to a kind of communication-status information to be notified. Here two cases will be described: ③ where information about the traffic status of the IP network is notified, and ④ where information about the communication quality of the IP network is notified.

③ The Case where Information About the Traffic Status of the IP Network is Notified On notifying information about a current traffic status in the IP network 9, the communication-status-notification control section 42 notifies the subscriber terminal 2A of the current traffic status of the IP network 9 using a notification material, which includes a message indicating the current traffic status as an index easily perceivable by the subscriber of the terminal 2A.

For example, on notifying of traffic at the router 90 in the IP network, the communication-status-notification control section 42 represents the traffic at the router 90 as a percentage of a current throughput of IP packets in the router 9 to a maximum throughput of IP packets in the router 9 and notifies of the traffic with a notification material in the form of a message such as "The current traffic in the network is about 20%, current voice-call quality is fine." or "The network is very congested so that it is difficult to secure enough voice-call quality." In this example, an appropriate material is selected from voice, character and image so as to express the message according to a kind of the subscriber terminal 2A.

As described above, because the traffic status of the IP network 9 is monitored and notified of to the subscriber terminal 2A, the subscriber can observe the traffic status of the IP network 9 easily via the subscriber's own terminal.

④ The Case where Information About the Communication Quality of the IP Network is Notified On notifying information about a current communication quality in the IP network 9, the communication-status-notification control section 42 notifies the subscriber terminal 2A of the current communication quality of the IP network 9 using a notification material, which includes a message indicating the current communication quality as an index easily perceivable by the subscriber of the terminal 2A.

For example, when the communication-quality evaluation section 32 evaluates a current voice-call quality in the IP network as not fine, the communication-status-notification control section 42 notifies of information about the result of the evaluation (the evaluated voice-call quality) using a notification material in the form of a message such as "The network is very congested so that it is difficult to secure enough voice-call quality." Also in this example, an appropriate material is selected from voice, character and image so as to express the message according to a kind of the subscriber terminal 2A.

If the subscriber terminal 2A to be notified is a telephone which can manage only voice data and when voice-call quality is evaluated as getting worse during a voice call, the communication-status-notification control section 42 notifies subscriber terminal 2A of information about the result of the evaluation by transmitting a notification material of an alarm such as a bleep to the subscriber terminal 2A over a telephone voice during a voice call, at a low level so as not to disturb the voice call.

Accordingly, because the communication quality of voice data in the IP network 9 is evaluated based on monitored the traffic status in the IP network 9 and the result of evaluation is notified of to the subscriber terminal, the subscriber can observe the communication quality of voice data in the IP network 9 easily via the subscriber's own terminal.

As described above with reference to the options ①–④, the communication-status-notification control section 42 chooses an appropriate notification material from notification materials (voice, character and image) stored in the notification-material storing section 41, according to both a kind of subscriber terminal 2A to be notified to and a kind of the communication-status information to be notified of, and carries out the notification using the selected notification material.

Particularly when the subscriber terminal 2A is a telephone which can manage only voice data, the communication-status-notification control section 42 chooses a measure to transmit a voice message at an optimum level over a voice call to the subscriber terminal 2A, as exemplified in the description ④, and a measure to interrupt a voice talk of the subscriber with connection kept established for a moment while transmitting a voice message to the subscriber terminal 2A, according to a kind of the communication-status. With this arrangement, it is possible to notify a communication status with voice more clear, according to a kind of the communication status.

Regarding frequency of the notifying operation of the communication status subscriber terminal 2A, the communication-status-notification control section 42 also chooses an appropriate option according to a kind of the communication-status from the following three options: to notify periodically, to notify in response to the result of the monitor/control of the communication status, and to notify in response to a request sent from the subscriber terminal 2A.

As described above, because the communication status of the IP network 9 is clearly notified of to the subscriber terminal 2A with material such as voice, character and image, the subscriber can easily perceive various kinds of communication status of the IP network 9 more clearly.

(iii) Description of Responding Operation of Communication-Status Request

Next, operation of analyzing a request on monitoring/controlling or notifying a traffic status and voice-call quality sent from a subscriber terminal by VoIP gateway equipment, which is incorporated with the communication-status notification apparatus according to the present invention, and operation of controlling the monitoring/controlling or notifying of traffic status and voice-call quality in response to the content of the request, will be described with reference to FIG. 13.

Figure 13:
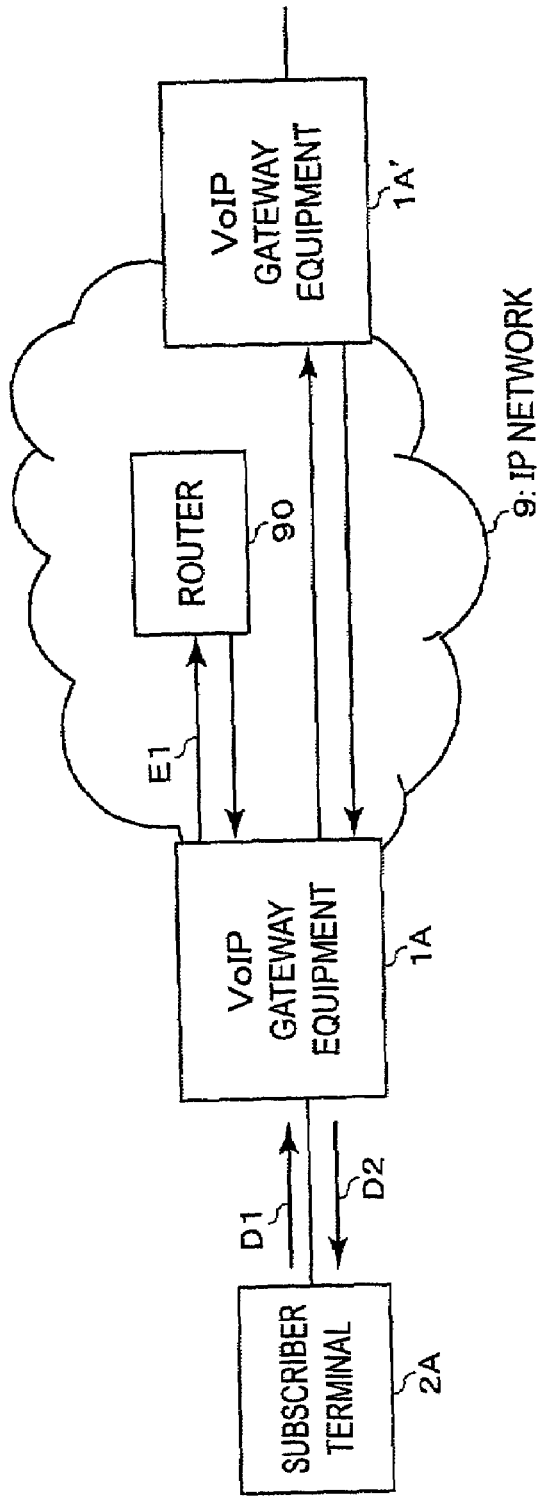
FIG. 13 illustrates a requesting operation by the subscriber terminal and a notifying operation of a communication status by the VoIP gateway equipment according to the first embodiment of the present invention.

As shown in FIG. 13, two sets of VoIP gateway equipment 1A, 1A' are connected to an IP network 9, which includes a router 90. Each of the sets of VoIP gateway equipment 1A, 1A' is incorporated with the communication-status notification apparatus of the present invention, which apparatus has the arrangement as shown in FIG. 5. One set of VoIP gateway equipment 1A is also connected with a subscriber terminal 2A.

Assume that the subscriber terminal 2A connected with the VoIP gateway equipment 1A sends to the VoIP gateway equipment 1A a request for starting/stopping or selecting in relation with monitoring of the traffic status and evaluating of the communication quality, which is carried out by the monitoring operation of traffic described in the above (i), and notifying of the traffic status and the communication quality, which is carried out by the notifying operation of communication status described in the above (ii), in the form of a voice signal. The VoIP gateway equipment 1A analyzes the content of the request by the function of the request analysis section 50, and carries out the monitoring/controlling or notifying of communication status in response to the request (Step D1).

Specific processes will be described below.

First, the subscriber operates the DTMF-signal control circuit 24 of the subscriber terminal 2A in a predetermined sequence, thereby control the subscriber terminal 2A to send a DTMF signal corresponding to a desired request. One or more DTMF signals are previously defined to be associated with one or more request, respectively, so that the subscriber can generated each of the DTMF signals by a specific and simple DTMF-signal operation of the subscriber terminal (for example, dialing in turns of #, #, #, 1, 0) and that the subscriber can easily memorize the DTMF-signal operation corresponding to each of the DTMF signals.

Next, in the VoIP gateway equipment 1A, the DTMF-signal detection section 14 detects a DTMF signal based on any DTMF-signal operation out of voice signals received by the interface section 11.

Further, the request-information analysis section 51 analyzes the DTMF signal detected by the DTMF-signal detection section 14 and recognizes the desired request corresponding to the DTMF signal.

In response to the request analyzed in the above-described way, the request-receiving control section 52 controls both the operation of monitoring/controlling the communication status by the communication-status monitor/control section 30 or the operation of notifying of the communication status by the communication-status notification section 40.

Namely, in response to a request based on the specific DTMF-signal operation, the request-receiving control section 52 carries out control such as starting or stopping of the operation of analyzing the traffic status of the IP network 9 by the traffic-status monitor section 31 or the operation of evaluating the communication quality of the IP network 9 by the communication-quality evaluation section 32.

Also, when the content of the request is related with the notification of the traffic status or the communication quality, the request-receiving control section 52 controls the communication-status-notification control section 42 to notify the subscriber terminal 2A via the interface section 11 of various kinds of information stored in the communication-status storage section 37, namely, the information about the traffic status monitored by the traffic-status monitor section 31 and the information about the communication quality evaluated by the communication-quality evaluation section 32 (Step D2).

The request-information analysis section 51 continuously discriminates whether or not DTMF signals detected by the DTMF-signal detection section 14 include a DTMF signal corresponding to a request on monitoring/controlling or notifying of the communication status from the subscriber terminal and, when there is a DTMF signal corresponding to any request, analyzes the content of the request. With this arrangement, the subscriber can control monitoring/controlling or notifying of the communication status actively by carrying out a specific DTMF-signal operation.

(iv) Description of Requesting Operation of Bandwidth Alteration

Finally, operation of requesting the router to alter a bandwidth to be allocated to voice data by the VoIP gateway equipment, which is incorporated with the communication-status notification apparatus according to the present invention, will be described with reference to FIG. 13.

By carrying out the monitoring operation of the traffic status as described in (i), the VoIP gateway equipment 1A monitors the traffic status in the IP network 9 at regular intervals. When it is evaluated difficult to secure adequate communication quality based on the result of monitoring, because of decline of a throughput of IP packets due to deterioration of the traffic status of voice data, the VoIP gateway equipment 1A sends to the router 90 in the IP network 9 a request for altering a bandwidth to be allocated to voice data (Step E1).

Concretely, the monitoring operation of the traffic status as described in the above (i), the communication-quality evaluation section 32 first evaluates the communication quality for voice communication over the IP network 9 based on the result of the analyzing of the traffic status of the IP network 9 by the traffic-status monitor section 31, especially the congestion status of voice data in the IP network 9.

When the communication-quality evaluation section 32 evaluates that the communication quality of voice data in the IP network 9 is lower than a predetermined level, the bandwidth-alteration request section 33 controls the IP-packet creation/analysis section 13 to create a bandwidth-alteration request IP packet which contains a signal requesting the router to broaden a bandwidth to be used for voice data, and sends the created bandwidth-alteration request IP packet over the IP network 9 toward the router 90 in the IP network 9.

Also when the communication-quality evaluation section 32 evaluates that the communication quality of voice data in the IP network 9 is higher than a predetermined level, the bandwidth-alteration request section 33 controls the IP-packet creation/analysis section 13 to create a bandwidth-alteration request IP packet which contains a signal requesting the router to narrow a bandwidth to be used for voice data, and sends the created bandwidth-alteration request IP packet over the IP network 9 toward the router 90 in the IP network 9.

Next, the router 90 in the IP network 9 alters the bandwidth used for voice data in response to the request contained in the bandwidth-alteration request IP packets received from the VoIP gateway equipment 1A.

Concretely, when the IP-packet transmission section 91 receives a bandwidth-alteration request IP packet, which contains a signal requesting the router to alter a bandwidth to be used for voice data, from VoIP gateway equipment connected to the IP network 9 (in the present embodiment, the VoIP gateway equipment 1A), the traffic-information monitor/control section 92 controls the IP-packet transmission section 91 to alter the bandwidth to be used for voice data in response to the request.

With this arrangement as described above, the subscriber takes measures to improve the communication quality of voice data easily via the subscriber's own terminal, and effectively uses the bandwidth allocated by the router according to the communication quality of voice data.

It is also possible to arrange that the communication-quality evaluation section 32 calculates a required bandwidth based on the traffic status monitored by the traffic-status monitor section 31, and inserts information about the required bandwidth into an IP packet created by the IP-packet creation/analysis section 13.

As described above, according to the VoIP gateway equipment incorporated with the communication-status notification apparatus according to the present invention, because the VoIP gateway equipment performs (i) the monitoring operation of the traffic status, (ii) the notifying operation of the communication status, (iii) the responding operation to a communication-status request and (iv) the requesting operation of bandwidth-alteration, the subscriber can perceive the traffic status or the communication quality of the IP network at any time before or during voice communication.

Also, when it becomes difficult to secure adequate communication quality during a voice call, the subscriber can perceive the decline of the communication quality from the notification by the VoIP gateway equipment.

Further, the subscriber can set/reset the monitoring/controlling or notifying of the communication status at any time by performing a DTMF-signal operation.

(1-3) Description of Notifying Operation of the Cryptographic-Processing Status in the First Embodiment of the Present Invention:

Next, a description will be made successively on various kinds of operation in the VoIP communication system according to the first embodiment of the present invention, specifically on monitoring/controlling operation and notifying operation of a cryptographic-processing status of voice data by the communication-status notification apparatus, with reference to FIG. 14.

In the following description, the cryptographic-processing status is not limited to a specific technology such as the cryptography, but genetically means various kinds of status related with setting/resetting or selecting of various kinds of cryptographic processing carried out over the IP network 9.

In the VoIP communication system according to the first embodiment of the present invention, the following four kinds of operations are performed as monitoring/controlling and notifying operations of the cryptographic-processing status by the communication-status notification apparatus.

(i) operation of cryptographic-processing voice data by the VoIP gateway equipment (monitoring/controlling operation of a cryptographic-processing status)

(ii) operation of notifying the subscriber terminal of information about the cryptographic-processing status by the VoIP gateway equipment (responding operation to a communication-status request)

(iii) operation of analyzing a request on monitoring/controlling or notifying of the cryptographic-processing status sent from the subscriber terminal, and operation of controlling the monitoring/controlling or notifying of the cryptographic-processing status in response to the content of the request, by the VoIP gateway equipment (responding operation to a communication-status request)

(iv) operation of monitoring a cryptographic-processing status in other VoIP gateway equipment by the VoIP gateway equipment (monitoring operation of cryptographic-processing status)

These operations will now be described in order.

(i) Description of Monitoring/Controlling Operation of Cryptographic-Processing Status First, operation of cryptographic-processing voice data by VoIP gateway equipment, which is incorporated with the communication-status notification apparatus of the present invention, will be described.

In the VoIP gateway equipment 1A, the communication-status monitor/control section 30 carries out a cryptographic-process on voice data sent to/received from the IP network 9.

Concretely, when voice data is received from the subscriber terminal by the interface section 11 and compression-processed by the audio CODEC section 12, the cryptographic-processing section 34 carries out a cryptographic process on the voice data, so that the IP-packet creation/analysis section 13 then carries out IP-packetization of the voice data to send the IP-packetized voice data to the IP network 9.

Also, when IP packets are transmitted from the IP network 9 and analyzed by the IP-packet creation/analysis section 13 to extract voice data contained in the IP packets, the cryptographic-processing section 34 resets the cryptographic process carried out on the voice data, so that the audio CODEC section 12 decompression-processes the voice data to send the decompression-processed voice data via the interface section 11 to the subscriber terminal.

The cryptographic-processing section 34 can choose at least one of a scramble process, an encryption process and an interleave process to carry out the chosen process as the cryptographic process on voice data.

Concretely, the cryptographic-processing section 34 has at least one of a specific rule to carry out the scramble process, a specific key for encryption/decryption to carry out the encryption process and a specific rule to carry out the interleave process.

Also, the monitor/control of the cryptographic-processing status, such as the selection of a kind of the cryptographic process carried out in the cryptographic-processing section 34 and the start/stop of the cryptographic-process, is performed by the cryptographic-processing selection/control section 36.

Further, the result of the monitoring/controlling of the cryptographic-processing status by the cryptographic-processing selection/control section 36 is stored in the communication-status storage section 37 as required.

(ii) Description of Responding Operation to Communication-Status Request

Next, operation of notifying the subscriber terminal of cryptographic-processing status by the VoIP gateway equipment, which is incorporated with the communication-status notification apparatus of the present invention, will be described with reference to FIG. 14.

Figure 14:
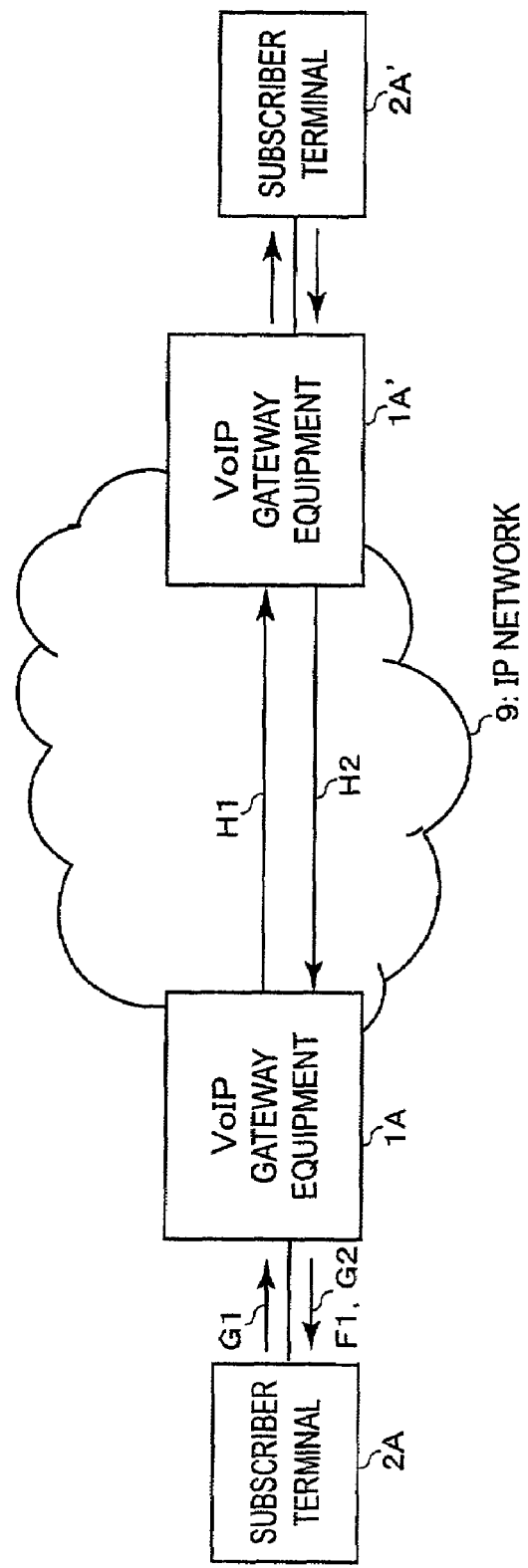
FIG. 14 illustrates a monitoring operation of a cryptographic-processing status by the VoIP gateway equipment according to the first embodiment of the present invention.

Also as shown in FIG. 14, two sets of VoIP gateway equipment 1A, 1A' are connected to an IP network 9, which includes a router 90. Each of the sets of VoIP gateway equipment 1A, 1A' is incorporated with the communication-status notification apparatus of the present invention, which apparatus has the arrangement as shown in FIG. 5, and is also connected with a respective one of the subscriber terminals 2A, 2A'.

This operation is generally similar to the notifying operation of communication status described in the above (ii) of the description (1-2) about notifying operation of traffic status.

Namely, the VoIP gateway equipment 1A notifies the subscriber terminal 2A, which is connected to the VoIP gateway equipment 1A, of the result of the monitoring/controlling of the cryptographic-processing status by the cryptographic-processing selection/control section 36, as information about the communication status monitored/controlled by the communication-status monitor/control section 30 (Step F1).

Concretely, the communication-status-notification control section 42 controls the interface section 11 to notify the subscriber terminal 2A of information about the result of the monitoring/controlling of the cryptographic-processing status, which is stored in the communication-status storage section 37, using the notification materials stored in the notification-material storing section 41.

The communication-status-notification control section 42 chooses at least one material from the notification materials of voice, character and image stored in the notification-material storing section 41, according to both a kind of subscriber terminal 2A to be notified, which kind is identified by controlling the interface section 11, and a kind of the communication-status information to be notified, and carries out the notification using the chosen notification materials.

(iii) Description of Responding Operation to Communication-Status Request

Next, operation of analyzing the content of a request on monitoring/controlling or notifying of the communication status sent from the subscriber terminal, and operation of controlling the monitoring/controlling or the notifying of communication status in response to the content, by the VoIP gateway equipment, which is incorporated with the communication-status notification apparatus according to the present invention, will be described.

This operation is generally similar to the responding operation of communication-status request in the above (iii) of the description (1-2) about notifying operation of traffic status.

Namely, the subscriber terminal 2A connected to the VoIP gateway equipment 1A sends to the VoIP gateway equipment 1A a request for starting, stopping or selecting in the form of voice signal in relation with the monitor/control of the cryptographic-processing status as described in the above (i) or notification of the cryptographic-processing status by notifying operation of a communication status described in the above (ii) (Step G1).

Then, the content of the request is analyzed by the function of the request analysis section 50, and the monitoring/controlling or the notifying of the communication status is carried out in response to the request (Step G2).

(iv) Description of Monitoring Operation of Cryptographic-Processing Status

Finally, operation of monitoring a cryptographic-processing status in other VoIP gateway equipment by the VoIP gateway equipment, which is incorporated with the communication-status notification apparatus according to the present invention, will be described with reference to FIG. 14.

In order that the subscriber terminals 2A, 2A' send/receive voice data, on which the scramble process, the encryption process or the interleave process is carried out, to/from each other, the two sets of VoIP gateway equipment 1A, 1A', to which the subscriber terminals 2A, 2A' are respectively connected, need to have common rules for the scramble process, common keys for the encryption process and common rules for the interleave process.

Accordingly, the VoIP gateway equipment 1A with the communication-status notification apparatus has a function to discriminate whether or not other VoIP gateway equipment 1A', which serves as a companion with the VoIP gateway equipment 1A for voice data transmission, can exchange voice data on which a cryptographic process is carried out with the VoIP gateway equipment 1A, namely, whether or not the companion VoIP gateway equipment 1A' has a common rule for the scramble process, a common key for the encryption process and a common rule for the interleave process to the VoIP gateway equipment 1A.

The monitoring operation of a cryptographic-processing status is mainly carried out by the cryptographic-processing monitoring section 35 of each of the sets of VoIP gateway equipment 1A, 1A'.

Concretely, in the VoIP gateway equipment 1A, the cryptographic-processing-information request section 351 controls the IP-packet creation/analysis section 13 to create a cryptographic-processed-data IP packet, containing data on which one of the scramble process, the encryption process and the interleave process was carried out, and a cryptographic-processing-request IP packet, containing a signal requesting the companion VoIP gateway equipment 1A' to decipher the cryptographic-processed data and to send the deciphered data back, and sends the cryptographic-processed-data IP packet and the cryptographic-processing-request IP packet over the IP network 9 toward the companion VoIP gateway equipment 1A' connected to the IP network 9 (Step H1).

Next, in the companion VoIP gateway equipment 1A', the cryptographic-processing-information sending section 354 controls the IP-packet creation/analysis section 13 to discriminate the cryptographic-processed-data IP packet and the cryptographic-processing-request IP packet, both of which were sent from other VoIP gateway equipment 1A connected to the IP network 9, out of IP packets received from the IP network 9 by the IP-packet creation/analysis section 13. Then the cryptographic-processing-information sending section 354 deciphers the cryptographic-processed data contained in the cryptographic-processed-data IP packet in response to a signal contained in the cryptographic-processing-request IP packet. Subsequently, the cryptographic-processing-information sending section 354 further controls the IP-packet creation/analysis section 13 to create an IP packet containing the result of the decipher of the cryptographic-processed data, and to send the created IP packet to the companion VoIP gateway equipment 1A, from which the cryptographic-processed-data IP packet and the cryptographic-processing-request IP packet was sent (Step H2).

In the VoIP gateway equipment 1A, the cryptographic-processing-information obtaining section 352 controls the IP-packet creation/analysis section 13 to obtain the result of the decipher (deciphered data or decoded data) of the cryptographic-processed data, which was sent from the companion VoIP gateway equipment 1A' connected to the IP network 9 in response to the cryptographic-processed-data IP packet and the cryptographic-processing-request IP packet, out of IP packets received from the IP network 9 and depacketized by the IP-packet creation/analysis section 13. The cryptographic-processing-information analysis section 353 then analyzes a cryptographic-processing status in the companion VoIP gateway equipment 1A' based on the result of the decipher by the companion VoIP gateway equipment 1A', which was obtained by the cryptographic-processing-information obtaining section 352.

Finally, the cryptographic-processing monitoring section 35 chooses one of the following three measures according to a kind of the cryptographic process carried out by the cryptographic-processing section 34, thereby carrying out the operation of monitoring the cryptographic-processing status in the companion VoIP gateway equipment 1A'.

① A measure to discriminate whether or not the companion VoIP gateway equipment 1A' has a common rule for the scramble process to the VoIP gateway equipment 1A In this measure, the cryptographic-processing-information request section 351 creates a cryptographic-processed-data IP packet, which contains data scrambled by the scramble process, and sends the created cryptographic-processed-data IP packet together with the cryptographic-processing-request IP packet to the companion VoIP gateway equipment 1A'. Further, the cryptographic-processing-information analysis section 353 discriminates whether or not the companion VoIP gateway equipment 1A' has decoded (deciphered) the cryptographic-processed data (the scrambled data) correctly, thereby discriminating whether or not the companion VoIP gateway equipment 1A' has a common rule for the scramble process to the VoIP gateway equipment 1A.

② A measure to discriminate whether or not the companion VoIP gateway equipment 1A' has a common key for the encryption process to the VoIP gateway equipment 1A In this measure, the cryptographic-processing-information request section 351 creates a cryptographic-processed-data IP packet, which contains data encrypted by the encryption process, and sends the created cryptographic-processed-data IP packet together with the cryptographic-processing-request IP packet to the companion VoIP gateway equipment 1A'. Further, the cryptographic-processing-information analysis section 353 discriminates whether or not the companion VoIP gateway equipment 1A' has deciphered the cryptographic-processed data (the encrypted data) correctly, thereby discriminating whether or not the companion VoIP gateway equipment 1A' has a common key for the encryption process to the VoIP gateway equipment 1A.

③ A measure to discriminate whether or not the companion VoIP gateway equipment 1A' has a common rule for the interleave process to the VoIP gateway equipment 1A In this measure, the cryptographic-processing-information request section 351 creates a cryptographic-processed-data IP packet, which contains data interleaved by the interleave process, and sends the created cryptographic-processed-data IP packet together with the cryptographic-processing-request IP packet to the companion VoIP gateway equipment 1A'. Further, the cryptographic-processing-information analysis section 353 discriminates whether or not the companion VoIP gateway equipment 1A' has deciphered the cryptographic-processed data (the interleaved data) correctly, thereby discriminating whether or not the companion VoIP gateway equipment 1A' has a common rule for the interleave process to the VoIP gateway equipment 1A.

By selectively using the above-described measures ①–③, the VoIP gateway equipment 1A, which is incorporated with the communication-status notification apparatus according to the present invention, discriminates whether or not the companion VoIP gateway equipment 1A' can exchange voice data, on which a cryptographic process has been carried out, with the VoIP gateway equipment 1A, namely, whether or not the companion VoIP gateway equipment 1A' has the common rule for the scramble process, the common key for the encryption process and the common rule for the interleave process to the VoIP gateway equipment 1A.

The cryptographic-processing selection/control section 36 controls a cryptographic process carried out by the cryptographic-processing section 34 based on a cryptographic-processing status of the companion VoIP gateway equipment 1A' monitored by the above-described operation of the cryptographic-processing-status monitor section 35.

Concretely, the cryptographic-processing selection/control section 36 chooses a cryptographic process carried out by the cryptographic-processing section 34 so that the cryptographic-processing section 34 carries out the same kind of cryptographic process for voice-data transmission as the cryptographic process which the companion VoIP gateway equipment 1A' is able to carry out.

As described above, according to the VoIP gateway equipment incorporated with the communication-status notification apparatus of the present invention, by carrying out (i) the monitoring/controlling operation of a cryptographic-processing status, (ii) the responding operation to a communication-status request, (iii) the responding operation to a communication-status request and (iv) the monitoring operation of a cryptographic-processing status, the subscriber can control (select, start or stop) the cryptographic-process carried out on voice data in the VoIP gateway equipment connected to the subscriber terminal, and also can perceive the current setting status of the cryptographic process in the VoIP gateway equipment, easily via the subscriber's own terminal.

Further, the subscriber can select cryptographic process to be performed on voice data easily via the subscriber's own terminal, utilizing efficiently the conventional cryptographic processes commonly used in ordinary data communication such as the scramble process, the encryption process and the interleave process.

Also, the subscriber can perceive cryptographic-processing status in the companion VoIP gateway equipment and a companion subscriber terminal connected to the companion VoIP gateway equipment, and can set the cryptographic process carried out on voice data, easily via the subscriber's own terminal.

In the following description, some expectable services realized by selectively combining the above-described operations (i), (ii), (iii) and (iv) will be described, using an example of a voice call over telephones.

① A service in which a subscriber can set a desired cryptographic process by a DTMF-signal operation during a voice call First, during a voice call over telephones, a subscriber sends via the subscriber terminal to VoIP gateway equipment a request to select a specific cryptographic process and to start the selected cryptographic process, by carrying out a predetermined DTMF-signal operation.

In the VoIP gateway equipment, on detecting the DTMF signal in the DTMF-signal detection section 14, the request-information analysis section 51 analyzes the content of the request and, when the request turned out to be about selecting a kind of cryptographic process and starting the selected cryptographic process, the request-receiving control section 52 controls the cryptographic-processing-status monitor section 35 to discriminate whether or not a VoIP gateway equipment, connected with a companion subscriber terminal for voice call, is able to carry out the cryptographic process selected by the request from the subscriber terminal.

During the discriminating, the communication-status-notification control section 42 controls the interface section 11 to notify the subscriber terminal 2 of a message requesting the subscriber to wait for a while.

When the companion VoIP gateway equipment turned out to be capable of carrying out the cryptographic process specified by the subscriber as a result of the discrimination by the cryptographic-processing-status monitor section 35, the cryptographic-processing selection/control section 36 controls the cryptographic-processing section 34 to start the selected cryptographic process. Further, the communication-status-notification control section 42 controls the interface section 11 to notify the subscriber terminal 2 of a message that the selected cryptographic process has just been started.

On the contrast, when the companion VoIP gateway equipment turned out not to be capable of carrying out the cryptographic process selected by the subscriber as a result of the discrimination by the cryptographic-processing-status monitor section 35, the communication-status-notification control section 42 controls the interface section 11 to notify the subscriber terminal 2 of a message showing that the selected cryptographic process is not usable and requesting to reselect another kind of cryptographic process.

In response to the message, the subscriber reselects another cryptographic process by a predetermined DTMF-signal operation of the subscriber terminal. When the reselected cryptographic process is usable, the reselected cryptographic process is started according to the above-described procedure.

After the subscriber has selected some kinds of cryptographic processes and when all the selected cryptographic processes are not usable, the communication-status-notification control section 42 controls the interface section 11 to notify the subscriber terminal 2 of a message showing that all the selected cryptographic processes are not usable and that the voice call is continued without any cryptographic processing.

During the voice call with the selected cryptographic process, when the subscriber carries out a predetermined DTMF-signal operation to send a request to reset (cancel) the cryptographic process to the VoIP gateway equipment, the VoIP gateway equipment carries out operation to reset (cancel) the cryptographic process.

Also, it is possible to arrange that when the subscriber carries out a predetermined DTMF-signal operation before requesting to select or start the cryptographic process, the VoIP gateway equipment notify the subscriber terminal of a message showing a procedure of setting/selecting operation of the cryptographic process, variations of cryptographic processes being selectable, details of safety or a delay time according to each variation, or the like.

② A service in which the subscriber can set a desired cryptographic process by a DTMF-signal operation before a voice call As a modification of the service ①, it is also possible to provide another service, in which the subscriber first makes a call to the VoIP gateway equipment, connected with the subscriber's terminal, before a voice call and sends a request to select a cryptographic process to start the process. Monitoring a message, sent from the VoIP gateway equipment, regarding whether or not the companion VoIP gateway equipment is enable to carry out the selected cryptographic process, the subscriber can request a voice call with a desired cryptographic process with specify a companion for the voice call.

(1-4) Description of Notifying Operation of Communication Status in the First Embodiment of the Present Invention:

In the several kinds of operation described above, (iii) the responding operation to the communication-status request, described in (1-2) and (1-3), corresponds to the steps of (a) sending from the subscriber terminal to the VoIP gateway equipment, connected to the subscriber terminal, a request on monitoring/controlling or notifying of a communication status of the IP network, the request being contained in voice data transmitted over the IP communication network, and (b) discriminating at the VoIP gateway equipment whether or not the voice data received from the subscriber terminal contains the request sent by the subscriber terminal in the step (a) and, when the voice data received from the subscriber terminal contains the request, analyzing the content of the request contained in the voice data.

Also, (i) the monitoring operation of the traffic status, described in (1-2), and (i) the monitoring/controlling operation of a cryptographic-processing status, described in (1-3), correspond to the step of (c) monitoring/controlling the communication status of the IP network based on a processing status of the voice data in the VoIP gateway equipment in response to the content of the request analyzed in the step (b).

Further, each (ii) the notifying operation of communication status, described in (1-2) and (1-3), corresponds to the step of (d) notifying the subscriber terminal of the communication status monitored/controlled in the step (c) in response to the content of the request analyzed in the step (b).

(2) Description of First Modification of the First Embodiment of the Present Invention:

It is also possible to incorporate a VoIP gateway terminal with a communication-status notification apparatus as described in the first embodiment of the present invention.

As the first modification of the first embodiment of the present invention, a VoIP communication system as shown in FIG. 1 including a VoIP gateway terminal 1T, which is incorporated with the communication-status notification apparatus, will be described.

Already referred to in the description of the aspects of the present invention, the VoIP communication system shown in FIG. 1 is again referred to for describing the first modification of the first embodiment of the present invention because of the same reason as that used in the description of the first embodiment of the present invention.

Arrangements of VoIP gateway equipment, being companion of the VoIP gateway terminal 1T for voice-data transmission, and a router, both used in the present modification, are equivalent to the arrangements of the VoIP gateway equipment and the router described in the first embodiment of the present invention. Accordingly, in the following description of arrangements of the present embodiment, only an arrangement of the VoIP gateway terminal, incorporated with the communication-status notification apparatus of the present modification, will be described.

(2-1) Description of Arrangement of the VoIP Gateway Terminal Incorporated with the Communication-Status Notification Apparatus of the First Modification:

First, an arrangement of the VoIP gateway terminal, incorporated with the communication-status notification apparatus of the first modification, will be described with reference to FIG. 15.

Figure 15:
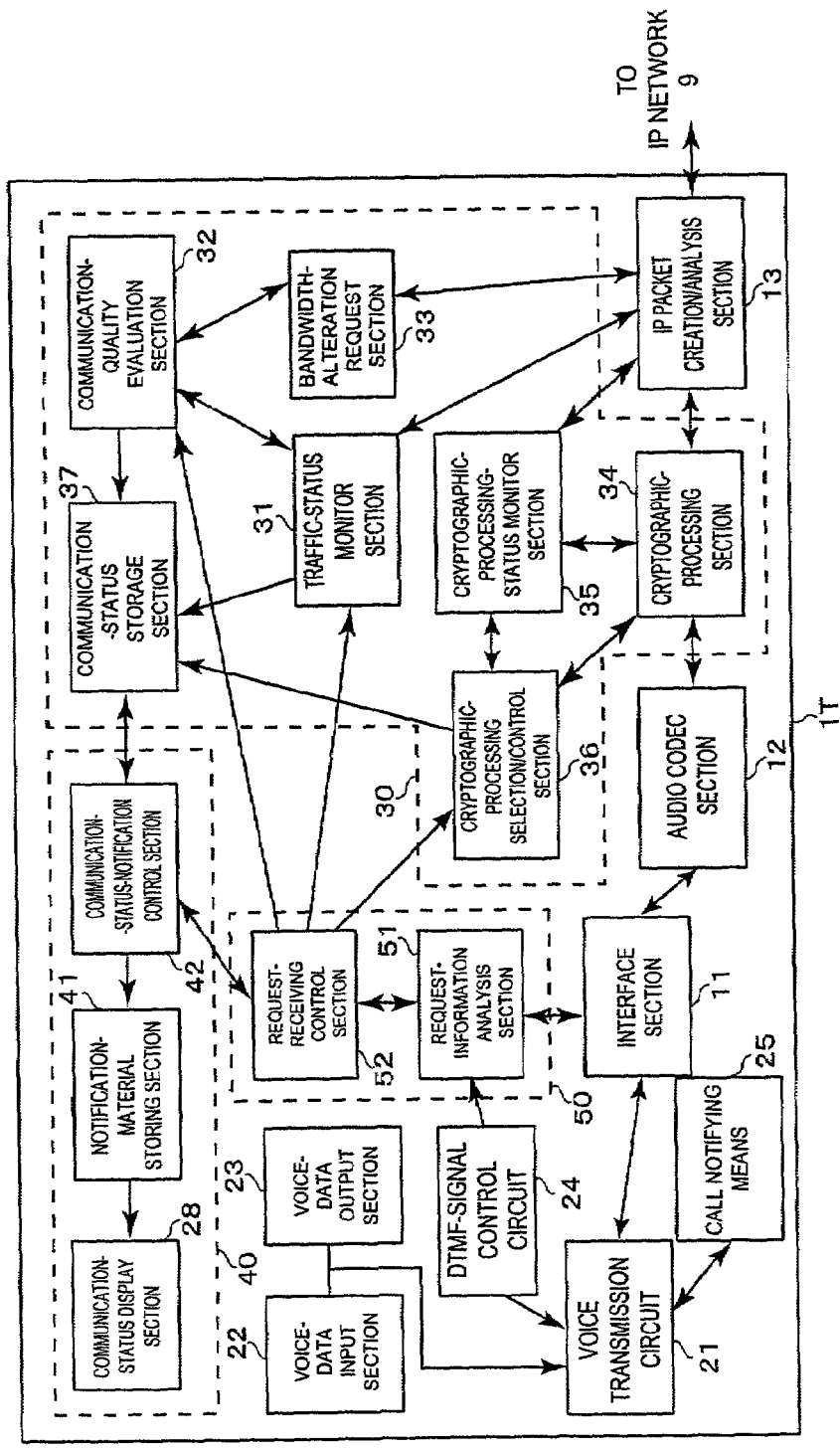
FIG. 15 is a block diagram showing a VoIP gateway terminal incorporated with a communication-status notification apparatus according to a first modification of the first embodiment of the present invention.

FIG. 15 is a block diagram showing the VoIP gateway terminal incorporated with the communication-status notification apparatus according to the first modification of the first embodiment of the present invention. The VoIP gateway terminal is equivalent to, for example, the VoIP gateway terminal 1T shown in FIG. 1, being equipped with both the VoIP-gateway mechanism for transmitting voice data by converting a voice signal into IP packets, and vice versa, and the subscriber terminal mechanism for voice communication, and also with a notification function of communication status according to the present invention.

Each of components of the VoIP gateway terminal 1T shown in FIG. 15 has the same function as that of the respective component with the same numeral of the VoIP gateway equipment shown in FIG. 5 or the subscriber terminal shown in FIG. 9, with the exception of the following points.

A communication-status-notification control section 42 has a function to control a communication-status display section 28 to display various kinds of information stored in the communication-status storage section 37, such as information about traffic status of the IP network 9 monitored by the traffic-status monitor section 31, information about the communication quality of voice data evaluated by the communication-quality evaluation section 32 and information about the result of the selection/control of the cryptographic processing by the cryptographic-processing selection/control section 36, using the notification materials stored in the notification-material storing section 41.

The communication-status display section 28 has a function to display, under the control by the communication-status-notification control section 42, various kinds of information stored in the communication-status storage section 37, such as information about traffic status of the IP network 9 monitored by the traffic-status monitor section 31, information about the communication quality of voice data evaluated by the communication-quality evaluation section 32 and information about the result of the selection/control of the cryptographic processing by the cryptographic-processing selection/control section 36, using the notification materials stored in the notification-material storing section 41.

A request-information analyzing section 51 has a function to discriminate whether or not a set of DTMF signals inputted by the subscriber via the DTMF-signal operation circuit 24 includes a DTMF signal corresponding to a request on monitoring/controlling of the communication status from the subscriber terminal and, when there is a DTMF signal corresponding to any request, to analyze the content of the request.

(2-2) Description of Operations of the VoIP Gateway Terminal Incorporated with the Communication-Status Notification Apparatus of the First Modification:

Next, operations in the VoIP communication system according to the first modification the first embodiment of the present invention will be described with reference to FIG. 16.

Operations carried out in the VoIP communication system of the present modification are generally equivalent to the detailed operations (i), (ii), (iii) and (iv) of (1-2) the notifying operation of the traffic status, and the detailed operations (i), (ii), (iii) and (iv) of (1-3) the notifying operation of the cryptographic-processing status, according to the first embodiment of the present invention. In the following, accordingly, only the operations different from the detailed operations of the first embodiment will be described.

Figure 16:
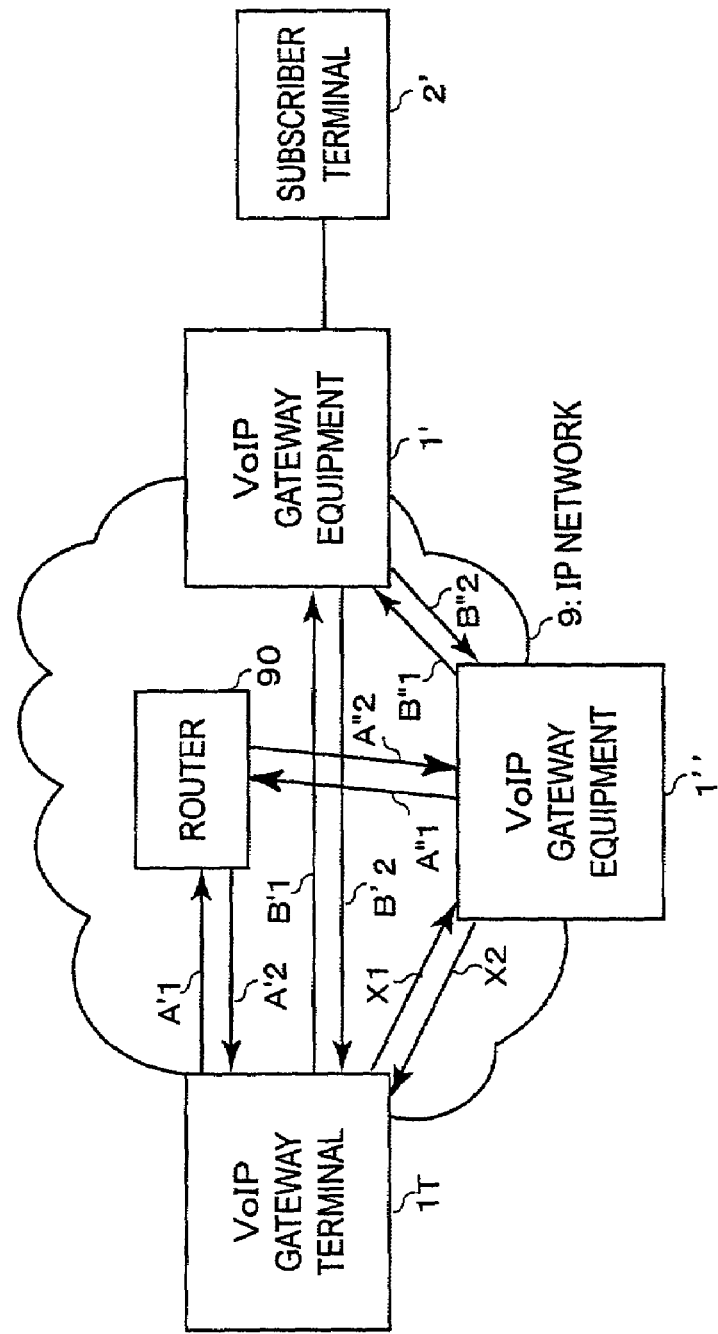
FIG. 16 illustrates a monitoring operation of a communication status by the VoIP gateway terminal according to the first modification of the first embodiment of the present invention.

As shown in FIG. 16, a VoIP gateway terminal 1T and two sets of VoIP gateway equipment 1', 1" are connected to an IP network 9, which includes a router 90. The VoIP gateway terminal 1T is incorporated with the communication-status notification apparatus of the present invention, which apparatus has the arrangement as shown in FIG. 15. Each of the sets of VoIP gateway equipment 1', 1" is incorporated with the communication-status notification apparatus of the present invention, which apparatus has the arrangement as shown in FIG. 5. One set of VoIP gateway equipment 1' is also connected with a subscriber terminal 2'.

The following description is concentrated on operations by the VoIP gateway terminal 1T.

When the VoIP gateway terminal 1T requests the router 90 in the IP network 9 or VoIP gateway equipment 1' connected to the IP network 9 to notify of information about the traffic status or information about the cryptographic-processing status, the VoIP gateway terminal 1T itself exchanges IP packets between the object router 90 or the VoIP gateway equipment 1' (Steps A'1, A'2, Steps B'1, B'2). The Steps A'1, A'2 and the Steps B'1, B'2 in FIG. 16 correspond to the Steps A1, A2 and the Steps B1, B2 shown in FIG. 11, respectively.

In the meantime, the VoIP gateway terminal 1T is used by a personal subscriber, there is a possibility that the details of the VoIP gateway terminal are identified by the VoIP gateway equipment 1' or the subscriber terminal 2' connected to the VoIP gateway equipment 1', being a companion for voice transmission.

Accordingly, when the VoIP gateway terminal 1T carries out any monitoring/controlling operation of the network having a possibility that the details of the VoIP gateway terminal 1T are identified by other equipment or another terminal, the VoIP gateway terminal 1T requests other VoIP gateway equipment 1" to carry out the desired monitoring/controlling operation of the communication status (Steps X1 and X2), so that the requested VoIP gateway equipment 1" carry out the desired monitoring/controlling operation of the communication status in behalf of the VoIP gateway terminal 1T (Steps A"1 and A"2, Steps B"1 and B"2). Also the Steps A"1, A"2 and the Steps B"1, B"2 in FIG. 16 correspond to the Steps A1, A2 and the Steps B1, B2 shown in FIG. 11, respectively.

(3) Description of Second Modification of the First Embodiment of the Present Invention:

As described above, the communication-status notification apparatus described in the first embodiment of the present invention, which is capable of monitoring/controlling or notifying two kinds of communication status in an IP network as specific aspects of the communication status, namely, the traffic status in an IP network and the cryptographic-processing status of voice data.

It is also possible to provide a communication-status notification apparatus which is equipped with only components related with one of the two kinds of communication status, thereby still enabling to monitor/control or notify of the one kind of communication status.

The following description will be first made on, as the second modification of the first embodiment of the present invention, a VoIP communication system as shown in FIG. 1 including VoIP gateway equipment 1A, which is incorporated with a communication-status notification apparatus having an arrangement for monitoring/controlling or notifying of only the traffic status in the IP network.

Already referred to in the description of the aspects of the present invention, the VoIP communication system shown in FIG. 1 is again referred to for describing the present modification because of the same reason as that used in the description about the first embodiment of the present invention.

Arrangements of VoIP gateway equipment, being companion of the VoIP gateway equipment 1A for voice-data transmission, and a router, both used in the present modification, are equivalent to the arrangements of the VoIP gateway equipment and the router described in the first embodiment of the present invention. Accordingly, in the following description, only an arrangement of the VoIP gateway equipment 1A incorporated with the communication-status notification apparatus of the present modification will be described.

(3-1) Description of Arrangement of the VoIP Gateway Equipment Incorporated with the Communication-Status Notification Apparatus of the Second Modification:

First, an arrangement of the VoIP gateway equipment, incorporated with the communication-status notification apparatus of the second modification, will be described with reference to FIG. 17.

Figure 17:
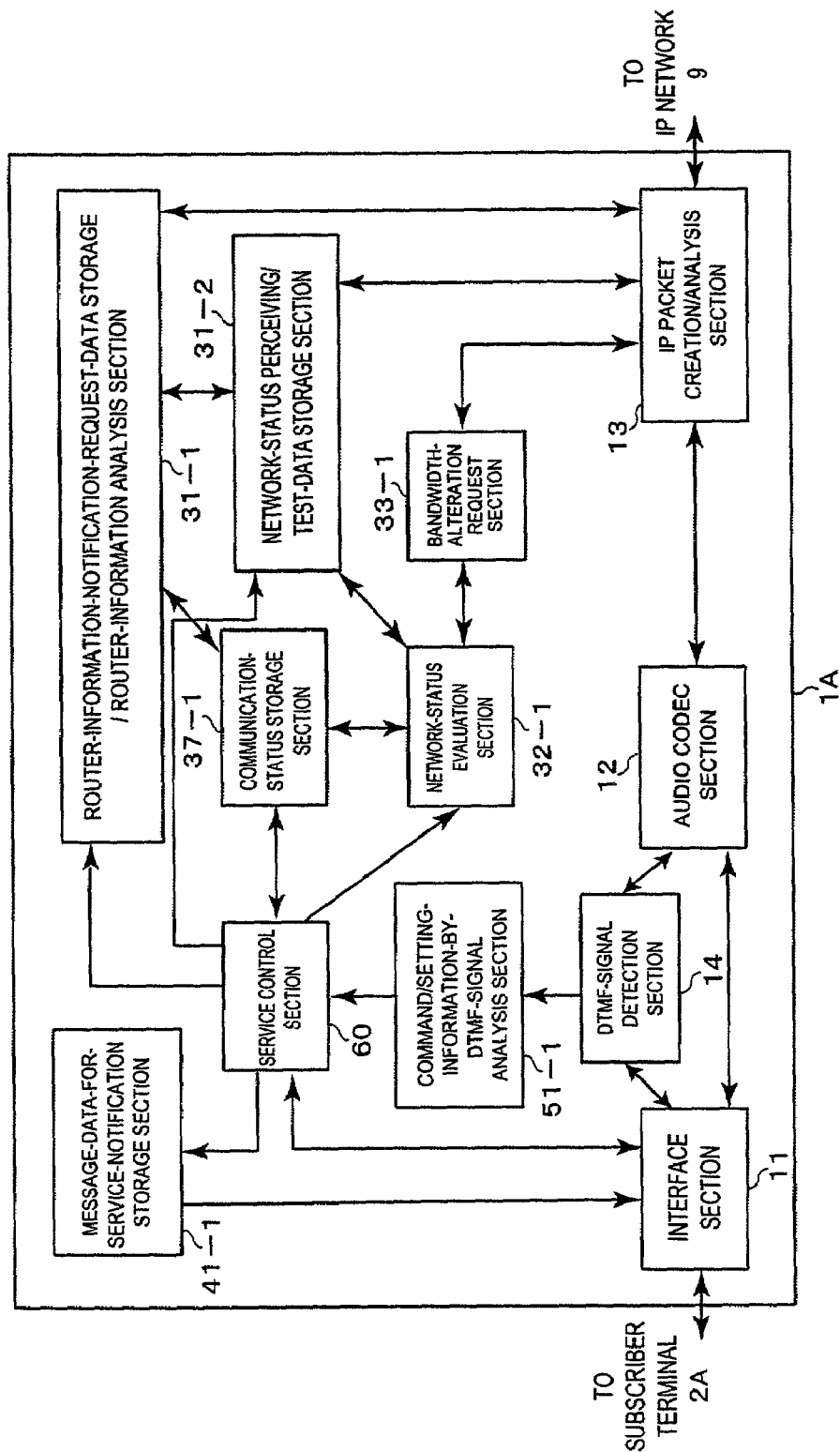
FIG. 17 is a block diagram showing VoIP gateway equipment incorporated with a communication-status notification apparatus according to a second modification of the first embodiment of the present invention.

FIG. 17 is a block diagram showing the VoIP gateway equipment incorporated with the second modification of the first embodiment of the present invention. The VoIP gateway equipment shown in FIG. 17 is equivalent to, for example, the VoIP gateway equipment 1A shown in FIG. 1, being equipped with the VoIP-gateway mechanism for transmitting voice data by converting a voice signal into IP packets, and vice versa, and also with a notification function of traffic status according to the present invention.

Each of components of the VoIP gateway equipment 1A shown in FIG. 17 has the same function as that of the respective component with the same numeral of the VoIP gateway equipment shown in FIG. 5.

(3-2) Description of Operations of the VoIP Gateway Equipment Incorporated with the Communication-Status Notification Apparatus of the Second Modification:

Next, operations in the VoIP communication system according to the second modification of the first embodiment of the present invention will be described.

Operations carried out in the VoIP communication system of the present modification are generally equivalent to the detailed operations (i), (ii), (iii) and (iv) of (1-2) the notifying operation of the traffic status, of the first embodiment of the present invention.

With such a simpler arrangement than that of the communication-status notification apparatus of the first embodiment arrangement, it is possible to realize the function of monitoring/controlling and notifying the traffic status of the IP network.

(4) Description of Third Modification of the First Embodiment of the Present Invention:

Next, as the third modification of the first embodiment of the present invention, a VoIP communication system as shown in FIG. 1, including VoIP gateway equipment 1A, which is incorporated with a communication-status notification apparatus having an arrangement for monitoring/ controlling or notifying of only the cryptographic-processing status of the voice data, will be described.

Already referred to in the description of the aspects of the present invention, the VoIP communication system shown in FIG. 1 is again referred to for describing the present modification because of the same reason as that used in the description about the first embodiment of the present invention.

Arrangements of a subscriber terminal and a router both used in the present modification are equivalent to the arrangements of the subscriber terminal and the router described in the first embodiment of the present invention. Accordingly, in the following description of arrangements of the present embodiment, only an arrangement of the VoIP gateway equipment 1A, incorporated with the communication-status notification apparatus of the present modification, will be described.

(4-1) Description of Arrangement of the VoIP Gateway Equipment Incorporated with the Communication-Status Notification Apparatus of the Third Modification:

First, an arrangement of the VoIP gateway equipment, incorporated with the communication-status notification apparatus of the third modification, will be described with reference to FIG. 18.

Figure 18:
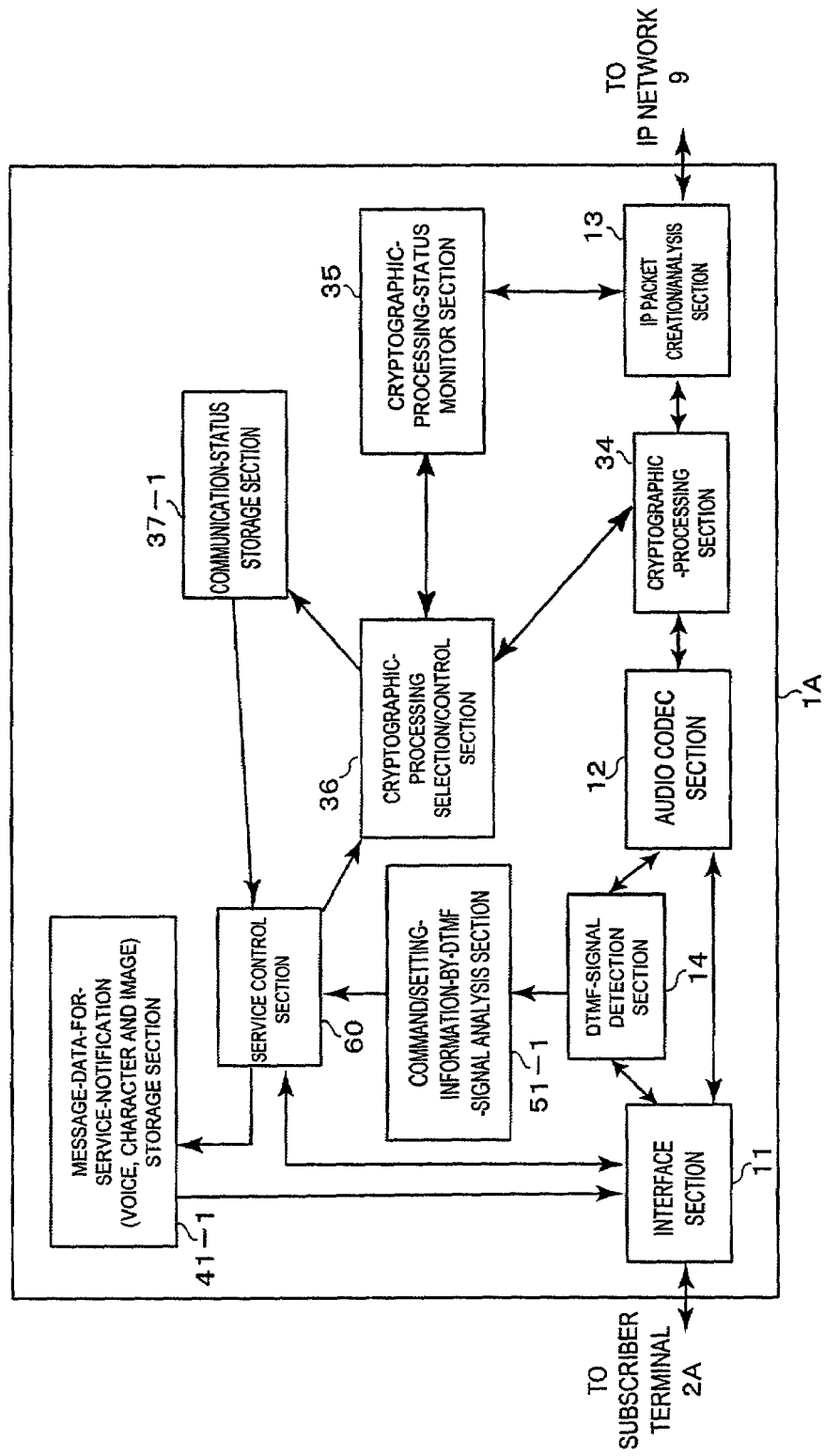
FIG. 18 is a block diagram showing VoIP gateway equipment incorporated with a communication-status notification apparatus according to a third modification of the first embodiment of the present invention.

FIG. 18 is a block diagram showing the VoIP gateway equipment incorporated with the communication-status notification apparatus according to the third modification of the first embodiment of the present invention. The VoIP gateway equipment shown in FIG. 18 is equivalent to, for example, the VoIP gateway equipment 1A shown in FIG. 1, being equipped with the VoIP-gateway mechanism for transmitting voice data by converting a voice signal into IP packets, and vice versa, and also with a notification function of cryptographic-processing status according to the present invention.

Each of components of the VoIP gateway equipment 1A shown in FIG. 18 has the same function as that of the respective component with the same numeral of the VoIP gateway equipment shown in FIG. 5.

(4-2) Description of Operations of the VoIP Gateway Equipment Incorporated with the Communication-Status Notification Apparatus of the Third Modification:

Next, operations in the VoIP communication system according to the third modification of the first embodiment of the present invention will be described with reference to FIG. 19.

Operations carried out in the VoIP communication system of the present modification are generally equivalent to the detailed operations (i), (ii), (iii) and (iv) of (1-3) the notifying operation of cryptographic-processing status, of the first embodiment of the present invention.

The following description will be made on detailed processes carried out by the VoIP gateway equipment on a voice signal received from a subscriber terminal or an IP packet received from the IP network.

Receiving a voice signal from the subscriber terminal, the VoIP gateway equipment first detects a DTMF signal included in the voice signal (I1), and carries out voice-addition/level-control process on the voice signal (I2) as preprocessing. Next, the VoIP gateway equipment sets an appropriate cryptographic process on (cryptographic-processes) the preprocessed voice signal (I3). Then, the VoIP gateway equipment compresses the cryptographic-processed voice signal into voice data according to the audio CODEC (I4), and IP-packetizes (makes an IP packet containing) the compressed voice data (I5), so as to send the created IP packet over the IP network toward a companion gateway or terminal (I6).

On the other hand, receiving an IP packet from the IP network, the VoIP gateway equipment first depacketizes the IP packet to extract cryptographic-processed voice data contained in the IP packet (J1) and resets the appropriate cryptographic process set on the voice data (decodes the cryptographic-processed voice data) (J2). Next, the VoIP gateway equipment decompresses the decoded voice data into a voice signal according to the audio CODEC (J3) and carries out voice-addition/level-control process on the voice signal (J4), so as to send the resultant voice signal to the subscriber terminal.

Figure 19:
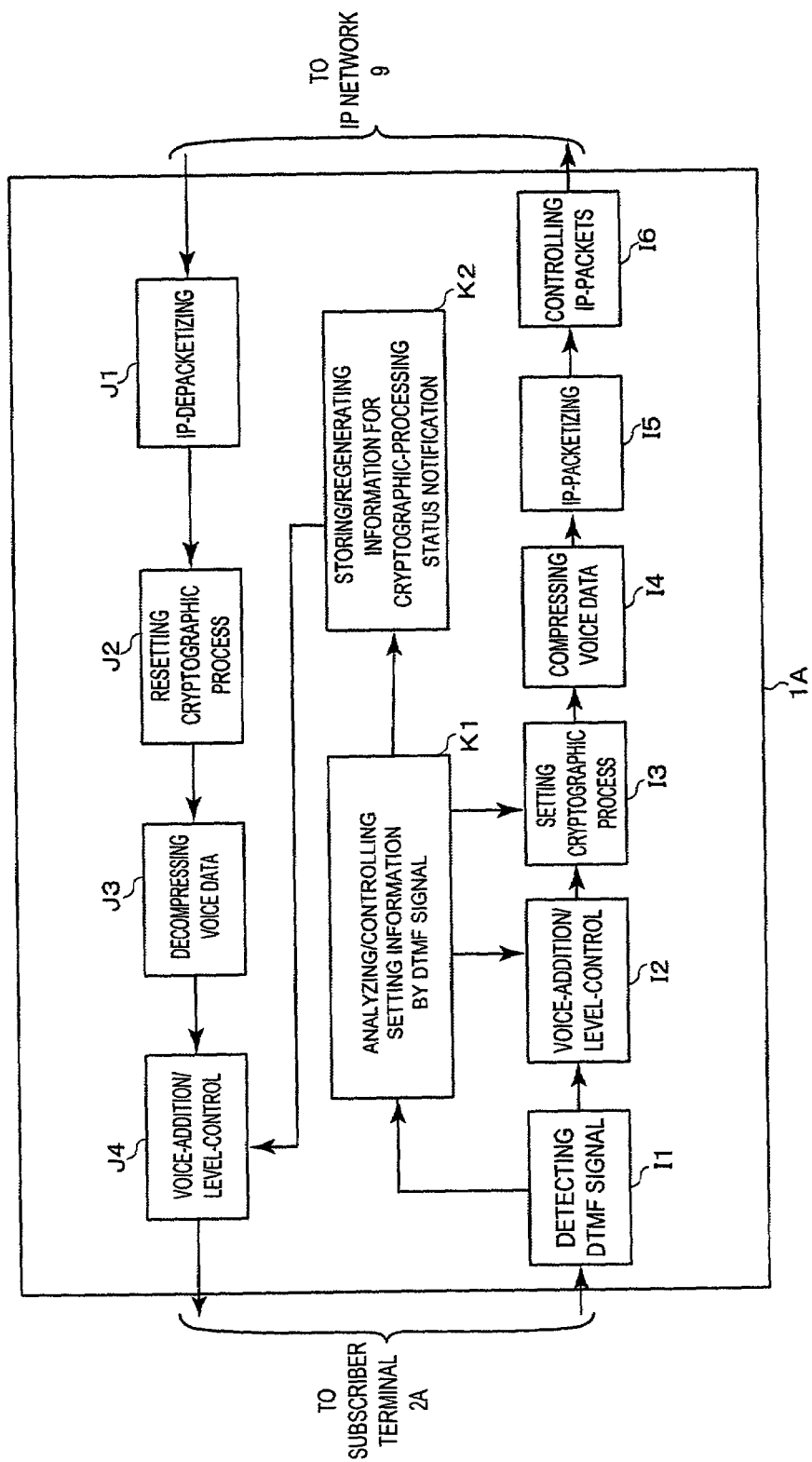
FIG. 19 illustrates a cryptographic-processing operation by the VoIP gateway equipment incorporated with the communication-status notification apparatus according to the third modification of the first embodiment of the present invention.

Although the order of the compression/decompression process and the set/reset process of cryptographic process as shown in FIG. 19 is contrary to the order of the corresponding processes according to the arrangement of the first embodiment of the present invention as shown in FIG. 5, it is noted that either order is practically possible and therefore does not affect the gist of the present invention.

Further, on detecting any DTMF signal included in the voice signal received from the subscriber terminal, the VoIP gateway equipment discriminates whether or not the DTMF signal corresponds to a request on selecting, controlling or notifying of the cryptographic process and, when the DTMF signal corresponds to any request, analyzes the content of the request, so as to control the voice-addition/level-control process or the setting of the cryptographic process in response to the content of the request (K1).

Also, by controlling a voice signal to be sent to the subscriber terminal in response to a request on monitoring/ controlling or notifying of the cryptographic-processing status from the subscriber terminal, the cryptographic-processing status is notified to the subscriber terminal (K2).

With such a simple arrangement than that of the communication-status notification apparatus of the first embodiment arrangement, it is possible to realize the function of monitoring/controlling and cryptographic-processing status on voice data.

(5) Description of the Fourth Modification of the First Embodiment of the Present Invention:

As described above, the communication-status notification apparatus described in the first embodiment of the present invention, which has the communication-status monitor/control section 30, the communication-status notification section 40 and the request analysis section 50.

It is also possible to provide a communication-status notification apparatus which is equipped with only the communication-status monitor/control section 30 and the communication-status notification section 40, thereby still enabling to monitor/control or notify of the communication status.

The following description will be made on, as the fourth modification of the first embodiment of the present invention, a VoIP communication system as shown in FIG. 1 including VoIP gateway equipment 1A, which is incorporated with a communication-status notification apparatus having only a communication-status monitor/control section and a communication-status notification section.

Already referred to in the description of the aspects of the present invention, the VoIP communication system shown in FIG. 1 is again referred to for describing the present modification because of the same reason as that used in the description about the first embodiment of the present invention.

Arrangements of a subscriber terminal and a router both used in the present modification are equivalent to the arrangements of the subscriber terminal and the router described in the first embodiment of the present invention. Accordingly, in the following description, only an arrangement of the VoIP gateway equipment, incorporated with the communication-status notification apparatus of the present modification, will be described.

(5-1) Description of Arrangement of the VoIP Gateway Equipment Incorporated with the Communication-Status Notification Apparatus of the Fourth Modification:

First, an arrangement of the VoIP gateway equipment, incorporated with the communication-status notification apparatus of the fourth modification, will be described with reference to FIG. 20.

Figure 20:
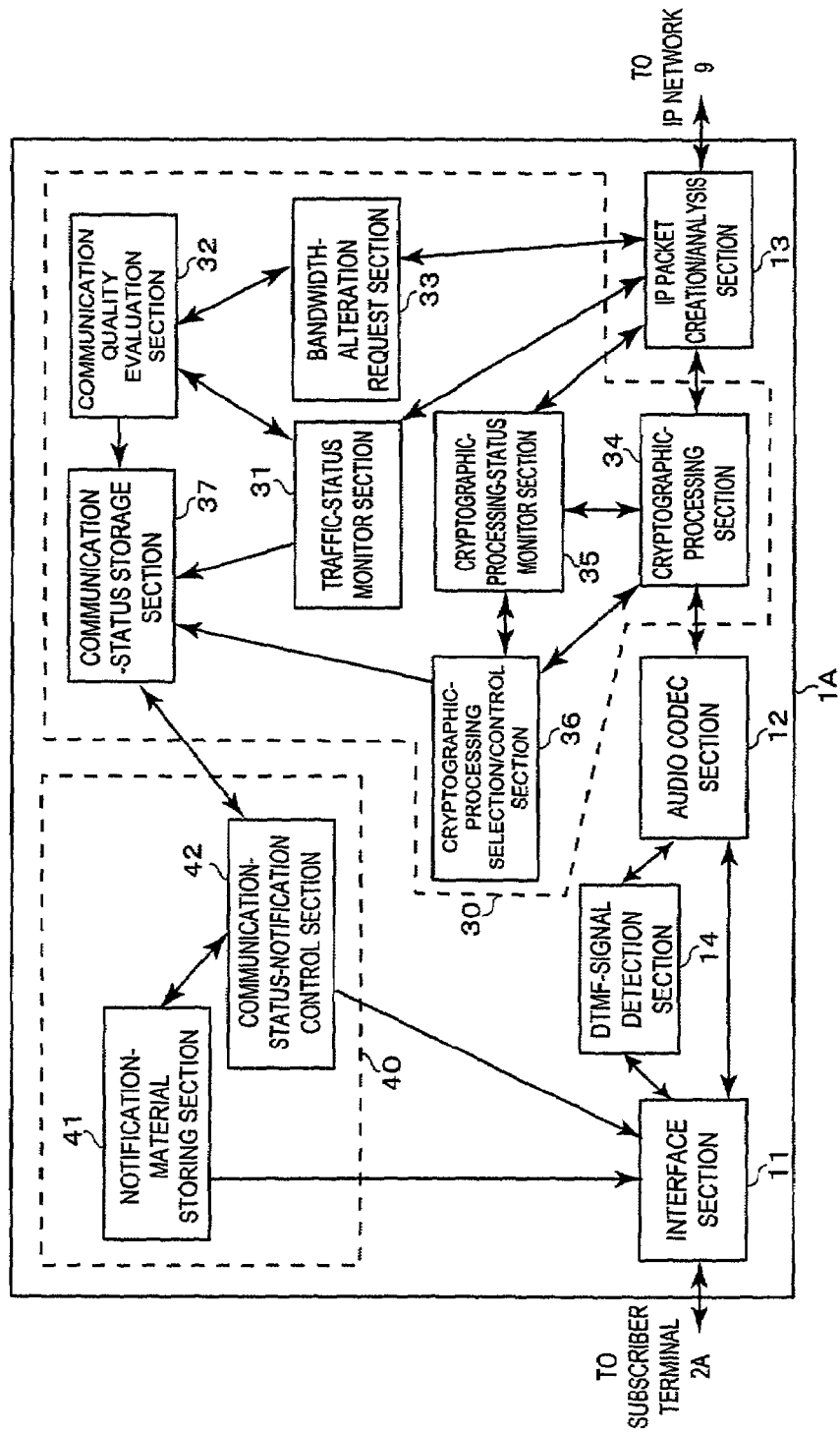
FIG. 20 is a block diagram showing VoIP gateway equipment incorporated with a communication-status notification apparatus according to a fourth modification of the first embodiment of the present invention.

FIG. 20 is a block diagram showing the VoIP gateway equipment incorporated with the fourth modification of the first embodiment of the present invention. The VoIP gateway equipment shown in FIG. 20 is equivalent to, for example, the VoIP gateway equipment 1A shown in FIG. 1, being equipped with the VoIP-gateway mechanism for transmitting voice data by converting a voice signal into IP packets, and vice versa, and also with a notification function of communication status (such as a traffic status and a cryptographic-processing status) according to the present invention.

Each of components of the VoIP gateway equipment 1A shown in FIG. 20 has the same function as that of the respective component with the same numeral of the VoIP gateway equipment shown in FIG. 5.

In other words, the VoIP gateway equipment 1A shown in FIG. 20 has the arrangements equivalent to the communication-status monitor/control section 30 and the communication-status notification section 40 of VoIP gateway equipment 1A shown in FIG. 5.

In order to incorporate VoIP gateway equipment with the functions of the communication-status monitor/control section 30 and the communication-status notification section 40, a recording medium in which a communication-status notification program and associated data are recorded is usually provided and the program and the associated data are installed in the VoIP gateway equipment. The communication-status notification program instructs the computer to function as: communication-status monitoring/controlling means for the same function as the communication-status monitor/control section 30 (which means has a function to monitor/control the communication status of the IP network 9, based on the processing status of the voice data in the VoIP gateway equipment); and communication-status notifying means for the same function as the communication-status notification section 40 (which means has a function to notify the subscriber terminal of the communication status, which is monitored/controlled by the monitoring/controlling means, via the VoIP gateway equipment).

The installation of the program and the associated data is performed by setting a storing medium, such as a floppy disk, an MO (Magneto-Optic) disk, a CD-ROM (compact disk read-only memory), a hard disk or any other various storing apparatuses, in the computer, or by using a program provided through the IP network.

(5-2) Description of Operations of the VoIP Gateway Equipment Incorporated with the Communication-Status Notification Apparatus of the Fourth Modification:

Next, operations in the VoIP communication system according to the fourth modification of the first embodiment of the present invention will be described.

Operations carried out in the VoIP communication system of the present modification are generally equivalent to the detailed operations (i), (ii), (iii) and (iv) of (1-2) the notifying operation of the traffic status, and the detailed operations (i), (ii), (iii) and (iv) of (1-3) the notifying operation of the cryptographic-processing status, according to the first embodiment of the present invention. By excluding the functions responsive to a request from the subscriber terminal, it is possible to realize the VoIP gateway equipment for voluntarily monitoring/controlling and notifying the communication status of the IP network, with such a simpler arrangement than that of the communication-status notification apparatus of the first embodiment.

The detailed operations (i) and (ii), each described in both (1-2) and (1-3), respectively correspond to the steps of (a) monitoring/controlling the communication status of the IP network based on a processing status of the voice data in the VoIP gateway equipment, and (b) notifying the subscriber terminal of the communication status monitored/controlled in the step (a).

(5-3) Description of Variation of the Fourth Modification of the First Embodiment of the Present Invention:

As described above, the communication-status notification apparatus described in the fourth modification of the first embodiment of the present invention has the communication-status monitor/control section 30 and the communication-status notification section 40.

Practically, it is also possible to provide a communication-status notification apparatus which is equipped with only a communication-status-notification management section 3&4, thereby enabling to simply notify of the communication status.

The following description will be made on, as a variation of the fourth modification of the first embodiment of the present invention, a VoIP communication system as shown in FIG. 1 including VoIP gateway equipment 1A, which is incorporated with a communication-status notification apparatus having only a communication-status-notification management section.

Already referred to in the description of the aspects of the present invention, the VoIP communication system shown in FIG. 1 is again referred to for describing the present modification because of the same reason as that used in the description about the first embodiment of the present invention.

Arrangements of a subscriber terminal and a router, both used in the present modification, are equivalent to the arrangements of the subscriber terminal and the router described in the first embodiment of the present invention. Accordingly, in the following description of arrangements of the present embodiment, only an arrangement of the VoIP gateway equipment 1A incorporated with the communication-status notification apparatus of the present modification will be described.

The VoIP gateway equipment with the communication-status notification apparatus according to the variation of the fourth modification of the first embodiment of the present invention has an arrangement similar to the arrangement of VoIP gateway equipment according to the fourth modification of the first embodiment of the present invention with the exception of the following points.

The communication-status monitor/control section 30 of the fourth modification of the first embodiment of the present invention is excluded from the VoIP gateway equipment of the present modification.

The communication-status-notification management section has the components equivalent to those of the communication-status notification section 40 of the fourth modification of the first embodiment of the present invention, with the exception that the communication-status-notification control section 42 of the communication-status-notification management section further has a function of controlling the IP-packet creation/analysis section 13 to monitor a sending/receiving status of IP packets to/from the IP network 9 and a creating/analyzing status of IP packets, and a function of analyzing the communication status in the IP network 9 based on the sending/receiving status of IP packets to/from the IP network 9 and the creating/analyzing status of IP packets.

With this arrangement, the VoIP gateway equipment with the communication-status notification apparatus according to the present variation carries out the following operations.

First, the communication-status-notification control section 42 controls the IP-packet creation/analysis section 13 to monitor a sending/receiving status of IP packets to/from the IP network 9 and a creating/analyzing status of IP packets.

Then, the communication-status-notification control section 42 analyzes the communication status in the IP network 9 based on the sending/receiving status of IP packets to/from the IP network 9 and the creating/analyzing status of IP packets, so as to control the interface section 11 to notify the subscriber terminal of the analyzed communication status.

(6) Description of the Fifth Modification of the First Embodiment of the Present Invention:

Finally, as the fifth modification of the first embodiment of the present invention, a VoIP communication system as shown in FIG. 1 including the subscriber terminal 1B, which is incorporated with the communication-status display apparatus according to the present invention, will be described.

Already referred to in the description of the aspects of the present invention, the VoIP communication system shown in FIG. 1 is again referred to for describing the fifth modification of the first embodiment of the present invention because of the same reason as that used in the description about the first embodiment of the present invention.

An arrangement of a router used in the present modification is equivalent to the arrangement of the router described in the first embodiment of the present invention. Accordingly, in the following description of arrangements of the present embodiment, only arrangements of the subscriber terminal, incorporated with the communication-status display apparatus of the present modification, and the VoIP gateway equipment, incorporated with the communication-status notification apparatus of the present modification and used with the subscriber terminal, will be described.

(6-1) Description of Arrangement of the VoIP Gateway Equipment Incorporated with the Communication-Status Notification Apparatus of the Fifth Modification:

First, an arrangement of the VoIP gateway equipment, incorporated with the communication-status notification apparatus of the fifth modification, will be described with reference to FIG. 5.

The VoIP gateway equipment used in the present modification has an arrangement basically equivalent to the VoIP gateway equipment described in the first embodiment of the present invention with reference to FIG. 5, being incorporated with a VoIP-gateway mechanism and the notification function of the communication status according to the present invention.

Differences between the VoIP gateway equipment used in the present modification and the VoIP gateway equipment of the first embodiment is as follows.

In the VoIP gateway equipment used in the present modification, the communication-status-notification control section 42 has a function to monitor a voice signal which undergoes the input/output process by the interface section 11, thereby discriminate whether or not a subscriber terminal 2A connected to the interface section 11 is the subscriber terminal 2A incorporated with the communication-status display apparatus according to the present modification.

Further, the communication-status-notification control section 42 is arranged to function as, when the subscriber terminal 2A connected to the interface section 11 is judged to be the subscriber terminal 2A incorporated with the communication-status display apparatus according to the present modification, controlling directly the interface section 11 to send to the subscriber terminal 2A display control information, which causes the subscriber terminal 2A to display the information stored in the communication-status storage section 37, in the form of a voice signal, without using the notification materials stored in the notification-material storing section 41.

(6-2) Description of Arrangement of the Subscriber Terminal Incorporated with the Communication-Status Display Apparatus of the Fifth Modification:

Next, an arrangement of the subscriber terminal, incorporated with the communication-status display apparatus of the fifth modification of the present invention, will be described with reference to FIG. 21.

Figure 21:
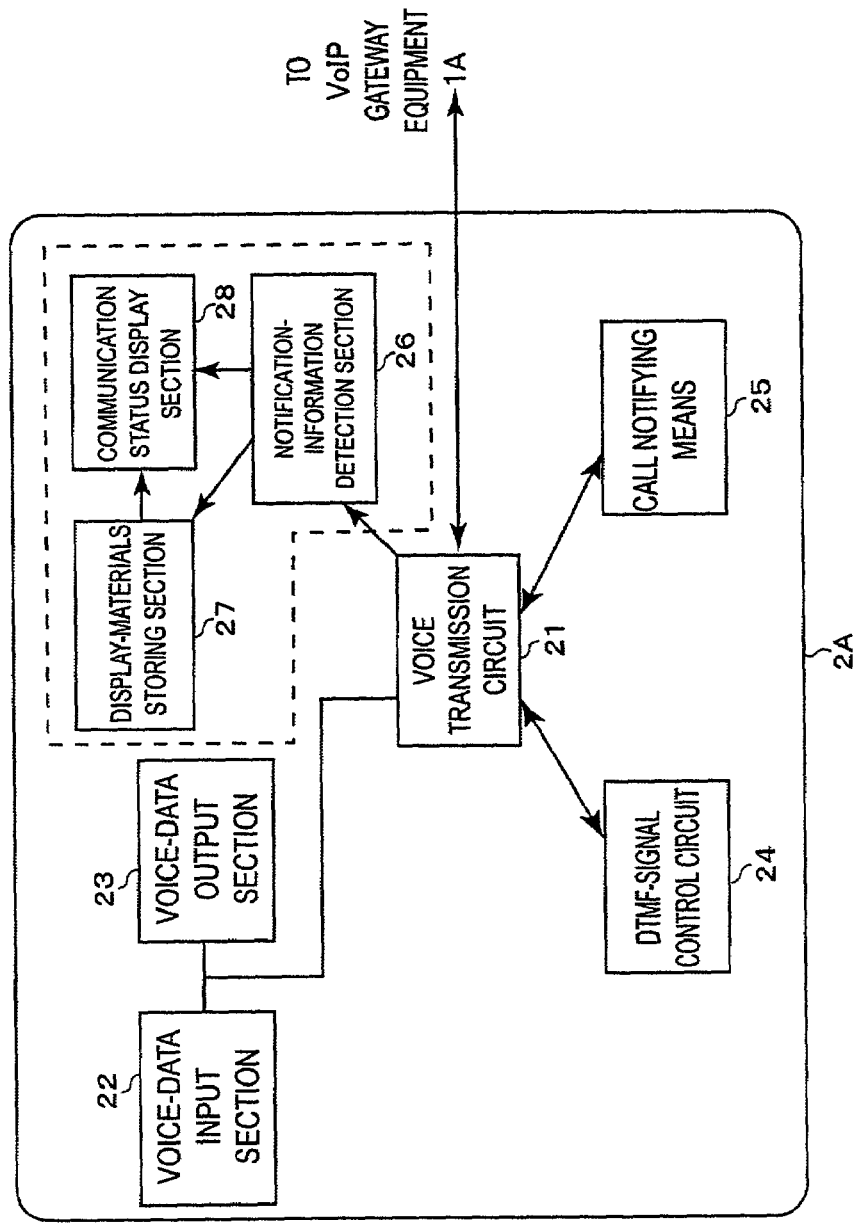
FIG. 21 is a block diagram showing a subscriber terminal incorporated with a communication-status display apparatus according to a fifth embodiment of the first embodiment of the present invention; an FIG. 22 illustrates a conventional VoIP communication system.
Figure 22:
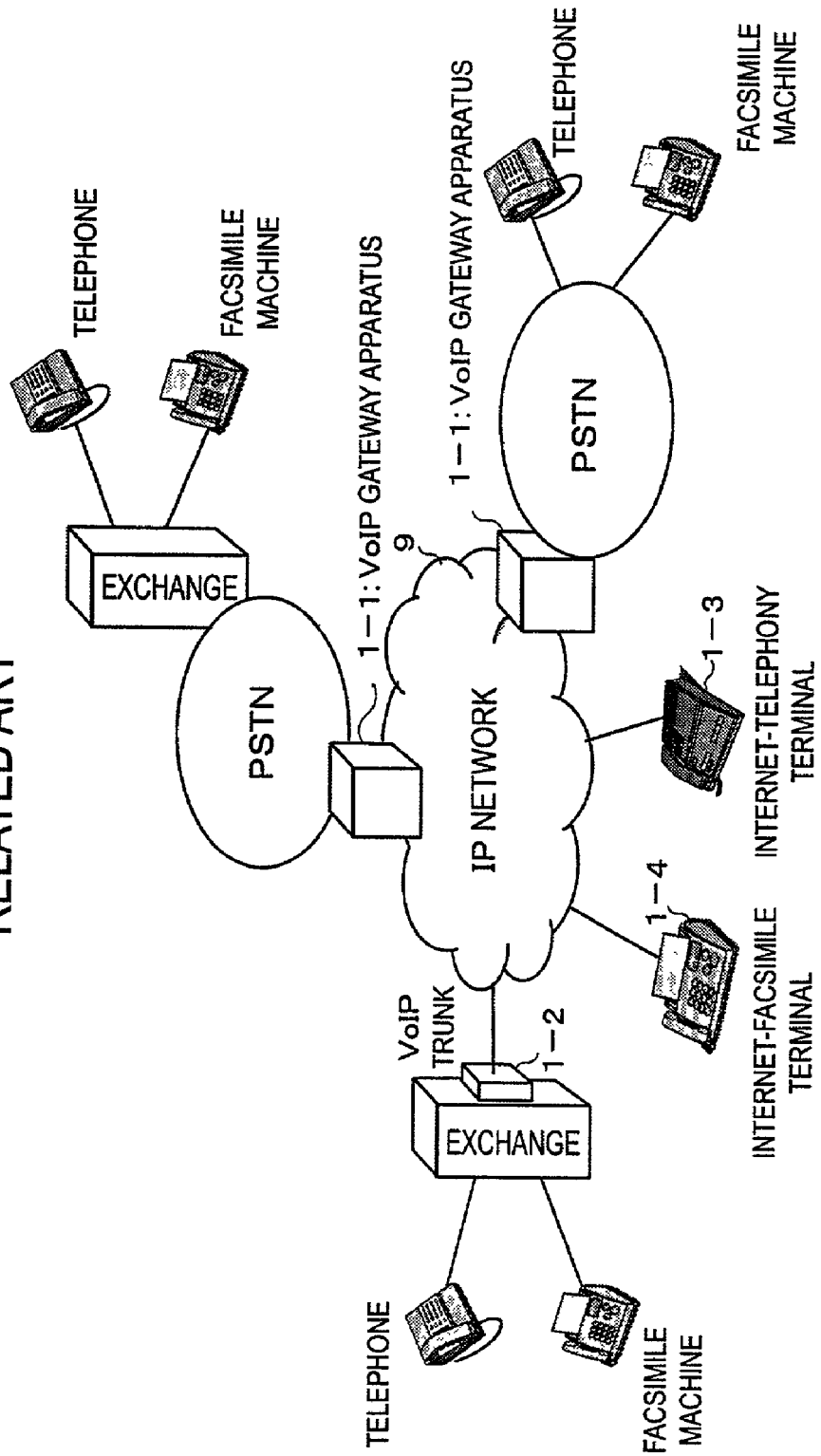

FIG. 21 is a block diagram showing an arrangement of the subscriber terminal incorporated with the communication-status display apparatus according to the present invention. The subscriber terminal is equivalent to, for example, the subscriber terminal 2A shown in FIG. 1, being connected to the VoIP gateway equipment 1A with the communication-status notification apparatus according to the present invention via a telecommunication network, such as a PSTN or a ISDN, or an exchange, or directly.

The subscriber terminal 2A includes components to serve as a conventional voice communication function: a voice transmission circuit 21, a voice-data input section 22, a voice-data output section 23, a DTMF-signal control circuit 24 and a call notifying means 25. Each of these components has the same function as that of a respective component with the same numeral of the subscriber terminal shown in FIG. 9.

In addition to the components for a voice communication function, the subscriber terminal 2A includes components to serve as a function of the communication-status display apparatus according to the present invention, a notification-information detection section 26, a display-material storage section 27 and a communication-status display section 28.

The notification-information detection section 26 detects display control information, which was sent from the VoIP gateway equipment 1A, out of voice signals sent from the VoIP gateway equipment 1A and received by the subscriber terminal 2A.

The display-material storage section 27 stores at least one of voice, character and image, which represents information about communication status corresponding to the display control information sent from the VoIP gateway equipment 1A, as display materials used for the communication-status display section 28.

The communication-status display section 28 displays information about the communication status of the IP network 9 notified of from the VoIP gateway equipment 1A, using the display materials stored in the display-material storage section 27, in response to the display control information detected by the notification-information detection section 26.

With the arrangement as described above, the notification-information detection section 26 functions as a notified-information detection section for detecting information about the communication status of the IP network 9, which status is monitored/controlled by the VoIP gateway equipment 1A, when the subscriber terminal 2A is notified of the communication-status information from the VoIP gateway equipment 1A, the display-material storage section 27 functions as a display-material storage section for storing at least one of voice, character and image as display materials, and the communication-status display section 28 functions as a communication-status display section for displaying the communication status of the IP network 9, based on the communication-status information detected by the notified-information detection section, using the display materials stored in the display-material storage section.

(6-3) Description of Operations in the VoIP Communication System According to the Fifth Modification:

Next, operations in the VoIP communication system according to the fifth modification of the first embodiment of the present invention will be described.

Operations carried out in the VoIP communication system of the present modification are generally equivalent to the detailed operations (i), (ii), (iii) and (iv) of (1-2) the notifying operation of the traffic status, and the detailed operations (i), (ii), (iii) and (iv) of (1-3) the notifying operation of the cryptographic-processing status, according to the first embodiment of the present invention. In the following, accordingly, only some operations different from the detailed operations of the first embodiment will be described.

In the VoIP communication system of the present modification, the above (ii) notifying operation of the communication status is performed according to the following procedure.

First, in the VoIP gateway equipment 1A, when the communication-status-notification control section 42 confirms that the subscriber terminal 2A connected to VoIP gateway equipment 1A is incorporated with the communication-status display apparatus according to the present embodiment, the communication-status-notification control section 42 controls the interface section 11 to send to subscriber terminal 2A display control information, which causes the subscriber terminal 2A to display the information stored in the communication-status storage section 37, in the form of the voice signal.

In the subscriber terminal 2A, the notification-information detection section 26 detects the display control information, which was sent from the VoIP gateway equipment 1A via the voice transmission circuit 21, out of voice signals sent from the VoIP gateway equipment 1A and received by the subscriber terminal 2A.

Next, the communication-status display section 28 displays information about the communication status of the IP network 9 notified of from the VoIP gateway equipment 1A, using the display materials stored in the display-material storage section 27, in response to the display control information detected by the notification-information detection section 26.

The notification-information detection section 26 carries out an operation to detect the display control information selectively in the three manners, according to a condition of voice communication and a kind of the communication status: continuously, at regular intervals, and in response to an instruction by the subscriber.

By performing the above-described operations, since the communication status notified of from the VoIP gateway equipment 1A is displayed on the subscriber terminal 2A, the subscriber can easily and clearly perceive various kinds of communication status of the IP network 9.

If the VoIP communication system includes only the subscriber terminals each incorporated with the communication-status display apparatus according to the present modification, the VoIP gateway equipment 1A does not need to confirm a kind of the subscriber terminal 2A. It is therefore possible to provide a VoIP communication system in which the VoIP gateway equipment 1A notify the subscriber terminal of the communication-status always using the display control information. In the VoIP communication system, the VoIP gateway equipment 1A is not equipped with the notification-material storing section 41, and arranged so that the communication-status-notification control section 42 notifies the subscriber terminal of the communication-status always using the display control information.

(7) Others

In the above-described embodiment and modifications, the description has been made on the communication-status notification apparatus according to the present invention which monitors/controls or notifies the traffic status of voice data and/or the cryptographic-processing status on voice data as examples of the communication status in an IP network.

Needless to say, the communication-status notification apparatus according to the present invention is also applicable to monitor/control and notify other various kinds of communication status.

Other examples are the followings.

① Arrangement to Monitor and Notify Breakdown Status in IP Network as Communication Status In this arrangement, the VoIP gateway equipment incorporated with the communication-status notification apparatus according to the present invention requests a router connected to the VoIP gateway equipment that, when a breakdown occurs in a part of IP network connected to the router and disables the router for transmitting IP packets along a path passing through the broken-down part, the router informs the VoIP gateway equipment of the disability.

With the above-described arrangement, the communication-status notification apparatus according to the present invention is able to monitor a breakdown status in the network and to notify the subscriber terminal of the monitored breakdown status, regarding not only a breakdown occurring in a network area directly connected to the VoIP gateway equipment, but also a network area indirectly connected to the VoIP gateway equipment via the router.

② Arrangement to Monitor and Notify the Number of Connections Established in IP Network In this arrangement, the VoIP gateway equipment incorporated with the communication-status notification apparatus according to the present invention requests a router connected to the VoIP gateway equipment to monitor a destination of each voice packet transmitted through the router and to inform the VoIP gateway equipment of the monitored destination.

With the above-described arrangement, the communication-status notification apparatus according to the present invention is able to calculate the number of connections established in the IP network and to notify the subscriber terminal of the calculated number of connections.

Either of the arrangements ① and ② is realized using substantially the same VoIP gateway equipment as that according to the first embodiment. Concretely, both of the breakdown status in an IP network and the number of connections established in an IP network is monitored using the router-information request section 311, the router-information obtaining section 312 and the router-information analysis section 313 of the VoIP gateway equipment of the first embodiment.

Obviously, the present invention is not limitedly applicable to the VoIP system, but is generically applicable to various other kinds of communication system.

The present invention is not limited to the above-mentioned embodiment and modifications, but is generally applicable with various modifications unless deviating the gist of the present invention.

What is claimed is:

1. A communication-status notification apparatus for a communication system in which at least one subscriber terminal is connected to a communication network via first gateway equipment, serving to create/analyze a packet as a voice data transmission medium, so that the subscriber terminal sends/receives voice data over the communication network, said apparatus being adapted to be incorporated in the first gateway equipment and comprising:
   a communication-status monitor/control section for monitoring/controlling the communication status of the communication network, based on the processing status of the voice data in the first gateway equipment; and
   a communication-status notification section for notifying the subscriber terminal of the communication status monitored/controlled by said communication-status monitor/control section via the first gateway equipment;
   wherein said communication-status notification section includes a notification-material storage section for storing at least one of voice, character and image as notification materials, and is operable to carry out the notification of communication status using the notification materials stored in said notification-material storage section.

2. A communication-status notification apparatus for a communication system in which at least one subscriber terminal is connected to a communication network via first gateway equipment, serving to create/analyze a packet as a voice data transmission medium, so that the subscriber terminal sends/receives voice data over the communication network, said apparatus being adapted to be incorporated in the first gateway equipment and comprising:
   a communication-status monitor/control section for monitoring/controlling the communication status of the communication network, based on the processing status of the voice data in the first gateway equipment; and
   a communication-status notification section for notifying the subscriber terminal of the communication status monitored/controlled by said communication-status monitor/control section via the first gateway equipment;
   wherein said communication-status monitor/control section includes a traffic-status monitor/control section for monitoring/controlling a traffic status in the communication network, based on at least either of i) information about the traffic status collected from each of one or more routers, which are included in the communication network, and ii) a sending/receiving status of test packets to/from second gateway equipment, which is connected to the communication network and serves as a companion to the first gateway equipment for voice data transmission.

3. A communication-status notification apparatus according to claim 2, wherein said traffic-status monitor/control section includes:
   a traffic-information request section for requesting each of one or more routers, which are included in the communication network, to send information about the traffic status in each said router to the first gateway equipment, by transmitting a request signal to each said router via the first gateway equipment;
   a traffic-information obtaining section for obtaining the information about the traffic status, which has been sent from each said router in response to the request signal transmitted by said traffic-information request section, out of various data received by the first gateway equipment; and
   a traffic-status analysis section for analyzing the traffic status of the communication network, based on the traffic-status information obtained by said traffic-information obtaining section.

4. A communication-status notification apparatus according to claim 2, wherein said traffic-status monitor/control section includes:
   a test-packet sending section for sending one or more test packets via the gateway equipment to second gateway equipment, which is connected to the communication network and serves as a companion to the first gateway equipment for voice data transmission;
   a test-packet retrieving section for retrieving the individual test packet, which has been sent back from the second gateway equipment, out of packets received by the first gateway equipment; and
   a traffic-status analysis section for analyzing the traffic status of the communication network, based on the retrieving status of the test packets by said test-packet retrieving section.

5. A communication-status notification apparatus according to claim 2, wherein
   said traffic-status monitor/control section includes a communication-quality evaluation section for evaluating communication quality of voice data transmitted over the communication network, based on the traffic status monitored by said traffic-status monitor/control section, and
   said communication-status notification section is operable to notify the subscriber terminal of information about the communication quality of voice data evaluated by said communication-quality evaluation section.

6. A communication-status notification apparatus according to claim 5, wherein said traffic-status monitor/control section further includes a band-alteration request section, responsive to the communication quality of voice data evaluated by said communication-quality evaluation section, for requesting each of one or more routers, which are included in the communication network, to alter a band to be used for voice data transmission, by transmitting a request signal to each said router via the first gateway equipment.

7. A communication-status notification apparatus for a communication system in which at least one subscriber terminal is connected to a communication network via first gateway equipment, serving to create/analyze a packet as a voice data transmission medium, so that the subscriber terminal sends/receives voice data over the communication network, said apparatus being adapted to be incorporated in the first gateway equipment and comprising:
   a communication-status monitor/control section for monitoring/controlling the communication status of the communication network, based on the processing status of the voice data in the first gateway equipment; and a communication-status notification section for notifying the subscriber terminal of the communication status monitored/controlled by said communication-status monitor/control section via the first gateway equipment;

said communication-status monitor/control section includes a cryptographic-processing-status monitor/control section for monitoring/controlling a cryptographic-processing status of voice data transmitted over the communication network.

8. A communication-status notification apparatus according to claim 7, wherein said cryptographic-processing-status monitor/control section includes a cryptographic-processing section for cryptographic-processing voice data sent/received by the first gateway equipment, and said communication-status notification section is operable to notify the subscriber terminal of the cryptographic-processing status of voice data by said cryptographic-processing section.

9. A communication-status notification apparatus according to claim 8, wherein said cryptographic-processing section is operable to carry out at least one of scramble, encryption and interleave as a cryptographic process.

10. A communication-status notification apparatus according to claim 7, wherein said cryptographic-processing-status monitor/control section further includes a cryptographic-processing-status monitor section for monitoring a cryptographic-processing status of voice data by second gateway equipment, which is connected to the communication network and serves as a companion to the first gateway equipment for voice data transmission, based on a transmission status of packets between the first gateway equipment and the second gateway equipment, and said cryptographic-processing section is operable to carry out the cryptographic-processing in accordance with the cryptographic-processing status of the second gateway equipment monitored by said cryptographic-processing-status monitor section.

11. A communication-status notification apparatus for a communication system in which at least one subscriber terminal is connected to an communication network via first gateway equipment, serving to create/analyze a packet as a voice data transmission medium, so that the subscriber terminal sends/receives voice data over the communication network, said apparatus being adapted to be incorporated in the first gateway equipment and comprising:

a request analysis section for discriminating whether or not voice data received by the first gateway equipment from the subscriber terminal contains a request on monitoring/controlling or notifying a communication status in the communication network, and for analyzing the content of said request contained in the voice data received from the subscriber terminal;

a communication-status monitor/control section, responsive to the content of said request analyzed by said request analysis section, for monitoring/controlling the communication status of the communication network, based on the processing status of the voice data in the first gateway equipment; and a communication-status notification section, responsive to the content of said request analyzed by said request analysis section, for notifying the subscriber terminal of the communication status monitored/controlled by said communication-status monitor/control section via the first gateway equipment.

12. A communication-status notification apparatus according to claim 11, wherein when the content of said request analyzed by said request analysis section is related with starting or stopping of the notification of the communication status, said communication-status notification section is operable to start or stop the notification of the communication status according to the content of said request.

13. A communication-status notification apparatus according to claim 11, wherein when the content of said request analyzed by said request analysis section is related with selecting of a kind of the communication status to be notified, said communication-status notification section is operable to notify the subscriber terminal of the selected kind of the communication status according to the content of said request.

14. A communication-status notification apparatus according to claim 11, wherein said communication-status notification section includes a notification-material storage section for storing at least one of voice, character and image as notification materials, and is operable to carry out the notification of communication status, using the notification materials stored in said notification-material storage section.

15. A communication-status notification apparatus according to claim 11, wherein said communication-status monitor/control section includes a traffic-status monitor/control section for monitoring/controlling a traffic status in the communication network, based on a sending/receiving status of packets in the first gateway equipment.

16. A communication-status notification apparatus according to claim 15, wherein said traffic-status monitor/control section includes:

a traffic-information request section for requesting each of one or more routers, which are included in the communication network, to send to the first gateway equipment information about the traffic status in each said router, by transmitting a request signal to each said router via the first gateway equipment;

a traffic-information obtaining section for obtaining the information about the traffic status, which has been sent from each said router in response to the request signal transmitted by said traffic-information request section, out of various data received by the first gateway equipment; and a traffic-status analysis section for analyzing the traffic status of the communication network based on the traffic-status information obtained by said traffic-information obtaining section.

17. A communication-status notification apparatus according to claim 15, wherein said traffic-status monitor/control section includes:

a test-packet sending section for sending one or more test packets via the first gateway equipment to second gateway equipment, which is connected to the communication network and serves as a companion with the first gateway equipment for voice data transmission;

a test-packet retrieving section for retrieving the individual test packet, which has been sent back from the second gateway equipment, out of packets received by the first gateway equipment; and a traffic-status analysis section for analyzing the traffic status of the communication network, based on the retrieving status of the test packets by said test-packet retrieving section.

18. A communication-status notification apparatus according to claim 15, wherein
said traffic-status monitor/control section includes a communication-quality evaluation section for evaluating communication quality of voice data transmitted over the communication network, based on the traffic status monitored by said traffic-status monitor/control section, and
said communication-status notification section is operable to notify the subscriber terminal of information about the communication quality of voice data evaluated by said communication-quality evaluation section.

19. A communication-status notification apparatus according to claim 18, wherein said traffic-status monitor/control section further includes a band-alteration request section, responsive to the communication quality of voice data evaluated by said communication-quality evaluation section, for requesting each of one or more routers, which are included in the communication network, to alter a band to be used for voice data transmission, by transmitting a request signal to each said router via the first gateway equipment.

20. A communication-status notification apparatus according to claim 11, wherein said communication-status monitor/control section includes a cryptographic-processing-status monitor/control section for monitoring/controlling a cryptographic-processing status of voice data transmitted over the communication network.

21. A communication-status notification apparatus according to claim 20, wherein
said cryptographic-processing-status monitor/control section includes a cryptographic-processing section for cryptographic-processing voice data sent/received by the first gateway equipment, and
said communication-status notification section is operable to notify the subscriber terminal of the cryptographic-processing status of voice data by said cryptographic-processing section.

22. A communication-status notification apparatus according to claim 21, wherein said cryptographic-processing section is operable to carry out at least one of scramble, encryption and interleave as a cryptographic process.

23. A communication-status notification apparatus according to claim 20, wherein
said cryptographic-processing-status monitor/control section further includes a cryptographic-processing-status monitor section for monitoring a cryptographic-processing status of voice data by second gateway equipment, which is connected to the communication network and serves as a companion with the first gateway equipment for voice data transmission, based on a transmission status of packets between the first gateway equipment and the second gateway equipment, and
said cryptographic-processing section is operable to carry out the cryptographic-processing in accordance with the cryptographic-processing status of the second gateway equipment monitored by said cryptographic-processing-status monitor section.

24. A communication-status display apparatus for a communication system in which at least one subscriber terminal is connected to a communication network via gateway equipment, serving to create/analyze a packet as a voice data transmission medium, so that the subscriber terminal sends/receives voice data over the communication network, and also serving to monitor/control a communication status in the communication network so as to notify the subscriber terminal of information about the monitored/controlled communication status, said apparatus being adapted to be incorporated in the subscriber terminal and comprising:
a notified-information detection section for detecting information about the communication status of the communication network, which status is monitored/controlled by the gateway equipment, when the subscriber terminal is notified of the communication-status information from the gateway equipment;
a display-material storage section for storing at least one of voice, character and image as display materials; and
a communication-status display section for displaying the communication status of the communication network, based on the communication-status information detected by said notified-information detection section, using said display materials stored in said display-material storage section.

25. A communication-status notification method for notifying at least one subscriber terminal of a communication status in a communication network of a communication system in which the subscriber terminal is connected to the communication network via gateway equipment, serving to create/analyze a packet as a voice data transmission medium, so that the subscriber terminal sends/receives voice data over the communication network, said method comprising the steps of:
at the subscriber terminal,
(a) sending to the gateway equipment a request on monitoring/controlling or notifying of a communication status of the communication network, said request being contained in voice data transmitted over the communication network;
at the gateway equipment,
(b) discriminating whether or not voice data received from the subscriber terminal contains said request sent by the subscriber terminal in said step (a) and, when the voice data received from the subscriber terminal contains said request, analyzing the content of said request contained in the voice data;
(c) in response to the content of said request analyzed in said step (b), monitoring/controlling the communication status of the communication network, based on a processing status of the voice data in the gateway equipment; and
(d) in response to the content of said request analyzed in said step (b), notifying the subscriber terminal of the communication status monitored/controlled in said step (c).

26. A recording medium, in which a communication-status notification program is recorded, for use in a gateway equipment of a communication system in which at least one subscriber terminal is connected to a communication network via the gateway equipment, serving to create/analyze a packet as a voice data transmission medium, so that the subscriber terminal sends/receives voice data over the communication network, wherein said communication-status notification program instructs the gateway equipment to function as the following:
means for discriminating whether or not voice data received by the gateway equipment from the subscriber terminal contains a request on monitoring/controlling or notifying of a communication status in the communication network, and for analyzing the content of said request contained in the voice data received from the subscriber terminal;
means, responsive to the content of said request analyzed by said discriminating and analyzing means, for monitoring/controlling the communication status of the communication network, based on the processing status of the voice data in the gateway equipment; and means, responsive to the content of said request analyzed by said discriminating and analyzing means, for notifying the subscriber terminal of the communication status, which is monitored/controlled by said monitoring/controlling means, via the gateway equipment.

27. A communication-status notification method for notifying at least one subscriber terminal of a communication status in a communication network of a communication system in which the subscriber terminal is connected to the communication network via first gateway equipment, serving to create/analyze a packet as a voice data transmission medium, so that the subscriber terminal sends/receives voice data over the communication network, said method being carried out at the first gateway equipment and comprising the steps of:

(a) monitoring/controlling the communication status of the communication network, based on a processing status of voice data in the first gateway equipment; and (b) notifying the subscriber terminal of the communication status monitored/controlled in said step (a);

wherein said step (a) includes monitoring/controlling a traffic status in the communication network, based on at least either of i) information about the traffic status collected from each of one or more routers, which are included in the communication network, and ii) a sending/receiving status of test packets to/from second gateway equipment, which is connected to the communication network and serves as a companion to the first gateway equipment for voice data transmission.

28. A communication-status notification method for notifying at least one subscriber terminal of a communication status in a communication network of a communication system in which the subscriber terminal is connected to the communication network via gateway equipment, serving to create/analyze a packet as a voice data transmission medium, so that the subscriber terminal sends/receives voice data over the communication network, said method being carried out at the gateway equipment and comprising the steps of:

(a) monitoring/controlling the communication status of the communication network, based on a processing status of voice data in the gateway equipment; and (b) notifying the subscriber terminal of the communication status monitored/controlled in said step (a);

wherein said step (a) includes monitoring/controlling a cryptographic-processing status of voice data transmitted over the communication network.

29. A recording medium, in which a communication-status notification program is recorded, for use in first gateway equipment of a communication system in which at least one subscriber terminal is connected to a communication network via the first gateway equipment, serving to create/analyze a packet as a voice data transmission medium, so that the subscriber terminal sends/receives voice data over the communication network, wherein said communication-status notification program instructs the first gateway equipment to function as the following:

means for monitoring/controlling a communication status in the communication network, based on a processing status of voice data in the first gateway equipment; and means for notifying the subscriber terminal of the communication status of the communication network, which is monitored/controlled by said monitoring/controlling means, via the first gateway equipment;

wherein said means for monitoring/controlling is operable to monitor/control a traffic status in the communication network, based on at least either of i) information about the traffic status collected from each of one or more routers, which are included in the communication network, and ii) a sending/receiving status of test packets to/from second gateway equipment, which is connected to the communication network and serves as a companion to the first gateway equipment for voice data transmission.

30. A recording medium, in which a communication-status notification program is recorded, for use in gateway equipment of a communication system in which at least one subscriber terminal is connected to a communication network via the gateway equipment, serving to create/analyze a packet as a voice data transmission medium, so that the subscriber terminal sends/receives voice data over the communication network, wherein said communication-status notification program instructs the gateway equipment to function as the following:

means for monitoring/controlling a communication status in the communication network, based on a processing status of voice data in the gateway equipment; and means for notifying the subscriber terminal of the communication status of the communication network, which is monitored/controlled by said monitoring/controlling means, via the gateway equipment;

wherein said means for monitoring/controlling is operable to monitor/control a cryptographic-processing status of voice data transmitted over the communication network.

31. A communication apparatus for use in a communication system including a communication network and at least one subscriber terminal, said apparatus being disposed between the communication network and the subscriber terminal and comprising:

a gateway section serving to create/analyze a packet as a voice data transmission medium so that the subscriber terminal sends/receives voice data over the communication network;

a communication-status monitor/control section for monitoring/controlling the communication status of the communication network, based on the processing status of the voice data in said gateway section; and a communication-status notification section for notifying the subscriber terminal of the communication status monitored/controlled by said communication-status monitor/control section via said gateway section;

wherein said communication-status monitor/control section includes a traffic-status monitor/control section for monitoring/controlling a traffic status in the communication network, based on at least either of i) information about the traffic status collected from each of one or more routers, which are included in the communication network, and ii) a sending/receiving status of test packets to/from gateway equipment, which is connected to the communication network and serves as a companion to said gateway section for voice data transmission.

32. A communication apparatus for use in a communication system including a communication network and at least one subscriber terminal, said apparatus being disposed between the communication network and the subscriber terminal and comprising:

a gateway section serving to create/analyze a packet as a voice data transmission medium so that the subscriber terminal sends/receives voice data over the communication network;

a communication-status monitor/control section for monitoring/controlling the communication status of the communication network, based on the processing status of the voice data in said gateway section; and a communication-status notification section for notifying the subscriber terminal of the communication status monitored/controlled by said communication-status monitor/control section via said gateway section;

wherein said communication-status monitor/control section includes a cryptographic-processing-status monitor/control section for monitoring/controlling a cryptographic-processing status of voice data transmitted over the communication network.

33. A communication apparatus for use in a communication system including a communication network and at least one subscriber terminal, said apparatus being disposed between the communication network and the subscriber terminal and comprising:

a gateway section serving to create/analyze a packet as a voice data transmission medium so that the subscriber terminal sends/receives voice data over the communication network;

a request analysis section for discriminating whether or not voice data received by the gateway section from the subscriber terminal contains a request on monitoring/controlling or notifying a communication status in the communication network, and for analyzing the content of said request contained in the voice data received from the subscriber terminal;

a communication-status monitor/control section, responsive to the content of said request analyzed by said request analysis section, for monitoring/controlling the communication status of the communication network, based on the processing status of the voice data in the gateway section; and a communication-status notification section, responsive to the content of said request analyzed by said request analysis section, for notifying the subscriber terminal of the communication status monitored/controlled by said communication-status monitor/control section.

34. A communication-status notification apparatus for a communication system in which at least one subscriber terminal is connected to a communication network via a router, serving to create/analyze a packet as a voice data transmission medium, so that the subscriber terminal sends/receives voice data over the communication network, said apparatus being adapted to be incorporated in the router and comprising:

a communication-status monitor/control section for monitoring/controlling the communication status of the communication network, based on the processing status of the voice data in said router; and a communication-status notification section for notifying the subscriber terminal of the communication status monitored/controlled by said communication-status monitor/control section via said router;

wherein said communication-status monitor/control section includes a traffic-status monitor/control section for monitoring/controlling a traffic status in the communication network, based on at least either of i) information about the traffic status collected from each of one or more routers, which are included in the communication network, and ii) a sending/receiving status of test packets to/from second gateway equipment, which is connected to the communication network and serves as a companion to said router for voice data transmission.

35. A communication-status notification apparatus for a communication system in which at least one subscriber terminal is connected to a communication network via a router, serving to create/analyze a packet as a voice data transmission medium, so that the subscriber terminal sends/receives voice data over the communication network, said apparatus being adapted to be incorporated in the router and comprising:

a communication-status monitor/control section for monitoring/controlling the communication status of the communication network, based on the processing status of the voice data in said router; and a communication-status notification section for notifying the subscriber terminal of the communication status monitored/controlled by said communication-status monitor/control section via said router;

wherein said communication-status monitor/control section includes a cryptographic-processing-status monitor/control section for monitoring/controlling a cryptographic-processing status of voice data transmitted over the communication network.

36. A communication-status notification apparatus for a communication system in which at least one subscriber terminal is connected to a communication network via a router, serving to create/analyze a packet as a voice data transmission medium, so that the subscriber terminal sends/receives voice data over the communication network, said apparatus being adapted to be incorporated in the router and comprising:

a request analysis section for discriminating whether or not voice data received by the router from the subscriber terminal contains a request on monitoring/controlling or notifying a communication status in the communication network, and for analyzing the content of said request contained in the voice data received from the subscriber terminal;

a communication-status monitor/control section, responsive to the content of said request analyzed by said request analysis section, for monitoring/controlling the communication status of the communication network, based on the processing status of the voice data in the router; and a communication-status notification section, responsive to the content of said request analyzed by said request analysis section, for notifying the subscriber terminal of the communication status monitored/controlled by said communication-status monitor/control section.

* * * * *